US011581910B2

(12) United States Patent
Abedini et al.

(10) Patent No.: US 11,581,910 B2
(45) Date of Patent: Feb. 14, 2023

(54) TECHNIQUES FOR SELF-INTERFERENCE CANCELATION

(71) Applicant: QUALCOMM Incorporated, San Diego, CA (US)

(72) Inventors: Navid Abedini, Basking Ridge, NJ (US); Qian Zhang, Basking Ridge, NJ (US); Kapil Gulati, Belle Mead, NJ (US); Yan Zhou, San Diego, CA (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 17/246,335

(22) Filed: Apr. 30, 2021

(65) Prior Publication Data

US 2022/0352915 A1     Nov. 3, 2022

(51) Int. Cl.
*H04W 24/10*     (2009.01)
*H04B 1/10*      (2006.01)
*H04L 5/14*      (2006.01)
*H01Q 21/06*     (2006.01)

(52) U.S. Cl.
CPC .......... *H04B 1/1081* (2013.01); *H01Q 21/06* (2013.01); *H04B 1/1027* (2013.01); *H04L 5/14* (2013.01); *H04W 24/10* (2013.01)

(58) Field of Classification Search
CPC .... H04B 1/1081; H04B 1/1027; H01Q 21/06; H04L 5/14; H04W 24/10; H04W 72/082; H04W 72/12; H04W 72/1215
See application file for complete search history.

(56) References Cited

U.S. PATENT DOCUMENTS

| 11,233,587 | B2 * | 1/2022 | Kim | H04B 17/24 |
| 2017/0141886 | A1 * | 5/2017 | Chung | H04L 1/0003 |
| 2020/0052775 | A1 * | 2/2020 | Nam | H04B 17/336 |
| 2020/0228212 | A1 * | 7/2020 | Xu | H04L 27/2602 |
| 2020/0266908 | A1 * | 8/2020 | Qian | H04B 17/336 |
| 2021/0194663 | A1 * | 6/2021 | Abotabl | H04B 17/345 |
| 2021/0235301 | A1 * | 7/2021 | Abedini | H04L 5/0048 |
| 2021/0243002 | A1 * | 8/2021 | Gulati | H04W 56/001 |
| 2021/0250158 | A1 * | 8/2021 | Gulati | H04L 5/0062 |
| 2021/0368369 | A1 * | 11/2021 | Zhang | H04L 5/14 |

(Continued)

FOREIGN PATENT DOCUMENTS

| CA | 2873411 | * | 11/2013 |
| GB | 2499259 | * | 8/2013 |

*Primary Examiner* — Frank Duong
(74) *Attorney, Agent, or Firm* — Holland & Hart LLP

(57) ABSTRACT

Methods, systems, and devices for wireless communications are described. A first wireless node may transmit, to a control node, an indication of a capability of the first wireless node to perform one or more self-interference cancelation (SIC) procedures between a first antenna array of the first wireless node and a second antenna array of the first wireless node. The first wireless node may receive, from the control node in response to the indication of the capability, a configuration for the first wireless node to use to perform a SIC procedure of the one or more SIC procedures for full-duplex communications. The first wireless node may then communicate, according to the received configuration, with the control node, a control node, or any combination thereof, using the first antenna array and the second antenna array.

30 Claims, 20 Drawing Sheets

(56) References Cited

U.S. PATENT DOCUMENTS

| | | | | |
|---|---|---|---|---|
| 2021/0376892 A1* | 12/2021 | Zhang | ............ | H04W 88/14 |
| 2021/0376896 A1* | 12/2021 | Zhang | ............ | H04B 7/0695 |
| 2021/0376941 A1* | 12/2021 | Zhang | ............ | H04B 17/345 |
| 2021/0377949 A1* | 12/2021 | Zhang | ............ | H04B 7/0691 |
| 2022/0116194 A1* | 4/2022 | Gulati | ............ | H04W 56/001 |
| 2022/0271791 A1* | 8/2022 | Zhang | ............ | H04B 17/336 |

* cited by examiner

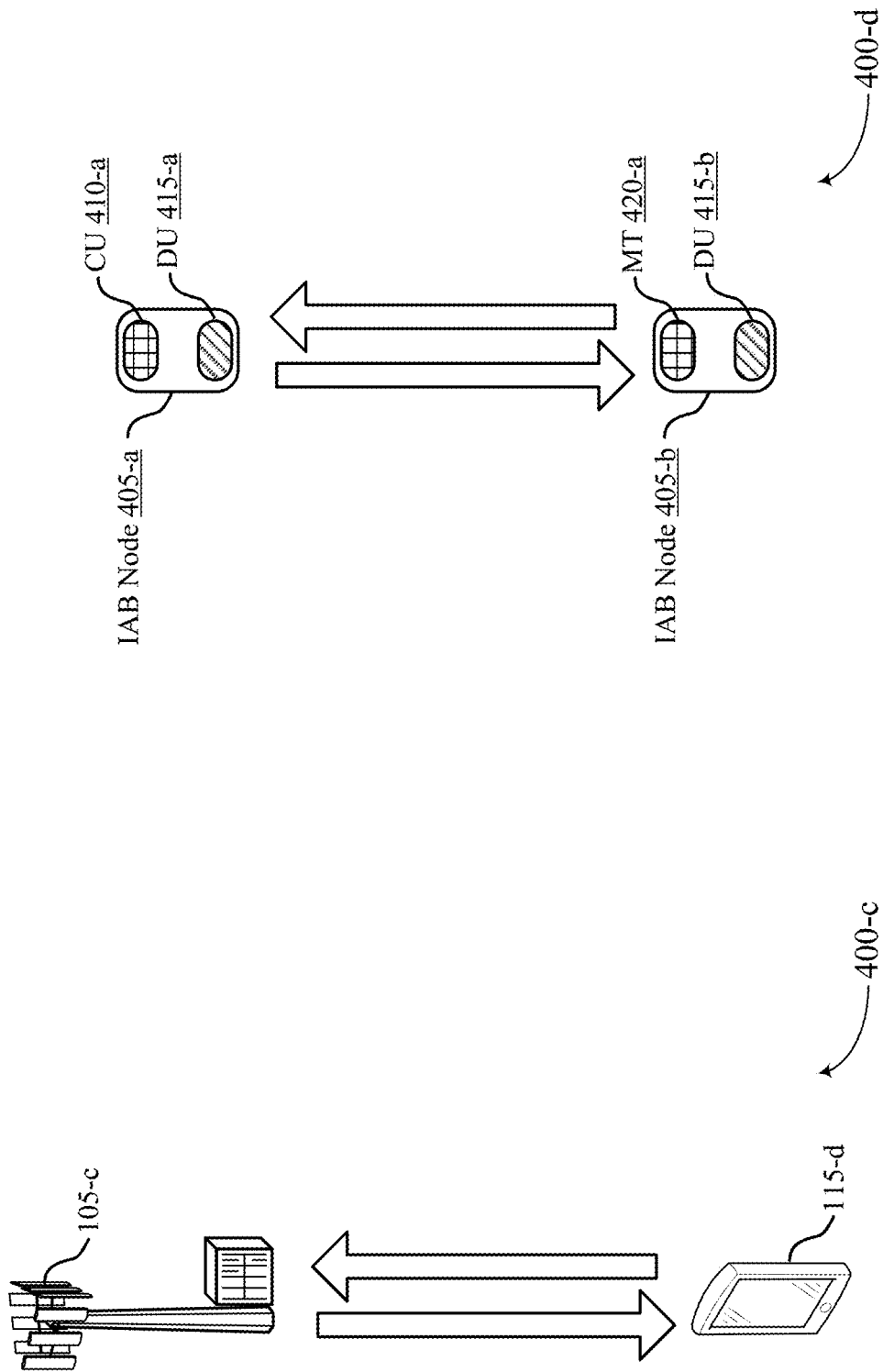

TECHNIQUES FOR SELF-INTERFERENCE CANCELATION

FIELD OF TECHNOLOGY

The following relates to wireless communications, including techniques for self-interference cancelation (SIC).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, some wireless nodes (e.g., user equipments (UEs), or mobile terminal nodes of an integrated access and backhaul (IAB) network) may be configured to perform full-duplex communications. When carrying out full-duplex communications, a wireless node may be configured to transmit uplink signals and receive downlink signals concurrently (e.g., within the same slot) and/or using common frequency bands. Full-duplex communications may reduce latency in wireless communications, and may lead to more efficient resource utilization. However, a wireless node may be susceptible to self-interference when carrying out full-duplex communications, which may reduce the efficiency and reliability of communications at the wireless node, including full-duplex communications.

SUMMARY

The described techniques relate to improved methods, systems, devices, and apparatuses that support techniques for self-interference cancelation (SIC). Generally, the described techniques provide for reporting capabilities to perform SIC procedures at a wireless node. In particular, techniques described herein are directed to signaling which enables a wireless node to report a capability to perform one or more SIC procedures, to enable/disable SIC procedures, to switch between various SIC procedures, or any combination thereof. For example, a first wireless node may transmit a capability message to a control node indicating a capability of the first wireless node to perform one or more SIC procedures. In this example, the control node may transmit a configuration for performing an SIC procedure in response to the capability message, and the first wireless node may communicate according to the configuration. In this regard, the first wireless node may perform full-duplex communications while performing an SIC procedure indicated via the configuration. In some aspects, the first wireless node may transmit measurement reports including measurements (e.g., dB interference suppression, received signal strength indicator (RSSI), reference signal received power (RSRP), reference signal received quality (RSRQ), signal-to-noise-plus-interference ratio (SINR), channel quality indicator (CQI)) indicative of a performance of an SIC procedure. The first wireless node may transmit the measurement reports according to a reporting configuration (e.g., periodically, aperiodically, semi-persistently), in response to requests from the control node, based on identified events (e.g., measured self-interference satisfying a threshold), or any combination thereof. Additionally, the first wireless node may be configured to request to disable the SIC procedure, adjust parameters associated with the SIC procedure, perform a different SIC procedure, or any combination thereof.

A method for wireless communication at a first wireless node is described. The method may include transmitting, to a control node, an indication of a capability of the first wireless node to perform one or more SIC procedures between a first antenna array of the first wireless node and a second antenna array of the first wireless node, receiving, from the control node in response to the indication of the capability, a configuration for the first wireless node to use to perform a SIC procedure of the one or more SIC procedures for full-duplex communications, and communicating, according to the received configuration, with the control node, a second wireless node, or any combination thereof, using the first antenna array and the second antenna array.

An apparatus for wireless communication at a first wireless node is described. The apparatus may include a processor, memory in electronic communication with the processor, and instructions stored in the memory. The instructions may be executable by the processor to cause the apparatus to transmit, to a control node, an indication of a capability of the first wireless node to perform one or more SIC procedures between a first antenna array of the first wireless node and a second antenna array of the first wireless node, receive, from the control node in response to the indication of the capability, a configuration for the first wireless node to use to perform a SIC procedure of the one or more SIC procedures for full-duplex communications, and communicate, according to the received configuration, with the control node, a second wireless node, or any combination thereof, using the first antenna array and the second antenna array.

Another apparatus for wireless communication at a first wireless node is described. The apparatus may include means for transmitting, to a control node, an indication of a capability of the first wireless node to perform one or more SIC procedures between a first antenna array of the first wireless node and a second antenna array of the first wireless node, means for receiving, from the control node in response to the indication of the capability, a configuration for the first wireless node to use to perform a SIC procedure of the one or more SIC procedures for full-duplex communications, and means for communicating, according to the received configuration, with the control node, a second wireless node, or any combination thereof, using the first antenna array and the second antenna array.

A non-transitory computer-readable medium storing code for wireless communication at a first wireless node is described. The code may include instructions executable by a processor to transmit, to a control node, an indication of a capability of the first wireless node to perform one or more SIC procedures between a first antenna array of the first wireless node and a second antenna array of the first wireless node, receive, from the control node in response to the indication of the capability, a configuration for the first wireless node to use to perform a SIC procedure of the one or more SIC procedures for full-duplex communications, and communicate, according to the received configuration, with the control node, a second wireless node, or any combination thereof, using the first antenna array and the second antenna array.

In some examples of the method, apparatuses, and non-transitory computer-readable medium described herein, communicating according to the received configuration may include operations, features, means, or instructions for transmitting one or more signals via the first antenna array for a time interval, receiving the one or more signals via the second antenna array for the time interval, and performing the SIC procedure on the one or more signals received via the second antenna array.

Some examples of the method, apparatuses, and non-transitory computer-readable medium described herein may further include operations, features, means, or instructions for transmitting, to the control node, an indication of a capability of the first wireless node to enable or disable the one or more SIC procedures, where the configuration may be further based on the capability to enable or disable the one or more SIC procedures.

Some examples of the method, apparatuses, and non-transitory computer-readable medium described herein may further include operations, features, means, or instructions for transmitting, to the control node, a set of parameters associated with the one or more SIC procedures, where the configuration indicates values for at least a subset of the set of parameters.

In some examples of the method, apparatuses, and non-transitory computer-readable medium described herein, the indication of the capability may be transmitted in radio resource control signaling or F1 application protocol (F1-AP) interface signaling.

Some examples of the method, apparatuses, and non-transitory computer-readable medium described herein may further include operations, features, means, or instructions for transmitting, to the control node, a measurement report including an indication of a set of self-interference measurements, where the configuration may be received based on the measurement report.

Some examples of the method, apparatuses, and non-transitory computer-readable medium described herein may further include operations, features, means, or instructions for transmitting, in the measurement report, an indication of a SIC procedure of the one or more SIC procedures that was performed for at least a subset of the set of self-interference measurements, where the configuration may be received based on the indication of the SIC procedure that was performed.

Some examples of the method, apparatuses, and non-transitory computer-readable medium described herein may further include operations, features, means, or instructions for identifying that at least one self-interference measurement of the set of self-interference measurements satisfies a self-interference threshold, where transmitting the measurement report may be based on identifying that the at least one self-interference measurement satisfies the self-interference threshold.

Some examples of the method, apparatuses, and non-transitory computer-readable medium described herein may further include operations, features, means, or instructions for receiving, from the control node, a reporting configuration for transmitting measurement reports associated with self-interference at the first wireless node, where the measurement report may be transmitted in accordance with the reporting configuration.

Some examples of the method, apparatuses, and non-transitory computer-readable medium described herein may further include operations, features, means, or instructions for receiving, from the control node, a request for the measurement report, where the measurement report may be transmitted in response to the request.

Some examples of the method, apparatuses, and non-transitory computer-readable medium described herein may further include operations, features, means, or instructions for transmitting, to the control node in the measurement report, a first subset of self-interference measurements of the set of self-interference measurements performed during a first portion of the time interval in which a SIC procedure of the set of SIC procedures was performed and transmitting, to the control node in the measurement report, a second subset of self-interference measurements of the set of self-interference measurements performed during a second portion of the time interval in which no SIC procedures were performed, where the configuration may be received based on the first subset of self-interference measurements, the second subset of self-interference measurements, or both.

In some examples of the method, apparatuses, and non-transitory computer-readable medium described herein, the set of self-interference measurements include a RSSI, a RSRP, a RSRQ, a SNR, a SINR, a CQI, or any combination thereof.

Some examples of the method, apparatuses, and non-transitory computer-readable medium described herein may further include operations, features, means, or instructions for transmitting, to the control node based on communicating according to the received configuration, a request to disable the SIC procedure associated with the configuration, to selectively modify one or more parameters of the SIC procedure associated with the configuration, to perform a different SIC procedure, or any combination thereof, receiving a second configuration at least in part in response to the transmitted request, and communicating according to the second configuration.

In some examples of the method, apparatuses, and non-transitory computer-readable medium described herein, the first wireless node includes a user equipment (UE) or a mobile termination (MT) node of an integrated access and backhaul (IAB) network, and the control node includes a base station, a donor unit (DU) of the IAB network, or a central unit (CU) of the IAB network.

A method for wireless communication at a control node is described. The method may include receiving, from a first wireless node, an indication of a capability of the first wireless node to perform one or more SIC procedures between a first antenna array of the first wireless node and a second antenna array of the first wireless node and transmitting, to the first wireless node in response to the indication of the capability, a configuration for the first wireless node to use to perform a SIC procedure of the one or more SIC procedures for full duplex communications.

An apparatus for wireless communication at a control node is described. The apparatus may include a processor, memory in electronic communication with the processor, and instructions stored in the memory. The instructions may be executable by the processor to cause the apparatus to receive, from a first wireless node, an indication of a capability of the first wireless node to perform one or more SIC procedures between a first antenna array of the first wireless node and a second antenna array of the first wireless node and transmit, to the first wireless node in response to the indication of the capability, a configuration for the first wireless node to use to perform a SIC procedure of the one or more SIC procedures for full duplex communications.

Another apparatus for wireless communication at a control node is described. The apparatus may include means for receiving, from a first wireless node, an indication of a capability of the first wireless node to perform one or more SIC procedures between a first antenna array of the first wireless node and a second antenna array of the first wireless node and means for transmitting, to the first wireless node in response to the indication of the capability, a configuration for the first wireless node to use to perform a SIC procedure of the one or more SIC procedures for full duplex communications.

A non-transitory computer-readable medium storing code for wireless communication at a control node is described. The code may include instructions executable by a processor to receive, from a first wireless node, an indication of a capability of the first wireless node to perform one or more SIC procedures between a first antenna array of the first wireless node and a second antenna array of the first wireless node and transmit, to the first wireless node in response to the indication of the capability, a configuration for the first wireless node to use to perform a SIC procedure of the one or more SIC procedures for full duplex communications.

Some examples of the method, apparatuses, and non-transitory computer-readable medium described herein may further include operations, features, means, or instructions for receiving, from the first wireless node, an indication of a capability of the first wireless node to enable or disable the one or more SIC procedures, where the configuration may be further based on the capability to enable or disable the one or more SIC procedures.

Some examples of the method, apparatuses, and non-transitory computer-readable medium described herein may further include operations, features, means, or instructions for receiving, from the first wireless node, a set of parameters associated with the one or more SIC procedures, where the configuration indicates values for at least a subset of the set of parameters.

In some examples of the method, apparatuses, and non-transitory computer-readable medium described herein, the indication of the capability may be received in radio resource control signaling or F1-AP interface signaling.

Some examples of the method, apparatuses, and non-transitory computer-readable medium described herein may further include operations, features, means, or instructions for receiving, from the first wireless node, a measurement report including an indication of a set of self-interference measurements, where the configuration may be transmitted based on the measurement report.

Some examples of the method, apparatuses, and non-transitory computer-readable medium described herein may further include operations, features, means, or instructions for receiving, in the measurement report, an indication of a SIC procedure of the one or more SIC procedures that was performed for at least a subset of the set of self-interference measurements, where the configuration may be transmitted based on the indication of the SIC procedure that was performed.

Some examples of the method, apparatuses, and non-transitory computer-readable medium described herein may further include operations, features, means, or instructions for transmitting, to the first wireless node, a reporting configuration for transmitting measurement reports associated with self-interference at the first wireless node, or both, where the measurement report may be received in accordance with the reporting configuration.

Some examples of the method, apparatuses, and non-transitory computer-readable medium described herein may further include operations, features, means, or instructions for transmitting, to the first wireless node, a request for the measurement report, where the measurement report may be received in response to the request.

Some examples of the method, apparatuses, and non-transitory computer-readable medium described herein may further include operations, features, means, or instructions for receiving, from the first wireless node in the measurement report, a first subset of self-interference measurements of the set of self-interference measurements performed during a first portion of the time interval in which a SIC procedure of the set of SIC procedures was performed and receiving, from the first wireless node via the measurement report, a second subset of self-interference measurements of the set of self-interference measurements performed during a second portion of the time interval in which no SIC procedures were performed, where the configuration may be transmitted based on the first subset of self-interference measurements, the second subset of self-interference measurements, or both.

In some examples of the method, apparatuses, and non-transitory computer-readable medium described herein, the set of self-interference measurements include a RSSI, a RSRP, a RSRQ, a SNR, a SINR, a CQI, or any combination thereof.

Some examples of the method, apparatuses, and non-transitory computer-readable medium described herein may further include operations, features, means, or instructions for receiving, from the first wireless node based on communicating according to the received configuration, a request to disable the SIC procedure associated with the configuration, to selectively modify one or more parameters of the SIC procedure associated with the configuration, to perform a different SIC procedure, or any combination thereof, transmitting a second configuration at least in part in response to the received request, and communicating with the first wireless node according to the second configuration.

In some examples of the method, apparatuses, and non-transitory computer-readable medium described herein, the first wireless node includes a UE, or an MT node of an IAB network, and the control node includes a base station, a DU of the IAB network, or a CU of the IAB network.

BRIEF DESCRIPTION OF THE DRAWINGS

FIGS. 4A-4F illustrate examples of wireless communications systems that support techniques for SIC in accordance with aspects of the present disclosure.

DETAILED DESCRIPTION

Figure 1:
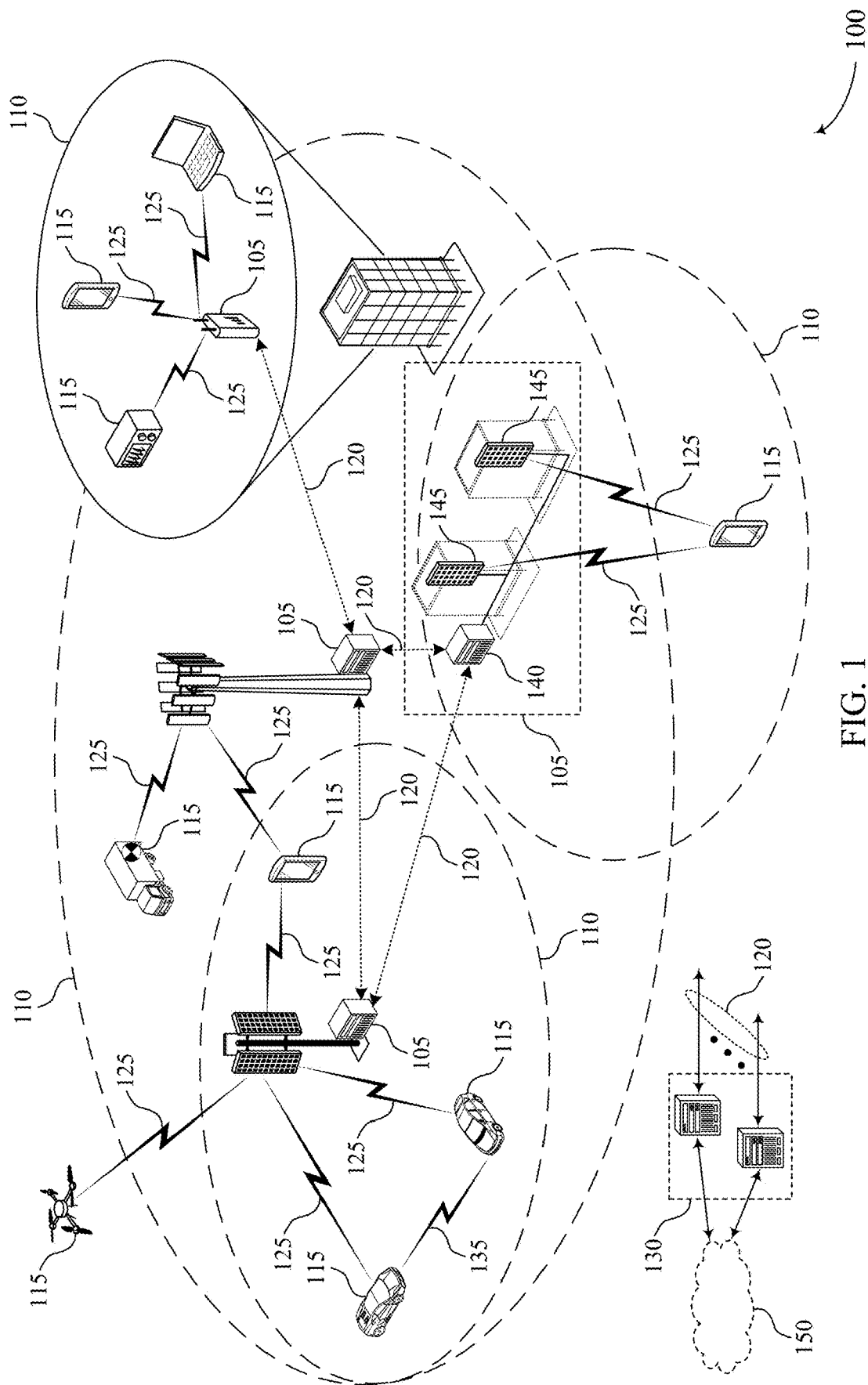
FIG. 1 illustrates an example of a wireless communications system that supports techniques for self-interference cancelation (SIC) in accordance with aspects of the present disclosure.

In some wireless communications systems, some wireless nodes (e.g., user equipments (UEs), or mobile terminal nodes of an integrated access and backhaul (IAB) network) may be configured to perform full-duplex communications. When carrying out full-duplex communications, a wireless node may be configured to transmit uplink signals and receive downlink signals concurrently (e.g., within the same slot), using common frequency bands, partially overlapping frequency bands, separate frequency bands, or any combination thereof. Full-duplex communications may reduce latency in wireless communications, and may lead to more efficient resource utilization. However, a wireless node may be susceptible to self-interference when carrying out full-duplex communications, which may reduce the efficiency and reliability of communications at the wireless node.

To mitigate self-interference, some wireless nodes may be configured to implement self-interference cancelation (SIC) procedures. With knowledge of SIC procedures supported by a wireless node, a network may be able to more efficiently configure wireless communications (e.g., full-duplex communications) at the wireless node. However, current wireless communications systems do not support signaling or other mechanisms for wireless nodes to indicate a capability to perform SIC procedures. Additionally, SIC procedures may be power-intensive and computationally expensive, and current techniques do not enable wireless nodes to selectively enable or disable SIC procedures. Furthermore, different SIC procedures may be more or less useful for use in certain scenarios or conditions, and current techniques do not support signaling which may enable a wireless node to selectively switch between SIC procedures.

Accordingly, techniques for reporting a capability to perform SIC procedures are disclosed. In particular, techniques described herein are directed to signaling which enables a wireless node to report a capability to perform one or more SIC procedures, to enable/disable SIC procedures, to switch between various SIC procedures, or any combination thereof. For example, a first wireless node may transmit a capability message to a control node indicating a capability of the first wireless node to perform one or more SIC procedures. In this example, the control node may transmit a configuration for performing an SIC procedure in response to the capability message, and the first wireless node may communicate according to the configuration. In this regard, the first wireless node may perform full-duplex communications while performing an SIC procedure indicated via the configuration.

In some aspects, the first wireless node may transmit measurement reports including measurements (e.g., dB interference suppression, received signal strength indicator (RSSI), reference signal received power (RSRP), reference signal received quality (RSRQ), signal-to-noise-plus-interference ratio (SINR), channel quality indicator (CQI)) indicative of a performance of an SIC procedure. The first wireless node may transmit the measurement reports according to a reporting configuration (e.g., periodically, aperiodically, semi-persistently), in response to requests from the control node, based on identified events (e.g., measured self-interference satisfying a threshold), or any combination thereof. Additionally, the first wireless node may be configured to request to disable the SIC procedure, adjust parameters associated with the SIC procedure, perform a different SIC procedure, or any combination thereof.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for SIC.

FIG. 1 illustrates an example of a wireless communications system 100 that supports techniques for SIC in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $\Delta f_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As noted previously herein, some wireless nodes (e.g., UEs, IAB nodes) may be configured to perform full-duplex communications. When carrying out full-duplex communications, a wireless node may be configured to transmit uplink signals and receive downlink signals concurrently (e.g., within the same slot), using common frequency bands, partially overlapping frequency bands, separate frequency bands, or any combination thereof. Full-duplex communications may reduce latency in wireless communications, and may lead to more efficient resource utilization.

However, in some cases, full-duplex communications may be hampered by self-interference. Self-interference may arise when a signal transmitted by a first antenna array (first antenna port) of a wireless node "leaks" into (e.g., is received by) a second antenna array (second antenna port) of the wireless node. For example, a signal transmitted by a first antenna array may be reflected by an object back to a second antenna array (clutter echo). In some cases, such as in higher frequency bands, spatial separation (e.g., spatial isolation) between antenna arrays (e.g., spatial separation between Tx antenna array and Rx antenna array) and/or transmit and receive beams (e.g., spatial separation between transmit beam and receive beam) of a wireless node may be sufficient to achieve desired link budgets and mitigate self-interference. Thus, some wireless nodes may be able to reduce self-interference with careful selection of antenna arrays and/or selection of Tx/Rx beams which are used for transmission and reception of signals for full-duplex communications. Moreover, some wireless nodes may be configured to reduce self-interference attributable to clutter echoes (e.g., clutter interference) through the formation of directional nulls. However, in other cases, a wireless node may be susceptible to self-interference when carrying out full-duplex communications (e.g., in cases with insufficient spatial separation), which may reduce the efficiency and reliability of communications at the wireless node.

The UEs 115 of the wireless communications system 100 may support techniques for reporting a capability to perform SIC procedures. In particular, techniques described herein are directed to signaling which enables a wireless node to report a capability to perform one or more SIC procedures, to enable/disable SIC procedures, to switch between various SIC procedures, or any combination thereof. In this regard, the UEs 115 and other wireless nodes of the wireless communications system 100 may be configured to perform self-interference measurements, and report capabilities to perform one or more SIC measurement procedures. By enabling wireless nodes (e.g., UEs 115, wireless nodes of an IAB network) to indicate capabilities to perform SIC procedures, the network (e.g., base stations 105) of the wireless communications system 100 may be able more efficiently configure wireless nodes with full-duplex communications, thereby improving the efficiency and reliability of wireless communications within the wireless communications system 100.

For example, a UE 115 (e.g., first wireless node) of the wireless communications system 100 may transmit, to a base station 105 (e.g., control node) an indication of a capability of the UE 115 to perform one or more SIC procedures. In this example, the base station 105 may transmit a configuration for performing an SIC procedure in response to the indicated capability, and the UE 115 may communicate according to the configuration. In this regard, the UE 115 may perform full-duplex communications while performing an SIC procedure indicated via the configuration.

For the purposes of the present disclosure, the term "SIC procedure" may be used to refer to any signaling technique, algorithm, equation, or other procedures which are employed to reduce (or eliminate) self-interference at a wireless node. For example, according to some example SIC procedures, a wireless node may be configured to perform channel estimation in order to estimate self-interference, generate a signal or waveform based on the estimates self-interference, and apply (e.g., multiplex) the generated signal/waveform to eliminate, reduce, cancel out, or otherwise mitigate the effects of the estimated self-interference. In some cases, SIC procedures may utilize equations (e.g., polynomial equations, sinusoidal equations) to perform channel estimation, to generate waveforms used to account for self-interference, or both. An SIC procedure may be analog SIC (e.g., using one or more analog components or techniques), or digital (e.g., using one or more digital components or techniques), or a combination of analog and digital.

In some aspects, the UE 115 (e.g., first wireless node) may transmit measurement reports including measurements (e.g., RSSI, RSRP, RSRQ, SINR, CQI) indicative of a performance of an SIC procedure. The UE 115 may transmit the measurement reports according to a reporting configuration (e.g., periodically, aperiodically, semi-persistently), and may receive the configuration indicating an SIC procedure which is to be performed in response to the measurement report. In some aspects, the UE 115 may transmit the measurement reports indicative of self-interference at the UE 115 in response to requests from the base station 105, based on identified events (e.g., measured self-interference satisfying a threshold), or any combination thereof. Additionally, the UE 115 may be configured to request to disable the SIC procedure, adjust parameters associated with the SIC procedure, perform a different SIC procedure, or any combination thereof.

Techniques described herein may enable wireless nodes (e.g., UEs 115, IAB nodes) to transmit self-interference measurement reports according to a reporting configuration and to indicate a capability to perform one or more SIC procedures. In particular, techniques described herein may enable a wireless node to report a capability to perform one or more SIC procedures, to enable/disable SIC procedures, to switch between various SIC procedures, or any combination thereof. By enabling wireless nodes to indicate a capability to support SIC procedures, techniques described herein may provide a network (e.g., control node, base station 105) with improved insight as to an expected performance of full-duplex communications which may be performed by the wireless node. In this regard, by providing improved insight as to an expected performance of full-duplex communications which may be performed by a wireless node, techniques described herein may enable the network to more efficiently configure wireless nodes with full-duplex communications, thereby improving the efficiency and reliability of wireless communications within the wireless communications system 100.

Figure 2:
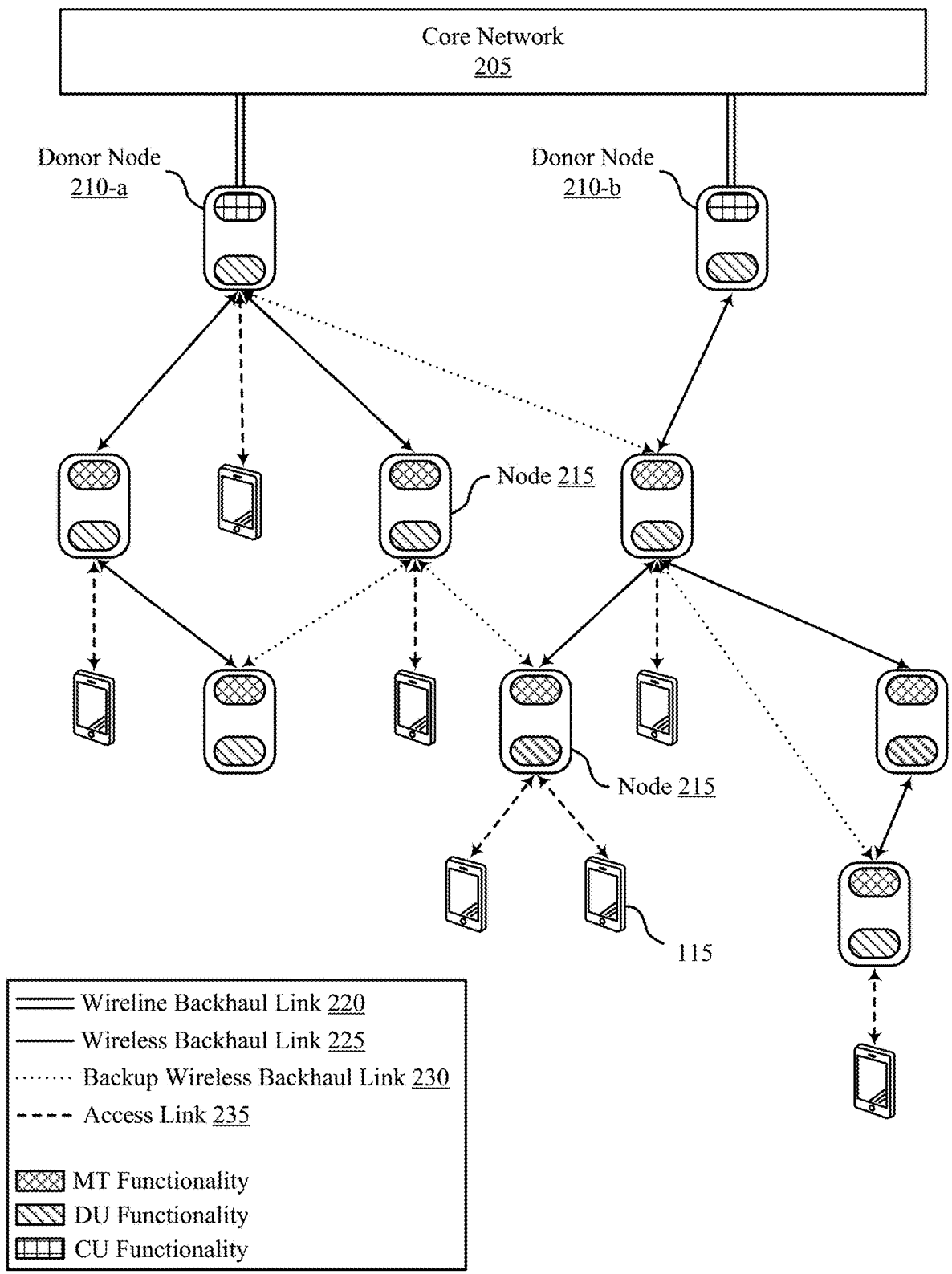
FIG. 2 illustrates an example of a wireless communications system that supports techniques for SIC in accordance with aspects of the present disclosure.

FIG. 2 illustrates an example of a wireless communications system 200 that supports techniques for SIC in accordance with aspects of the present disclosure. Wireless communications system 200 (e.g., a New Radio (NR) system, a millimeter wave (mmW) system) may supplement wireline backhaul connections (e.g., wireline backhaul links 220) by sharing infrastructure and spectral resources for network access with wireless backhaul link capabilities, providing an IAB network architecture. Wireless communications system 200 may include a core network 205 and one or more base stations or supported devices split into one or more support entities (i.e., functionalities) for promoting wireless backhaul density in collaboration with communication access. Aspects of the supporting functionalities of the base stations may be referred to as IAB nodes, such as IAB donor nodes 210 and IAB nodes 215. Wireless communications system 200 may additionally support a number of UEs 115, which may communicate on the uplink with one or more IAB donor nodes 210, IAB nodes 215, or a combination of these devices. In some examples, wireless communications system 200 may implement aspects of wireless communications system 100.

Wireless communications system 200 may include one or more IAB donor nodes 210, which may interface between one or more components in a wireline network and one or more components in a wireless network. In some cases, an IAB donor node 210 may be referred to as an anchor node, as the IAB donor node 210 anchors the wireless network to a wireline connection. For example, each IAB donor node 210 may include at least one wireline backhaul link 220 and one or more additional links (e.g., wireless backhaul links 225, backup wireless backhaul links 230, access links 235).

An IAB donor node 210 may be functionally split into associated base station central unit (CU) and distributed unit (DU) entities (or "functions"), where one or more DUs associated with an IAB donor node 210 may be partially controlled by an associated CU. CUs of IAB donor nodes 210 may host layer 3 (L3) (e.g., RRC, service data adaption protocol (SDAP), PDCP) functionality and signaling. Further, CUs of IAB donor nodes 210 may communicate with the core network 205 over a wireline backhaul link 220 (e.g., which may be referred to as an NG interface). DUs may host lower layer operations, such as layer 1 (L1) or layer 2 (L2) (e.g., RLC, MAC, physical layer) functionality and signaling. A DU entity of an IAB donor node 210 may support a serving cell within the network coverage area according to connections associated with wireless backhaul links 225 and access links 235 of the IAB network. DUs of the IAB donor nodes 210 may control both access and backhaul links within the corresponding network coverage and may provide controlling and scheduling for descendant (i.e., child, relay) IAB nodes 215 and or UEs 115. For example, a DU may support an RLC channel connection with a UE 115 (e.g., via an access link 235) or with an IAB node 215 (e.g., via a backhaul link, such as a primary wireless backhaul link 225 or a backup wireless backhaul link 230). A DU of an IAB node 215 may be responsible for relaying (e.g., transporting, forwarding) messages from another node (e.g., to a CU and/or the core network 205) so that the other node can register with the core network 205 and establish a secure radio resource control (RRC) connection with the CU of an IAB donor node 210.

IAB nodes 215 may, in some examples, be functionally split into associated mobile terminal (MT) and base station DU entities, where MT functionality of the IAB nodes 215 may be controlled or scheduled by antecedent (i.e., parent) IAB nodes via wireless backhaul links. A parent node to an IAB node 215 may be another (antecedent) IAB node 215 or an IAB donor node 210. The MT functionality may be similar to functionality performed by UEs 115 in the system. An IAB node 215 may not be directly connected to a wireline backhaul link 220. Instead, the IAB node 215 may connect to the core network 205 via other IAB nodes (e.g., any number of additional IAB nodes 215 and an IAB donor node 210) using wireless backhaul links. The IAB node 215 may transmit upstream (e.g., towards the core network 205) in the IAB system using MT functionality.

In some cases, DUs of the IAB nodes 215 may be partially controlled by signaling messages from CU entities of an associated IAB donor node 210 (e.g., transmitted via an F1-application protocol (F1-AP)). An F1-AP may include an interface for wireless communications between a CU (e.g., gNB-CU) and a DU (e.g., gNB-DU) of a wireless node (e.g., gNB, en-gNB) of an IAB network. The DUs of the IAB nodes 215 may support serving cells of the network coverage area. For example, a DU of an IAB node 215 may perform the same or similar functions as a DU of an IAB donor node 210, supporting one or more access links 235 for UEs 115, one or more wireless backhaul links for downstream IAB nodes 215, or both. In some examples, an IAB node 215 is a device, such as a base station or UE (e.g., a UE 115 may be an IAB node).

Wireless communications system 200 may employ relay chains for communications within the IAB network architecture. For example, a UE 115 may communicate with an IAB node, and the IAB node may relay the data to a base station CU or the core network 205 either directly or via one or more IAB nodes 215. Each IAB node 215 may include a primary wireless backhaul link 225 for relaying data upstream or receiving information from a base station CU or the core network 205. In some cases, an IAB node 215 may additionally include one or more backup wireless backhaul links 230 (e.g., for redundant connectivity or improved robustness). If the primary wireless backhaul link 225 fails (e.g., due to interference, malfunction at a connected IAB node, movement of IAB nodes, maintenance at IAB nodes), an IAB node 215 may use a backup wireless backhaul link 230 for backhaul communication within the IAB network. The first (e.g., primary) wireless backhaul link 225 may be associated with a coverage area and MT functionality may be controlled or scheduled by a first parent node. The one or more secondary backhaul links (e.g., backup wireless backhaul links 230) may be associated with a non-collocated coverage area and controlled or scheduled by one or more parent nodes.

Each of the primary backhaul connections and the one or more secondary connections may support spectral capabilities to provide network communication over one or more radio access technologies. The one or more IAB nodes may further support base station DU entities and may support multiple backhaul and access links within the relay chain. The DU entities may control or schedule descendant IAB nodes 215 and UEs 115 within the IAB network (e.g., downstream in the IAB network) via the configured backhaul and access links. That is, an IAB node 215 may act as a relay between an IAB donor node 210 and one or more descendant devices (e.g., other IAB nodes 215, UEs 115) in both communication directions based on established backhaul and access connections.

In some examples, an IAB node 215 may be a mobile IAB node (or other type of IAB node) that is capable of moving, for example, from one location to another. When an IAB node 215 changes locations, or for other reasons, it may be beneficial for the IAB node 215 to be handed over from a source IAB donor node (e.g., IAB donor node 210-a) to a target IAB node (e.g., IAB donor node 210-b) that is better suited to provide connectivity and access to the IAB node 215. As part of the handover process, context information for UEs served by the IAB node 215 may be communicated from the CU of the source IAB donor node 210-a to the CU of the target IAB donor node 210-b. But communicating context information between the CUs of different IAB donor nodes 210 may increase overhead signaling (e.g., handover signaling to all UEs connected to the IAB node 215), which may negatively impact system performance.

According to the techniques described herein, two nodes in a network, such as the source IAB donor node 210-a and the target IAB donor node 210-b, may share a unit, such as a CU, so that the transfer of context information between the two nodes, such as the two IAB donor nodes, is avoided when another node, such as an IAB node 215, is handed over from one of the two nodes to the other, such as the source IAB donor node 210-a to the target IAB donor node 210-b. Such a configuration may logically appear as a single IAB donor node where the CU is common and multiple DUs (one or more belonging to the source, one or more belonging to the target) are connected to the CU.

The shared unit may be dedicated to serving a first type of nodes, such as IAB nodes (e.g., mobile IAB nodes) and may be located separate (e.g., at a distributed server) from other units, such as the DUs of the IAB donor nodes 210. In addition to the shared unit, each IAB donor node 210 may also have a local unit, such as a local CU, that is configured to (e.g., dedicated to) serving a second type of node, such as an IAB node (e.g., immobile IAB nodes). To ensure that a node, such as an IAB node 215, connects to the appropriate unit, such as the appropriate CU, another node, such as an IAB donor node 210, may reference the service type associated with the node, such as the IAB node 215, which may be provided by the node, such as the IAB node 215, or the core network 205.

In some aspects, the techniques described herein in the context of UEs 115 and base stations 105 of wireless communications system 100 illustrated in FIG. 1 may additionally or alternatively be performed by wireless nodes of the wireless communications system 200 illustrated in FIG. 2. In this regard, UEs 115 and/or IAB nodes 215 of the wireless communications system 200 may be configured to transmit indications of capabilities to support one or more SIC procedures, receive configurations for the respective wireless nodes to perform SIC procedures in the context of full-duplex communications, and communicate (e.g., perform full-duplex communications with SIC procedure) according to the received configuration, as described in detail herein.

Figure 3:
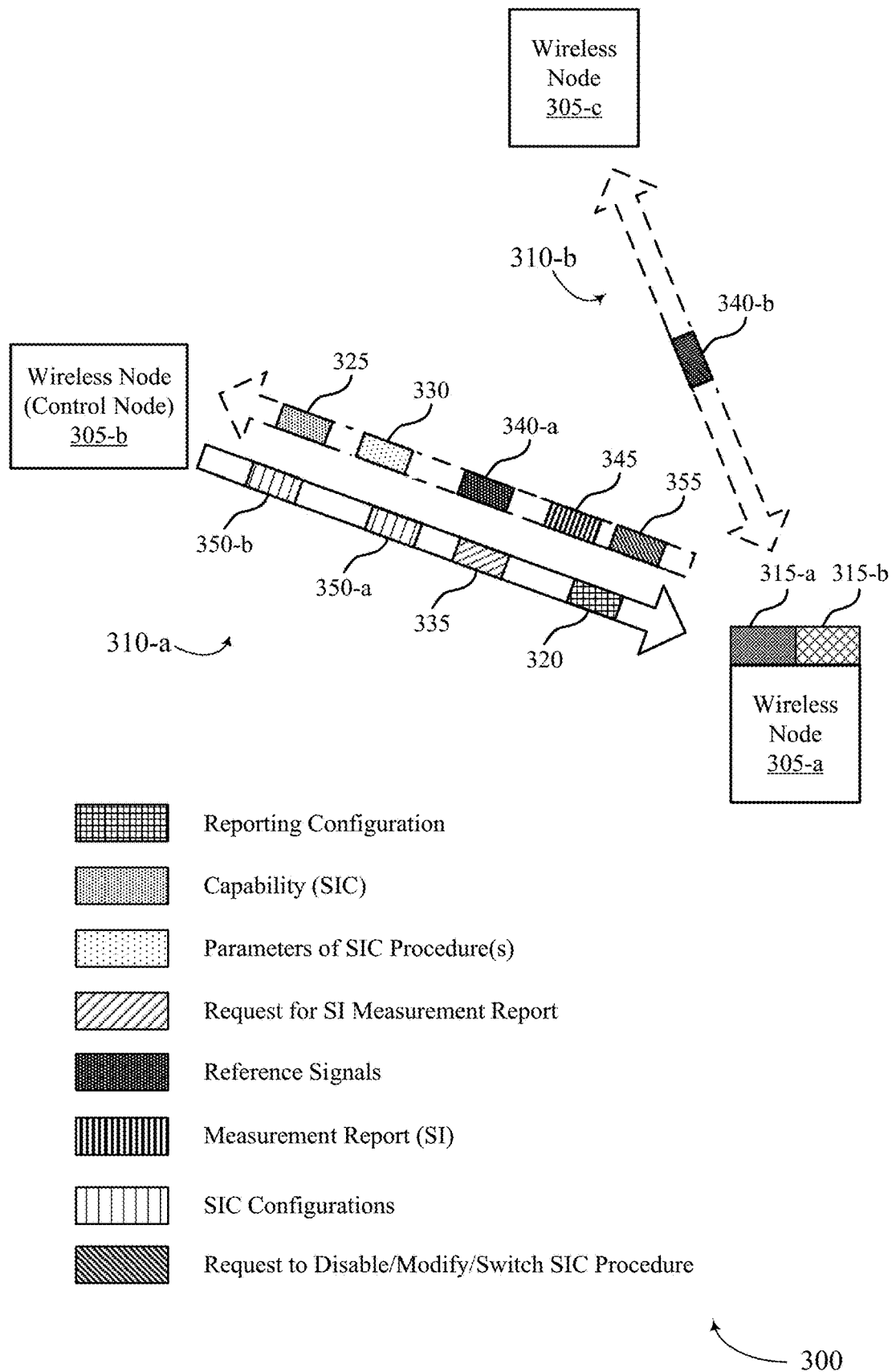
FIG. 3 illustrates an example of a wireless communications system that supports techniques for SIC in accordance with aspects of the present disclosure.

FIG. 3 illustrates an example of a wireless communications system 300 that supports techniques for SIC in accordance with aspects of the present disclosure. In some examples, aspects of wireless communications system 200 may implement, or be implemented by, aspects of wireless communications system 100, wireless communications system 200, or both.

The wireless communications system 300 may include a first wireless node 305-a, a second wireless node (e.g., control node 305-b), and a third wireless node 305-c, which may be examples of UEs 115, base stations 105, and IAB nodes 215 (e.g., IAB nodes) described with reference to FIGS. 1 and 2. For example, in some cases, the first wireless node 305-a may include a UE 115, and the control node 305-b and the third wireless node 305-c may include base stations 105. By way of another example, in additional or alternative cases, the first wireless node 305-a, the second wireless node 305-b, the third wireless node 305-c, or any combination thereof, may include wireless nodes (e.g., IAB node 215) of an IAB network. For instance, the first wireless node 305-a may include an MT node of an IAB network (e.g., wireless communications system 200), and the control node 305-b may include a DU and/or a CU of an IAB network.

The wireless nodes 305 of the wireless communications system 300 may communicate with one another via communication links 310. For example, the first wireless node 305-a may communicate with the control node 305-b via a communication link 310-a. Similarly, the first wireless node 305-a may communicate with the third wireless node 305-c via a communication link 310-b. The communication links 310-a, 310-b may include examples of an access link (e.g., Uu link), a link between nodes of an IAB network (e.g., wireless communications system 200), an F1 application protocol (F1-AP) communication link, a link between two UEs 115 (e.g., a sidelink communication link, or PC5 link), or any combination thereof. In this regard, the communication links 310-a, 310-b may include bi-directional links between the respective wireless nodes 305.

In some aspects, the first wireless node 305-a may be configured to carry out full-duplex communications. In some aspects, the first wireless node 305-a may include a first antenna array 315-a and a second antenna array 315-b which are configured to support full-duplex communications. In some cases, the first antenna array 315-a and the second antenna array 315-a may include different antenna arrays. In other cases, the first antenna array 315-a and the second antenna array 315-b may be the same (e.g., make up a single antenna array 315).

The wireless communications system 300 may support techniques for reporting a capability to perform SIC procedures (e.g., analog SIC, digital SIC, or a combination of analog and digital SIC). In particular, the wireless communications system 300 may support signaling which enables wireless nodes 305 (e.g., first wireless node 305-a) to report a capability to perform one or more SIC procedures, to enable/disable SIC procedures, to switch between various SIC procedures, or any combination thereof. In this regard, the wireless nodes 305 of the wireless communications system 300 may be configured to perform self-interference measurements, and report capabilities to perform one or more SIC measurement procedures. By enabling wireless nodes 305 (e.g., UEs 115, IAB nodes) to indicate capabilities to perform SIC procedures, the control node 305-b (e.g., base station 105) of the wireless communications system 300 may be able more efficiently configure wireless nodes 305 with full-duplex communications, thereby improving the efficiency and reliability of wireless communications within the wireless communications system 300.

For example, the first wireless node 305-a may receive an indication of a reporting configuration 320 associated with self-interference at the first wireless node 305-a. In particular, the reporting configuration 320 may include a reporting configuration 320 for transmitting measurement reports 345 associated with self-interference at the first wireless node 305-a. The reporting configuration 320 for reporting self-interference may be configured as part of a subscriber identity module (SIM) configuration associated with the first wireless node 305-*a*. In some aspects, the reporting configuration 320 may be indicated to the first wireless node 305-*a* via control signaling (e.g., RRC signaling). In additional or alternative cases, the first wireless node 305-*a* may be pre-configured with a reporting configuration 320 for self-interference at the first wireless node 305-*a*.

In some aspects, the reporting configuration 320 may include a set of parameters for measuring self-interference at the first wireless node 305-*a*, transmitting measurement reports 345 associated with self-interference, or both. Parameters associated with a reporting configuration 320 may include, but are not limited to, a frequency or periodicity at which the first wireless node 305-*a* is to transmit measurement reports 345 (e.g., periodically, aperiodically, semi-persistently, event-triggered, dynamically, on-demand), measurement thresholds for self-interference, types of self-interference measurements which are to be performed (e.g., dB interference suppression, RSSI, RSRP, RSRQ, SINR, CQI), time intervals in which self-interference measurements are to be performed, frequency ranges for performing self-interference measurements, beam pair identifiers (e.g., Tx/Rx beam IDs) for performing self-interference measurements, parameters for determining a priority for transmission of self-interference measurement reports 345, resources (e.g., time/frequency/spatial resources) for transmitting measurement reports 345, or any combination thereof.

For example, the first wireless node 305-*a* may receive (e.g., from the control node 305-*b*) an indication that measurement reports 345 associated with self-interference at the first wireless node 305-*a* are to be reported (e.g., transmitted) periodically, aperiodically, semi-persistently, dynamically, on-demand, or any combination thereof. In the case of semi-persistent self-interference reporting, the first wireless node 305-*a* may be configured to transmit measurement reports 345 for self-interference in response to medium access control-control element (MAC-CE) messages, downlink control information (DCI) messages, or other messages received from the control node 305-*b*. By way of another example, the control node 305-*b* may indicate other parameters associated with the reporting configuration 320 to the first wireless node 305-*a* including, but not limited to, a time interval for performing self-interference measurements, measurement thresholds for the self-interference measurements, parameters associated with a priority for transmitting self-interference measurement reports 345, or any combination thereof.

In some aspects, the reporting configuration 320 may configure the first wireless node 305-*a* with one or more sets of measurements which are to be performed. The one or more sets of measurements may be associated with measurement of self-interference while no SIC procedures are performed, and self-interference while one or more SIC procedures are performed. In particular, the reporting configuration 320 may configure the first wireless node 305-*a* with multiple measurement objects (e.g., (e.g., first measurement object with no SIC procedures, second measurement object with SIC procedures), with a single measurement object associated with two measurement reports 345 (e.g., first measurement report 345 with no SIC procedures, second measurement report 345 with SIC procedures), or any combination thereof.

In some aspects, the first wireless node 305-*a* may transmit, to the control node 305-*b*, an indication of a capability 325 of the first wireless node 305-*a* to perform one or more SIC procedures. In some aspects, the one or more SIC procedures may be performed by the first wireless node 305-*a* between the first antenna array 315-*a* of the first wireless node 305-*a* and the second antenna array 315-*b* of the first wireless node 305-*b*. The indication of the capability 325 to perform the SIC procedures may be transmitted via control signaling (e.g., RRC signaling, uplink control information (UCI)), capability signaling (e.g., capability reports), F1-AP interface signaling, or any combination thereof. In some aspects, the first wireless node 305-*a* may transmit the indication of the capability 325 based on receiving the reporting configuration 320.

One or both of the first antenna array 315-*a* and second antenna array 315-*b* may include a set of antenna ports or antenna elements, for example arranged in an M×N array or matrix formation, where M and N may be positive integers of 1 or greater (e.g., 1×4 array, 2×2 array, 2×4 array, and so on). In some examples one or more of the antenna ports or antenna elements may be shared between first antenna array 315-*a* and second antenna array 315-*b*. In some examples first antenna array 315-*a* and second antenna array 315-*b* may be arranged to point in different directions, for example at substantially 90 or 180 degrees relative to each other, or may be pointed physically in the same direction or in a same plane. The first antenna array 315-*a* and that second antenna array 315-*b* may be coupled to separate receive and/or transmit chains, or receive and/or transmit chains that share one or more components, such as radio frequency components or baseband processing components, between the receive and/or transmit chains.

In some cases, the wireless communications system 300 may be configured with a set of one or more standardized SIC procedures. In this regard, the first wireless node 305-*a* may indicate a capability 325 to support one or more SIC procedures included within the set of standardized SIC procedures. In such cases, the set of standardized SIC procedures may be associated with respective bit values, and may be identified with reference to a look-up-table including the set of SIC procedures. In this regard, the first wireless node 305-*a* may indicate a capability 325 to perform one or more SIC procedures included within a set of standardized SIC procedures via one or more bit values indicative of standardized SIC procedures included within a look-up-table.

In some aspects, the capability 325 may additionally or alternatively include an indication that the first wireless node 305-*a* is able to enable or disable the one or more SIC procedures supported by the first wireless node 305-*a*. In some cases, the first wireless node 305-*a* may transmit the indication of the capability 325 to enable or disable the SIC procedures based on receiving the reporting configuration 320. In some aspects, the indications of the capabilities to perform the one or more SIC procedures and to enable/disable the SIC procedures may be indicated within one or more transmissions. For example, in some cases, the first wireless node 305-*a* may transmit indications of a capability to perform the SIC procedures and a capability to enable/disable the SIC procedures within a single transmission (e.g., via a common capability report).

In some aspects, the first wireless node 305-*a* may transmit, to the control node 305-*b*, an set of parameters 330 associated with the one or more SIC procedures supported by the first wireless node 305-*a*. In this regard, the first wireless node 305-*a* may transmit the set of parameters 330 associated with the SIC procedures based on receiving the reporting configuration 320, transmitting the indication of the capability 325 to perform the SIC procedures and/or enable or disable the SIC procedures, or any combination thereof. Additionally or alternatively, the first wireless node 305-a may transmit (e.g., via capability 325, set of parameters 330, or both) an indication that the first wireless node 305-a is configured to selectively modify one or more parameters 330 associated with supported SIC procedures.

In some cases, the indications of the capability 325 (e.g., capability to perform SIC procedures, capability to enable/disable SIC procedures) and the indication of the set of parameters 330 may be indicated via one or more transmissions. For example, in some cases, the first wireless node 505-a may transmit the indication of the capability 325 to perform the SIC procedures, the capability 325 to enable/disable the SIC procedures, the indication of the set of parameters 330, or any combination thereof, via a single transmission (e.g., via a single capability report). Accordingly, the capability 325, the set of parameters 330, or both, may be transmitted via one or more control messages (e.g., RRC signaling, UCI, MAC-CE messages), capability reports, and the like.

In cases where the first wireless node 305-a supports multiple SIC procedures, the first wireless node 305-a may transmit multiple sets of parameters 330 associated with the respective SIC procedures (e.g., one set of parameters per SIC procedure). Parameters associated with the SIC procedures may include, but are not limited to, expected performance of the respective SIC procedures (e.g., expected dB self-interference suppression), maximum self-interference which may be suppressed, minimum self-interference to be suppressed, median self-interference to be suppressed, average self-interference which may be suppressed, coefficients for equations (e.g., polynomial equations, sinusoidal equations) associated with SIC procedures, coefficients for equations (e.g., polynomial equations, sinusoidal equations) associated with channel estimation procedures, channel types on which the SIC procedures may be performed, sets of resources on which the SIC procedures may be performed, and the like. Additional parameters associated with the SIC procedures may include transmit and/or receive powers at the first wireless node 305-a, transmit and/or receive beams used for SIC procedures (e.g., Tx/Rx identifiers), data rates, resource block allocations, guard bands for SIC procedures, metrics for time alignment between full-duplex transmissions on which SIC procedures may be performed, demodulation reference signal (DMRS) configurations, speed of SIC procedures, size of cyclic prefixes for SIC procedures, subcarrier spacing (SCS), power consumption for performing SIC procedures, or any combination thereof.

In cases where the wireless communications system 300 is configured with a set of standardized SIC procedures which may be included within a look-up table, various parameters associated with the respective standardized SIC procedures may also be included within one or more standardized SIC procedures. For example, for a selected standardized SIC procedure, ranges of parameters (e.g., ranges of values for parameters) associated with the selected standardized SIC procedure may be included within one or more look-up tables. In this example, the first wireless node 305-a may indicate a capability to perform the selected standardized SIC procedure, and may additionally indicate parameters 330 associated with the selected standardized SIC procedure via one or more bit values indicative of parameter ranges of the selected standardized SIC procedures included within the one or more look-up tables.

In some aspects, the first wireless node 305-a may receive, from the control node 305-b, a request 335 for a measurement report 345 associated with self-interference at the first wireless node 305-a. In some aspects, the request 335 for the measurement report 345 may be transmitted via a MAC-CE message, a DCI message, an RRC message, or any combination thereof. In some aspects, the first wireless node 305-a may receive the request 335 based on receiving the reporting configuration 320, transmitting the capability 325 to perform SIC procedures and/or enable or disable SIC procedures, transmitting the set of parameters 330 associated with the SIC procedures, or any combination thereof.

In some aspects, the first wireless node 305-a may transmit reference signals 340 via a first antenna array 315-a of the first wireless node 305-a. The first wireless node 305-a may be configured to transmit the reference signals 340 to the control node 305-b, the third wireless node 305-c, or both. For example, as shown in FIG. 3, the first wireless node 305-a may transmit reference signals 340-a to the control node 305-b, and may transmit reference signals 340-b to the third wireless node 305-c. Moreover, the first wireless node 305-a may be configured to transmit the reference signals 340 using one or more transmit beams. In some cases, the first wireless node 305-a may transmit the reference signals 340 while operating in a full-duplex mode of operation. The first wireless node 305-a may transmit the reference signals 340 based on receiving the reporting configuration 320, transmitting the capability 325 to perform SIC procedures and/or enable or disable SIC procedures, transmitting the set of parameters 330 associated with the SIC procedures, receiving the request 335 for the measurement report 345, or any combination thereof.

The reference signals 340 may include, but are not limited to, sounding reference signals (SRSs), CSI-RSs, synchronization signal blocks (SSBs), or any combination thereof. For example, in cases where the first wireless node 305-a includes a UE 115, the reference signals 340 may include SRSs. By way of another example, in cases where the first wireless node 305-a includes a wireless node of an IAB network (e.g., IAB node 215), the reference signals 340 may include CSI-RSs, SSBs, or both. The reference signals 340 of an SSB may be the SSB itself, a primary synchronization signal, a secondary synchronization signal, a DMRS of a physical broadcast channel (PBCH), or a combination thereof.

In some aspects, the first wireless node 305-a may receive the reference signals 340 transmitted via the first antenna array 315-a via the second antenna array 315-b of the first wireless node 305-a. In this regard, the first wireless node 305-a may receive the reference signals 340 via the second antenna array 315-b based on transmitting the reference signals 340 via the first antenna array 315-a. Additionally or alternatively, the first wireless node 305-a may receive the reference signals 340 based on receiving the reporting configuration 320, transmitting the capability 325 to perform SIC procedures and/or enable or disable the SIC procedures, transmitting the set of parameters 330 associated with the SIC procedures, receiving the request 335 for the measurement report 345, or any combination thereof.

The first wireless node 305-a may be configured to transmit the reference signals 340 to the control node 305-b, the third wireless node 305-c, or both. Similarly, the first wireless node 305-a may be configured to receive the reference signals 340 via the second antenna array 315-b within sets of resources which are used for receiving transmissions (e.g., downlink transmissions) from the control node 305-b, the third wireless node 305-c, or both. In this regard, the first wireless node 305-a may be configured to transmit and receive the reference signals 340 within sets of resources which are associated with full-duplex communications with the control node 305-*b*, the third wireless node 305-*c*, or both.

For example, in some cases, the first wireless node 305-*a* may transmit the reference signals 340-*a* via the first antenna array 315-*a* to a first TRP of the control node 305-*b*, and may receive the reference signals 340-*a* via the second antenna array 315-*b* within a set of resources for receiving signals from a second TRP of the control node 305-*b*. By way of another example, in other cases, the first wireless node 305-*a* may transmit the reference signals 340-*a* to the control node 305-*b*, and may receive the reference signals 340-*a* within a set of resources for receiving signals from the third wireless node 305-*c*. Conversely, in other cases, the first wireless node 305-*a* may transmit the reference signals 340-*b* to the third wireless node 305-*c*, and may receive the reference signals 340-*b* within a set of resources for receiving signals from the control node 305-*b*.

In some aspects, the first wireless node 305-*a* may be configured to transmit the reference signals 340 via the first antenna array 315-*a* using one or more candidate transmit beams, and may be configured to receive the reference signals 340 via the second antenna array 315-*b* using one or more candidate receive beams. In this regard, the first wireless node 305-*a* may be configured to transmit and receive the reference signals using one or more candidate beam pairs, where each candidate beam pair includes a candidate transmit beam and a candidate receive beam.

In some aspects, the first wireless node 305-*a* may perform a set of measurements (e.g., self-interference measurements) on the reference signals 340 received at the second antenna array 315-*b* of the first wireless node 305-*a*. In some aspects, the first wireless node 305-*a* may perform the set of self-interference measurements according to the reporting configuration 320 for self-interference at the first wireless node 305-*a*. In additional or alternative aspects, the first wireless node 305-*a* may perform the self-interference measurements based on transmitting the capability 325 to perform SIC procedures and/or enable or disable the SIC procedures, transmitting the set of parameters 330 associated with the SIC procedures, receiving the request 335 for the measurement report 345, transmitting the reference signals 340, receiving the reference signals 340, or any combination thereof.

In some aspects, the first wireless node 305-*a* may be configured to transmit/receive reference signals 340 and perform self-interference measurements in order to measure self-interference at the first wireless node 305-*a* which is experienced while SIC procedures are performed, while SIC procedures are not performed, or both. In this regard, the first wireless node 305-*a* may be configured to perform one or more SIC procedures during at least a portion of a time interval in which the reference signals 340 are transmitted and received. Moreover, the first wireless node 305-*a* may be configured to associate self-interference measurements with an SIC procedure (or lack thereof) which was performed during performance of the respective self-interference measurements.

For example, the first wireless node 305-*a* may be configured to transmit/receive reference signals 340 during a first time interval in which no SIC procedure is performed, transmit/receive reference signals 340 during a second time interval in which a first SIC procedure is performed, and transmit/receive reference signals 340 during a third time interval in which a second SIC procedure is performed. In this example, the first wireless node 305-*a* may be configured to compare self-interference measurements across the three time intervals in order to determine a relative effectiveness of the first SIC procedure and/or the second SIC procedure relative to each other, relative to instances in which no SIC procedures are performed, or both. For instance, the first wireless node 305-*a* may be configured to perform measurements to determine a level of self-interference suppression (e.g., dB self-interference suppression) which is achieved via the first SIC procedure, the second SIC procedure, or both.

The self-interference measurements may include any measurement which may be used to measure self-inference including, but not limited to, levels of self-interference suppression (e.g., dB self-interference suppression), RSSI measurements (e.g., SI-RSSI measurements), RSRP measurements (e.g., SI-RSRP measurements), RSRQ measurements (e.g., SI-RSRQ measurements), SINR measurements (e.g., SINR measurements, where interference in SINR includes self-interference), CQI measurements (e.g., CQI measurements, where interference in CQI includes self-interference), or any combination thereof. In some aspects, the first wireless node 305-*a* may be configured to associate self-interference measurements with corresponding candidate beam pairs which were used for transmission/reception of the reference signals 340 on which the respective measurements were performed.

The first wireless node 305-*a* may compare the self-interference measurements with one or more self-interference thresholds. In some aspects, the first wireless node 305-*a* may compare the self-interference measurements to one or more self-interference thresholds received from the control node 305-*b* via the reporting configuration 320.

In some aspects, the first wireless node 305-*a* may compare the self-interference measurements to one or more self-interference thresholds to determine whether one or more of the performed self-interference measurements satisfy the respective self-interference thresholds. Some self-interference measurements may be determined to satisfy a respective self-interference threshold if the self-interference measurement is greater than or equal to the respective self-interference threshold. For example, the first wireless node 305-*a* may be configured to determine that RSSI measurements, RSRP measurements, or both, satisfy respective self-interference thresholds if the RSSI measurements and/or RSRP measurements are greater than or equal to an RSSI threshold and an RSRP threshold, respectively (e.g., thresholds satisfied if RSSI≥Thresh$_{RSSI}$ and/or RSRP≥Thresh$_{RSRP}$). In this example, the first wireless node 305-*a* may be configured to identify that self-interference experienced at the first wireless node 305-*a* as a result of the reference signals is greater than or equal to some self-interference threshold based on the RSSI measurements and/or RSRP measurements satisfying the respective self-interference thresholds.

In some aspects, the first wireless node 305-*a* may transmit a measurement report 345 including an indication of self-interference for full-duplex communications at the first wireless node 305-*a*. In this regard, the measurement report 345 may include an indication of the self-interference measurements performed on the reference signals 340. The measurement report 345 may be transmitted via L1 signaling, L3 signaling, or both. In some aspects, the first wireless node 305-*a* may transmit the measurement report 345 in accordance with the reporting configuration 320. In this regard, the first wireless node 305-*a* may transmit the measurement report 345 based on receiving the reporting configuration 320, transmitting the capability 325 to perform SIC procedures and/or enable or disable SIC procedures, transmitting the set of parameters 330 associated with the SIC procedures, receiving the request 335 for the measurement report 345, transmitting the reference signals 340, receiving the reference signals 340, performing the self-interference measurements, comparing the self-interference measurements to self-interference thresholds, or any combination thereof.

For example, in cases where the reporting configuration 320 indicates that the first wireless node 305-a is to transmit self-interference measurement reports 345 periodically, aperiodically, and/or semi-persistently (e.g., responsive to MAC-CE messages, DCI messages), the first wireless node 305-a may transmit the measurement report 345 in accordance with the reporting configuration 320. By way of another example, the first wireless node 305-a may transmit the measurement report 345 responsive to the request 335.

By way of another example, the first wireless node 305-a may transmit the measurement report 345 based on identifying that one or more self-interference measurements performed satisfy one or more self-interference thresholds (e.g., event-triggered self-interference reporting). For instance, the first wireless node 305-a may transmit the measurement report 345 based on identifying that determined RSSI measurements and/or RSRP measurements satisfy respective thresholds (e.g., based on identifying RSSI≥$Thresh_{RSSI}$ and/or RSRP≥$Thresh_{RSRP}$). In this example, the one or more thresholds used to perform event-triggered self-interference reporting may be pre-configured at the first wireless node 305-a, signaled to the first wireless node 305-a via the reporting configuration 320, or both.

The measurement report 345 may include an indication of the self-interference measurements for the reference signals 340 (e.g., dB self-interference suppression, RSSI, RSRP, RSRQ, SINR, CQI). For example, the measurement report 345 may include an indication of an RSSI for the reference signals 340, an indication of an RSRP for the reference signals 340, an indication of an SINR for the reference signals 340, or any combination thereof. In some aspects, the measurement report 345 may include individual measurements performed at instances in time, statistics of measurements performed over some time interval (e.g., time interval indicated by the control node 305-b), or both. For example, in some cases, the measurement report 345 may include an indication of a maximum measurement (e.g., maximum RSSI measurement, maximum RSRP measurement, maximum SINR measurement) over a time interval, a minimum measurement (e.g., minimum RSSI measurement, minimum RSRP measurement, minimum SINR measurement) over the time interval, an average measurement (e.g., average RSSI measurement, average RSRP measurement, average SINR measurement) over the time interval, a percentage of self-interference measurements which satisfy a self-interference threshold over the time interval, or any combination thereof.

In some aspects, the measurement report 345 may include an indication of one or more SIC procedures which were performed for at least a subset of the set of self-interference measurements. The measurement report 345 may additionally include an indication of one or more parameters associated with the one or more SIC procedures which were performed. In particular, the first wireless node 305-a may report if and/or which SIC procedures were performed during performance of the self-interference measurements reported via the measurement report 345. By reporting self-interference measurements which may or may not be associated with SIC procedures, the control node 305-b may be configured to determine a relative effectiveness of the performed SIC procedures.

For example, the first wireless node 305-a may be configured to perform a first subset of self-interference measurements during a first time interval in which no SIC procedure is performed, a second subset of self-interference measurements during a second time interval in which a first SIC procedure is performed, and a third subset of self-interference measurements during a third time interval in which a second SIC procedure is performed. In this example, the measurement report 345 may include an indication of the respective subsets of self-interference which were performed during the respective time intervals. Additionally, the measurement report 345 may indicate that the first subset of self-interreference measurements are not associated with an SIC procedure, the second subset of self-interreference measurements are associated with the first SIC procedure, and the third subset of self-interreference measurements are associated with the second SIC procedure. In this regard, the measurement report 345 may indicate that no SIC procedure was performed during the first time interval, the first SIC procedure was performed during the second time interval, and the third SIC procedure was performed during the third time interval.

In some cases, the first wireless node 305-a may report self-interference measurements for only the SIC procedure (or not) which exhibits the best SIC performance. Additionally or alternatively, in cases where an absence of SIC procedures results in sufficient (or the best) self-interference measurements, the first wireless node 305-a may report only self-interference measurements which are not associated with a performed SIC procedure (e.g., self-interference measurements performed during a time in which no SIC procedures were performed).

In some aspects, the measurement report 345 may include indications of self-interference measurements performed for each candidate beam pair for which reference signals 340 were transmitted and received. In this regard, the measurement report 345 may include self-interference measurements on a per-beam pair basis. Moreover, the measurement report 345 may include indications of beam pairs associated with the self-interference measurements. For example, in cases where the first wireless node 305-a transmits and receives the reference signals 340 via a single beam pair (e.g., single transmit beam, single receive beam), the measurement report 345 may include a beam pair identifier associated with the beam pair. By way of another example, the first wireless node 305-a may transmit and receive the reference signals 340 via a set of beam pairs, where each beam pair includes a transmit beam and a receive beam. In this example, the measurement report 345 may include a set of beam pair identifiers associated with the set of beam pairs.

In some aspects, the first wireless node 305-a may receive a configuration 350-a for the first wireless node 305-a to use to perform an SIC procedure for full-duplex communications. In particular, the configuration 350-a may indicate an SIC procedure of the one or more SIC procedures which may be performed by the first wireless node 305-a, as indicated in the capability 325. In this regard, the first wireless node 305-a may receive the configuration 550-a in response to transmitting the capability 325 to perform the one or more SIC procedures.

In some aspects, the control node 305-a may configure (or refrain from configuring) the first wireless node 305-a for full-duplex communications based on the measured/expected self-interference at the first wireless node 305-a, based on a performance of the SIC procedures at the first wireless node 305-a, based on parameters associated with the full-duplex communications (e.g., quality-of-service (QoS)), or any combination thereof. For example, in cases where the measurement report 345 indicates relatively high levels of self-interference, relatively poor performance of the SIC procedures, or both, the control node 305-b may refrain from configuring the first wireless node 305-a for full-duplex communications. Conversely, in cases where the measurement report 345 indicates relatively low levels of self-interference, relatively high performance of the SIC procedures, or both, the control node 305-b may configure the first wireless node 305-a for full-duplex communications.

Additionally or alternatively, the first wireless node 305-a may receive the configuration 350-a based on receiving the reporting configuration 320, transmitting the set of parameters 330 associated with the SIC procedures, transmitting the capability 325 to enable/disable SIC procedures, receiving the request 335 for the measurement report 345, transmitting the reference signals 340, receiving the reference signals 340, performing the self-interference measurements, transmitting the measurement report 345, or any combination thereof. For example, in some cases, the first wireless node 305-a may receive the configuration 350-a in response to transmitting the measurement report 345. In particular, in cases where the measurement report 345 includes an indication of an SIC procedure which was performed for at least a subset of the self-interference measurements, the configuration 350-a may be received based on the indication of the SIC procedure which was performed (e.g., the configuration 350-a may indicate for the first wireless node 305-a to perform the indicated SIC procedure).

In some aspects, the configuration 350-a for performing an SIC procedure at the first wireless node 305-a may indicate one or more parameters associated with the indicated SIC procedure. For example, in cases where the first wireless node 305-a reports a set of parameters 330 associated with one or more SIC procedures, the configuration 350-a may indicate values for at least a subset of the set of parameters 330 indicated to the control node 305-b. Accordingly, the configuration 350-a may instruct the first wireless node 305-a to perform an SIC procedure supported by the first wireless node 305-a, and may indicate one or more parameters (e.g., values of parameters) associated with the selected SIC procedure which were indicated by the first wireless node 305-a via the indication of the set of parameters 330.

In some aspects, the first wireless node 305-a may communicate with the control node 305-b, the third wireless node 305-c, or both, according to the configuration 350-a. In this regard, the first wireless node 305-a may perform full-duplex communications with the control node 305-b and/or the third wireless node 305-c using the first antenna array 315-a and the second antenna array 315-b while performing the SIC procedure indicated by the configuration 350-a.

For example, the first wireless node 305-a may transmit one or more signals via the first antenna array 315-a to the control node 305-b, the third wireless node 305-c, or both, for a first time interval. The first wireless node 305-a may additionally receive the one or more signals via the second antenna array 315-b for the time interval. In this example, the first wireless node 305-a may perform the SIC procedure indicated by the configuration 350-a on the one or more signals received via the second antenna array 315-a. Accordingly, the first wireless node 305-a may be configured to perform full-duplex communications, and perform the SIC procedure indicated by the configuration 350-a to mitigate self-interference experienced at the first wireless node 305-a as a result of the full-duplex communications.

In some aspects, the first wireless node 305-a may transmit a request 355 to disable the SIC procedure associated with the configuration 350-a, to selectively modify one or more parameters of the SIC procedure associated with the configuration 350-a, to perform a different SIC procedure (e.g., switch SIC procedures), or any combination thereof. In some aspects, the first wireless node 305-a may transmit the request 355 to disable/modify/switch the SIC procedure based on communicating according to the configuration 350-a (e.g., performing full-duplex communications with the SIC procedure indicated by the configuration 350-a). In this regard, the first wireless node 305-a may transmit the request 355 at 570 based on receiving the configuration 350-a, communicating according to the configuration 350-a, or both.

In some aspects, the first wireless node 305-a may be configured to transmit the request 355 to disable/modify/switch the SIC procedure in cases where the SIC procedure is no longer necessary or useful, in cases where the first wireless node 305-a is unable to continue performing the SIC procedure, or both. For example, while communicating according to the configuration 350-a, the first wireless node 305-a may determine that self-interference experienced at the first wireless node 305-a is relatively low (e.g., measured self-interference is less than a self-interference threshold). Accordingly, the first wireless node 305-a may determine that the SIC procedure is no longer necessary or beneficial, and may therefore transmit the request 355 to disable the SIC procedure.

By way of another example, the first wireless node 305-a may identify a low power state (e.g., low battery state), and may transmit the request 355 in order to reduce (or eliminate) a power consumption at the first wireless node 305-a which is associated with the SIC procedure in an attempt to conserve power (e.g., conserve battery). By way of yet another example, while communicating according to the configuration 350-a, the first wireless node 305-a may identify one or more conditions or parameters which indicate that a different SIC procedure would be more effective. In this example, the first wireless node 305-a may transmit the request 355 to switch to the different SIC procedure based on the determination.

In some aspects, the first wireless node 305-a may receive a second configuration 350-b for the first wireless node 305-a for full-duplex communications. In some aspects, the first wireless node 305-a may receive the second configuration 350-b based on transmitting the request 355 to disable/modify/switch SIC procedures. In this regard, second configuration 350-b may (or may not) indicate a second SIC procedure, a modified SIC procedure, or both.

For example, in cases where the request 355 includes a request to disable the SIC procedure associated with the configuration 350-a, the second configuration 350-b may not include an indication of an SIC procedure, or may indicate that the first wireless node 305-a may disable the SIC procedure and/or refrain from performing SIC procedures. By way of another example, in cases where the request 355 includes a request to modify one or more parameters associated with the SIC procedure indicated via the configuration 350-a, the second configuration 350-b may include an indication of a modified SIC procedure based on the request 355. By way of yet another example, in cases where the request 355 includes a request to perform an additional SIC procedure which is different from the SIC procedure associated with the configuration 350-*a*, the second configuration 350-*b* may not include an indication of the additional SIC procedure.

Upon receiving the second configuration 350-*b*, the first wireless node 305-*a* may communicate with the control node 305-*b*, the third wireless node 305-*c*, or both, according to the second configuration 350-*b*. In this regard, the first wireless node 305-*a* may perform full-duplex communications with the control node 305-*b* and/or the third wireless node 305-*c* using the first antenna array 315-*a* and the second antenna array 315-*a* while performing the SIC procedure (if any) indicated by the second configuration 350-*b*.

Techniques described herein may enable the first wireless node 305-*a* (e.g., UE 115, IAB node) to transmit self-interference measurement reports according to a reporting configuration and to indicate a capability to perform one or more SIC procedures. In particular, techniques described herein may enable the first wireless node 305-*a* to report a capability to perform one or more SIC procedures, to enable/disable SIC procedures, to switch between various SIC procedures, or any combination thereof. By enabling the first wireless node 305-*a* to indicate a capability to support SIC procedures, techniques described herein may provide the control node 305-*b* with improved insight as to an expected performance of full-duplex communications which may be performed by the first wireless node 305-*a*. In this regard, by providing improved insight as to an expected performance of full-duplex communications which may be performed by the first wireless node 305-*a*, techniques described herein may enable the control node 305-*b* to more efficiently configure first wireless node 305-*a* with full-duplex communications, thereby improving the efficiency and reliability of wireless communications within a wireless communications system.

FIGS. 4A-4F illustrate examples of wireless communications systems 400-*a*-400-*f* that support techniques for SIC in accordance with aspects of the present disclosure. In some examples, wireless communications systems 400-*a* through 400-*f* may implement, or be implemented by, aspects of wireless communications system 100, 200, 300, or any combination thereof. In particular, the wireless communications systems 400-*a* through 400-*f* illustrate examples of full-duplex communications scenarios which may implement the signaling used to indicate capabilities to perform SIC procedures, as described herein.

Figure 4B:
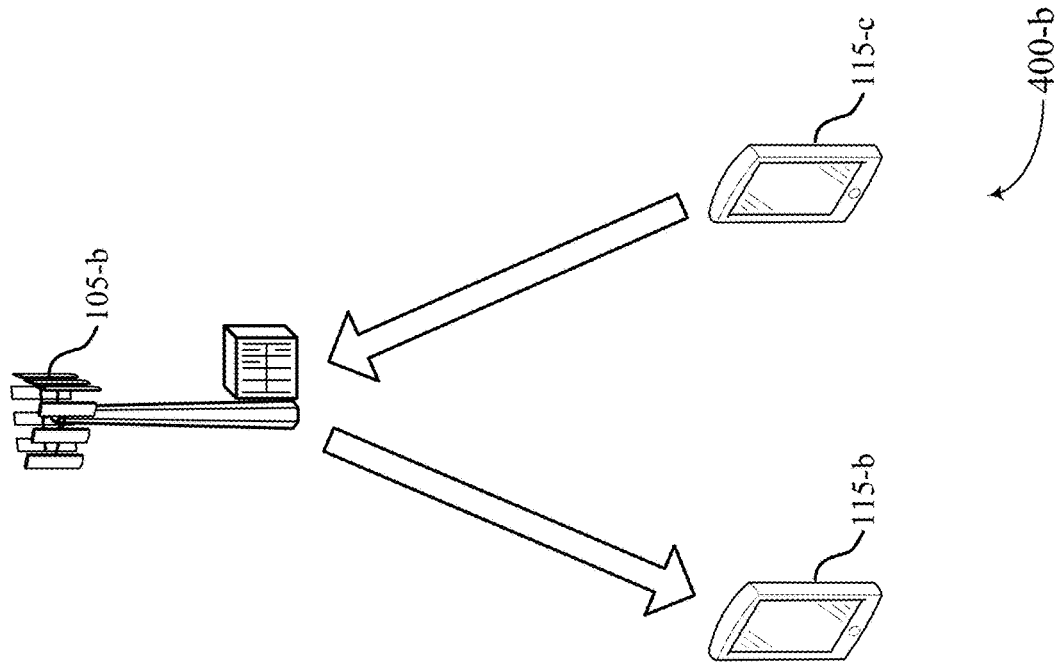
Figure 4A:
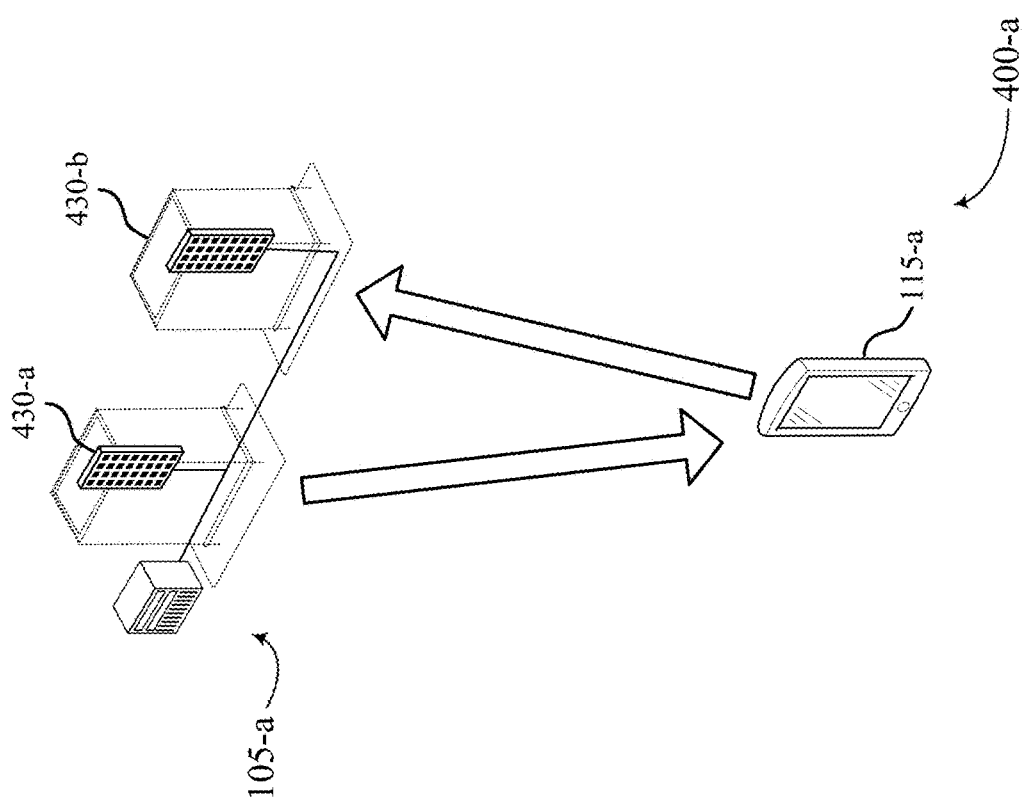

For example, the wireless communications system 400-*a* illustrated in FIG. 4A may include a UE 115-*a* and a base station 105-*a*. The UE 115-*a* may be configured to receive downlink transmissions from a first TRP 430-*a* of the base station 105-*a*, and may be configured to transmit uplink transmissions to a second TRP 430-*b* of the base station 105-*b*. In additional or alternative cases, the base station 105-*a* illustrated in FIG. 4A may also illustrate a DU of a wireless node of an IAB network including multiple TRPs 430, as described previously herein with respect to FIG. 2. Moreover, the UE 115-*a* illustrated in FIG. 4A may additionally or alternatively illustrate an MT node of an IAB network. In some cases, the UE 115-*a* may be configured to perform full-duplex communications by transmitting uplink transmissions to the second TRP 430-*b* and receiving downlink transmissions from the first TRP 430-*b*, where transmission of the uplink transmissions and reception of the downlink transmissions at least partially overlap in the time domain.

In some aspects, the SIC capability reporting techniques described in FIGS. 1-3 may additionally or alternatively be performed by the wireless devices of the wireless communications system 400-*a*. For example, the UE 115-*a* (or MT) of the wireless communications system 400-*a* may be configured to transmit an indication of a capability to perform SIC procedures associated with the full-duplex communications. The UEs 115-*a* (or MT) may then receive, from the base station 105-*a*, a configuration for performing an SIC procedure in response to the indicated capability.

In another example, wireless communications system 400-*b* illustrates a base station 105-*b* configured to perform full-duplex communications with a first UE 115-*a* (or first MT node) and a second UE 115-*c* (or second MT node). In particular, the base station 105-*b* of wireless communications system 400-*b* may be configured to perform full-duplex communications by transmitting downlink transmissions to the first UE 115-*b*, and receiving uplink transmissions from the second UE 115-*c*.

Referring now to FIG. 4C, the wireless communications system 400-*c* may include a UE 115-*d* and a base station 105-*c*. In this example, the UE 115-*d* and the base station 105-*c* may be configured to perform full-duplex communications by exchanging downlink transmissions and uplink transmissions with the other respective device. In this regard, the UE 115-*d* may be configured to perform self-interference measurements described herein by transmitting SRSs to the base station 105-*c* via a first antenna array, and receiving the transmitted SRSs via a second antenna array within a set of resources for receiving downlink transmissions from the base station 105-*c*. The UE 115-*d* may then transmit, to the base station 105-*d*, a measurement report indicative of the measured self-interference in accordance with the reporting configuration. In some aspects, the UE 115-*d* may transmit an indication of a capability to perform one or more SIC procedures associated with full-duplex communications at the UE 115-*d*. The UE 115-*d* may then receive, from the base station 105-*c*, a configuration for performing an SIC procedure based on the indicated capability, the self-interference measurement report, or both.

In another example, referring now to FIG. 4D, the wireless communications system 400-*d* may include an IAB node 405-*a* and an IAB node 405-*b*. In this example, the IAB node 405-*a* may include a CU 410-*a* and a DU 415-*a*, and the IAB node 405-*b* may include an MT 420-*a* and a DU 415-*b*. In this example, the IAB nodes 405 may be configured to perform full-duplex communications by exchanging downlink transmissions and uplink transmissions with the other respective device. In this regard, the IAB node 405-*b* may be configured to perform self-interference measurements described herein by transmitting reference signals (e.g., CSI-RS, SSB) to the IAB node 405-*a* via a first antenna array, and receiving the transmitted reference signals via a second antenna array within a set of resources for receiving downlink transmissions from the IAB node 405-*a*. The IAB node 405-*b* may then transmit, to the IAB node 405-*a*, a measurement report indicative of the measured self-interference in accordance with the reporting configuration. In some aspects, the IAB node 405-*b* may transmit an indication of a capability to perform SIC procedures associated with full-duplex communications at the IAB node 405-*b*. The IAB node 405-*b* may then receive, from the IAB node 405-*a*, a configuration for performing an SIC procedure based on the indicated capability, the self-interference measurement report, or both.

Figure 4F:
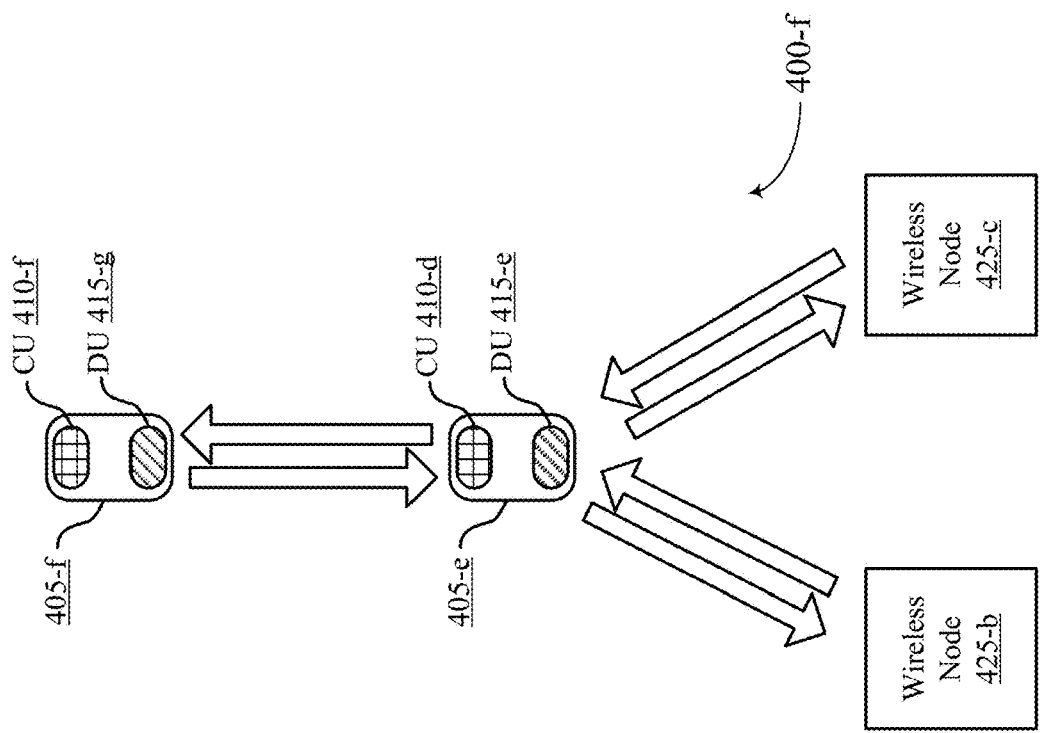
Figure 4E:
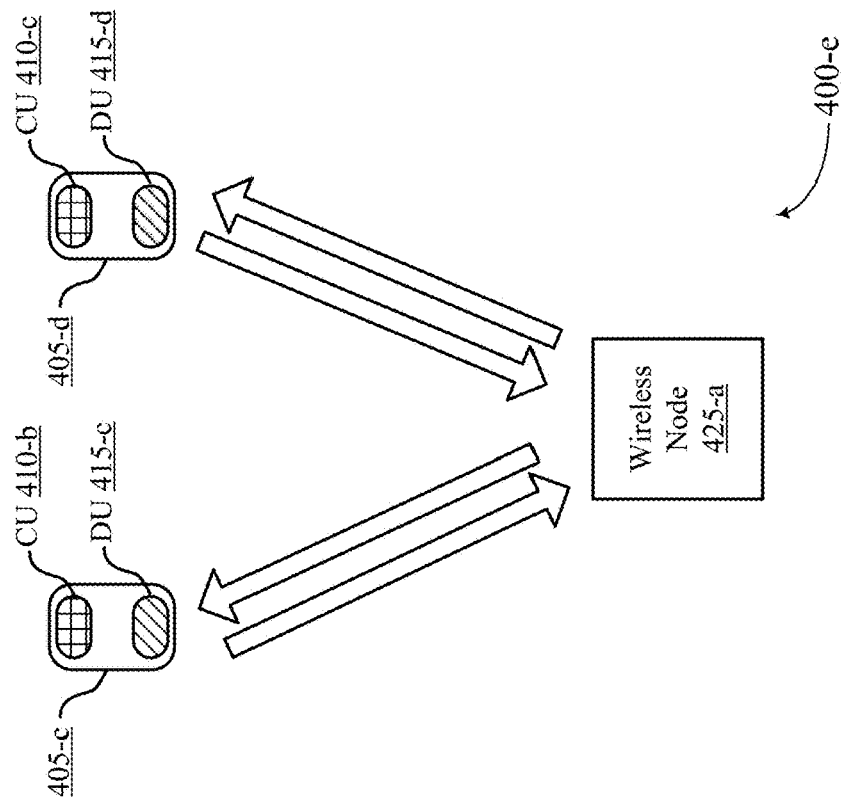

Referring now to FIG. 4E, the wireless communications system 400-*e* may include a wireless device 435-*a*, an IAB node 405-*c*, and an IAB node 405-*c*. The IAB node 405-*c* may include a CU 410-*b* and a DU 415-*c*, and the IAB node 405-*d* may include a CU 410-*c* and a DU 415-*d*. In some aspects, the wireless device 425-*a* may include a UE 115, a wireless node of an IAB network (e.g., another IAB node 405), and the like. In this example, the wireless device 435-*a* of the wireless communications system 400-*d* may be configured to perform full-duplex communications by exchanging downlink transmissions and uplink transmissions with the other respective devices. Moreover, in cases where the wireless device 425-*a* is in a dual-connectivity mode of operation, the wireless device 425-*a* may be configured to establish multiple wireless communications links with the IAB node 405-*c* and/or the IAB node 405-*c* within a common frequency band.

For example, the wireless device 425-*a* may be configured to perform full-duplex communications by transmitting uplink transmissions to the IAB node 405-*c* and receiving downlink transmissions from the IAB node 405-*d*. By way of another example, the wireless device 425-*a* may be configured to perform full-duplex communications by transmitting uplink transmissions to the IAB node 405-*d* and receiving downlink transmissions from the IAB node 405-*c*. In this regard, the UE 115-*d* may be configured to perform self-interference measurements, and transmit measurement reports indicative of measured self-interference to the IAB node 405-*c* and/or the IAB node 405-*d*, as described herein. The UE 115-*d* may additionally be configured to transmit an indication of a capability to perform one or more SIC procedures associated with full-duplex communications at the UE 115-*d*.

Referring now to FIG. 4F, the wireless communications system 400-*e* may include a wireless device 435-*b*, a wireless device 425-*c*, an IAB node 405-*e*, and an IAB node 405-*f*. The IAB node 405-*e* may include a CU 410-*d* and a DU 415-*e*, and the IAB node 405-*f* may include a CU 410-*f* and a DU 415-*f* In some aspects, the IAB node 405-*e* may be considered a parent node to the IAB node 405-*f*. Similarly, the IAB node 405-*f* may be considered a parent node to the wireless devices 425-*b* and 425-*c*. In some aspects, each of the devices of the wireless communications system 400-*f* may be configured to perform full-duplex communications by exchanging downlink transmissions and uplink transmissions with the other respective devices. Moreover, the wireless devices of the wireless communications system 400-*f* may be configured to transmit indications of a capability to perform SIC procedures, transmit self-interference measurement reports, or both, as described herein.

For example, the wireless devices 425-*b* and 425-*c* may be configured to perform full-duplex communications with the IAB node 405-*f*, perform self-interference measurements, and transmit measurement reports indicative of measured self-interference to the IAB node 405-*f* By way of another example, the IAB node 405-*f* may be configured to perform full-duplex communications with any of the wireless device 425-*b*, 425-*c*, IAB node 405-*e*, or any combination thereof. In this example, the IAB node 405-*f* may be configured to transmit, to the IAB node 405-*e*, an indication of a capability to perform SIC procedures. The IAB node 405-*f*, may additionally perform self-interference measurements, and transmit measurement reports indicative of measured self-interference to the IAB node 405-*e*. In this example, the IAB node 405-*f* may receive, from the IAB node 405-*e*, a configuration for performing an SIC procedure based on the reported configuration, the self-interference measurement report, or both.

Figure 5:
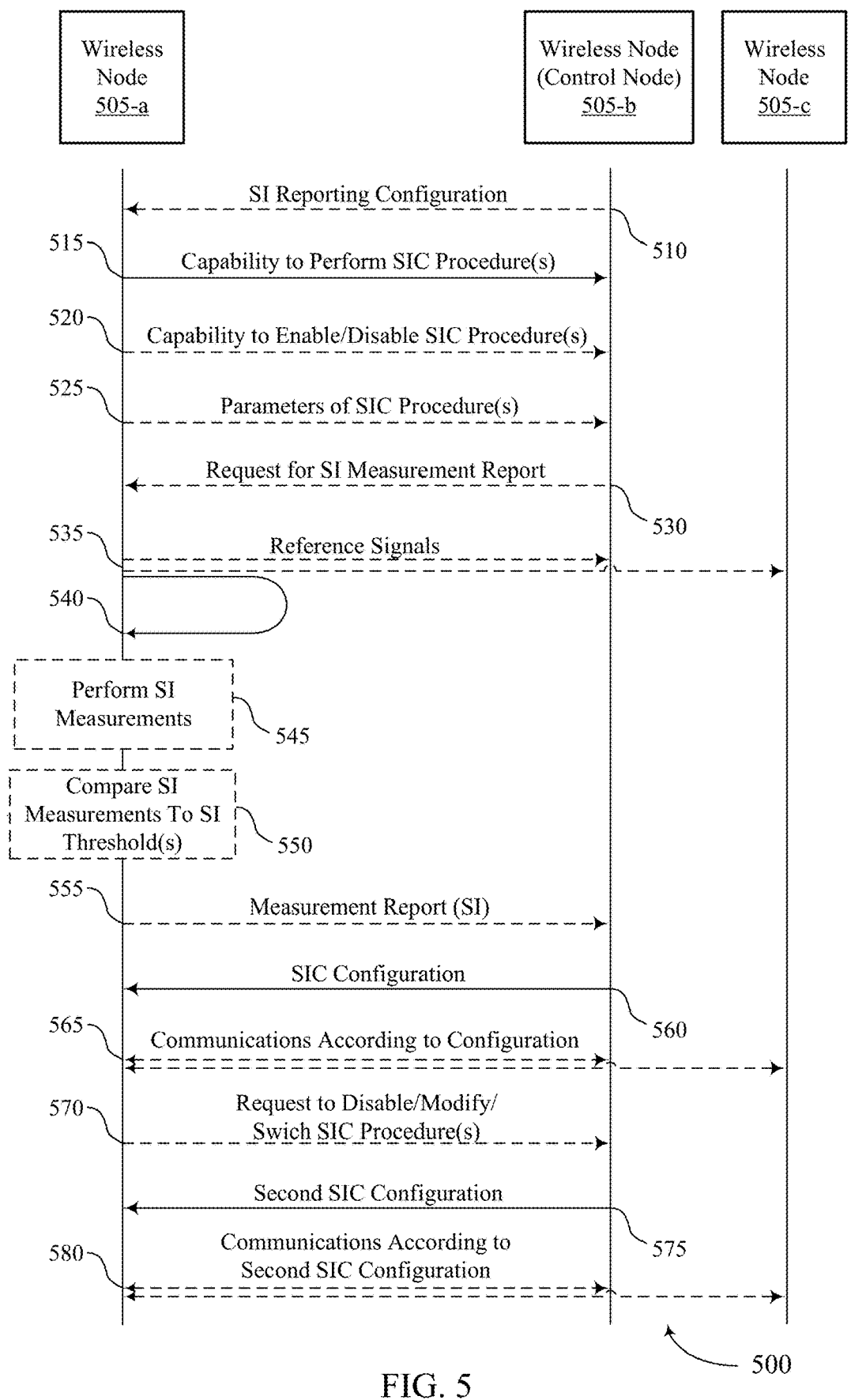
FIG. 5 illustrates an example of a process flow that supports techniques for SIC in accordance with aspects of the present disclosure.

FIG. 5 illustrates an example of a process flow 500 that supports techniques for SIC in accordance with aspects of the present disclosure. In some examples, process flow 500 may implement, or be implemented by, aspects of wireless communications systems 100, 200, 300, 400-*a*, 400-*b*, 400-*c*, 400-*d*, 400-*e*, 400-*f*, or any combination thereof. For example, the process flow 500 may illustrate a first wireless node 505-*a* transmitting an indication of a capability to perform SIC procedures, receiving a configuration for performing an SIC procedure, and communicating according to the received configuration, as described with reference to FIGS. 1-4F.

In some cases, process flow 500 may include a first wireless node 505-*a*, a second wireless node (e.g., control node 505-*b*), and a third wireless node 505-*c*, which may be examples of corresponding devices as described herein. In particular, the wireless nodes 505 illustrated in FIG. 5 may include UEs 115, base stations 105, and/or wireless nodes of an IAB network. For example, in some cases, the first wireless node 505-*a* may include a UE 115, where the control node 505-*b* and the third wireless node 505-*c* may include base stations 105. By way of another example, in additional or alternative cases, the first wireless node 505-*a*, the control node 505-*b*, the third wireless node 505-*c*, or any combination thereof, may include wireless nodes (e.g., IAB node 215) of an IAB network. For instance, the first wireless node 505-*a* may include an MT node of an IAB network (e.g., wireless communications system 200), and the control node 505-*b* may include a DU of an IAB network, a CU of an IAB network, or both.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 510, the first wireless node 505-*a* may receive an indication of a reporting configuration associated with self-interference at the first wireless node 505-*a*. In particular, the reporting configuration may include a reporting configuration for transmitting measurement reports associated with self-interference at the first wireless node 505-*a*. In some aspects, the reporting configuration may be indicated to the first wireless node 505-*a* via control signaling (e.g., RRC signaling). In additional or alternative cases, the first wireless node 505-*a* may be pre-configured with a reporting configuration for self-interference at the first wireless node 505-*a*.

In some aspects, the reporting configuration may include a set of parameters for measuring self-interference at the first wireless node 505-*a*, transmitting measurement reports associated with self-interference at the first wireless node 505-*a*, or both. Parameters associated with a reporting configuration may include, but are not limited to, a frequency or periodicity at which the first wireless node 505-*a* is to transmit measurement reports (e.g., periodically, aperiodically, semi-persistently, event-triggered), measurement thresholds for self-interference, types of self-interference measurements which are to be performed (e.g., RSSI, RSRP, RSRQ, SINR, CQI), time intervals in which self-interference measurements are to be performed, frequency ranges for performing self-interference measurements, beam pair identifiers (e.g., Tx/Rx beam IDs) for performing self-interference measurements, parameters for determining a priority for transmission of self-interference measurement reports, resources (e.g., time/frequency/spatial resources) for transmitting measurement reports, or any combination thereof.

For example, the first wireless node 505-*a* may receive (e.g., from the control node 505-*b*) an indication that measurement reports associated with self-interference at the first wireless node 505-*a* are to be reported (e.g., transmitted) periodically, aperiodically, semi-persistently, or any combination thereof. In the case of semi-persistent self-interference reporting, the first wireless node 505-*a* may be configured to transmit measurement reports for self-interference in response to MAC-CE messages, DCI messages, or other messages received from the control node 505-*b*. By way of another example, the control node 505-*b* may indicate other parameters associated with the reporting configuration to the first wireless node 505-*a* including, but not limited to, a time interval for performing self-interference measurements, measurement thresholds for the self-interference measurements, parameters associated with a priority for transmitting self-interference measurement reports, or any combination thereof.

At 515, the first wireless node 505-*a* may transmit, to the control node 505-*b*, an indication of a capability of the first wireless node 505-*a* to perform one or more SIC procedures. In some aspects, the one or more SIC procedures may be performed by the first wireless node 505-*a* between a first antenna array of the first wireless node 505-*a* and a second antenna array of the first wireless node 505-*a*. The indication of the capability to perform the SIC procedures may be transmitted via control signaling (e.g., RRC signaling, UCI), capability signaling (e.g., capability reports), F1-AP interface signaling, or any combination thereof. In some aspects, the first wireless node 505-*a* may transmit the indication of the capability at 515 based on receiving the reporting configuration at 510.

In some cases, a wireless communications system (e.g., wireless communications systems 100-400-*f*) may be configured with a set of one or more standardized SIC procedures. In this regard, the first wireless node 505-*a* may indicate a capability to support one or more SIC procedures included within the set of standardized SIC procedures. In such cases, the set of standardized SIC procedures may be associated with respective bit values, and may be identified with reference to a look-up-table including the set of SIC procedures. In this regard, the first wireless node 505-*a* may indicate a capability to perform one or more SIC procedures included within a set of standardized SIC procedures via one or more bit values indicative of standardized SIC procedures included within a look-up-table.

At 520, the first wireless node 505-*a* may transmit, to the control node 505-*b*, an indication of a capability of the first wireless node 505-*a* to enable or disable the one or more SIC procedures supported by the first wireless node 505-*a*. In this regard, the first wireless node 505-*a* may transmit the indication of the capability to enable or disable the SIC procedures at 520 based on receiving the reporting configuration at 510, transmitting the indication of the capability to perform the SIC procedures at 515, or any combination thereof. Additionally or alternatively, the first wireless node 505-*a* may transmit the capability to perform the SIC procedures and the capability to enable/disable the SIC procedures within one or more transmissions. For example, in some cases, the first wireless node 505-*a* may transmit the capability to perform the SIC procedures and the capability to enable/disable the SIC procedures within a single transmission (e.g., via a common capability report).

At 525, the first wireless node 505-*a* may transmit, to the control node 505-*b*, an set of parameters associated with the one or more SIC procedures supported by the first wireless node 505-*a*. In this regard, the first wireless node 505-*a* may transmit the set of parameters associated with the SIC procedures at 525 based on receiving the reporting configuration at 510, transmitting the indication of the capability to perform the SIC procedures at 515, or both. Additionally or alternatively, the first wireless node 505-*a* may transmit the indication of the capability to perform the SIC procedures, the capability to enable/disable SIC procedures, the set of parameters associated with the SIC procedures, or any combination thereof, via one or more transmissions. For example, in some cases, the first wireless node 505-*a* may transmit the indication of the capability to perform the SIC procedures, the capability to enable/disable SIC procedures, and the set of parameters associated with the SIC procedures via a single transmission (e.g., via a common capability report). In cases where the first wireless node 505-*a* supports multiple SIC procedures, the first wireless node 505-*a* may transmit multiple sets of parameters associated with the respective SIC procedures (e.g., one set of parameters per SIC procedure).

In cases where the wireless communications system is configured with a set of standardized SIC procedures which may be included within a look-up table, various parameters associated with the respective standardized SIC procedures may also be included within one or more standardized SIC procedures. For example, for a selected standardized SIC procedure, ranges of parameters associated with the selected standardized SIC procedure may be included within one or more look-up tables. In this example, the first wireless node 505-*a* may indicate a capability to perform the selected standardized SIC procedure, and may additionally indicate parameters associated with the selected standardized SIC procedure via one or more bit values indicative of parameter ranges of the selected standardized SIC procedures included within the one or more look-up tables.

At 530, the first wireless node 505-*a* may receive, from the control node 505-*b*, a request for a measurement report associated with self-interference at the first wireless node 505-*a*. In some aspects, the request for the measurement report may be transmitted via a MAC-CE message, a DCI message, an RRC message, or any combination thereof. In some aspects, the first wireless node 505-*a* may receive the request at 530 based on receiving the reporting configuration at 510, transmitting the capability to perform SIC procedures at 515, transmitting the capability to enable/disable SIC procedures at 520, transmitting the set of parameters associated with the SIC procedures at 525, or any combination thereof.

At 535, the first wireless node 505-*a* may transmit reference signals via a first antenna array of the first wireless node 505-*a*. The first wireless node 505-*a* may be configured to transmit the reference signals at 535 to the control node 505-*b*, the third wireless node 505-*c*, or both. Moreover, the first wireless node 505-*a* may be configured to transmit the reference signals using one or more transmit beams. In some cases, the first wireless node 505-*a* may transmit the reference signals at 535 while operating in a full-duplex mode of operation. The first wireless node 505-*a* may transmit the reference signals at 535 based on receiving the reporting configuration at 510, transmitting the capability to perform SIC procedures at 515, transmitting the capability to enable/disable SIC procedures at 520, transmitting the set of parameters associated with the SIC procedures at 525, receiving the request for the measurement report at 530, or any combination thereof.

The reference signals transmitted at 535 may include, but are not limited to, SRSs, CSI-RSs, SSB signals, or any combination thereof. For example, in cases where the first wireless node 505-*a* includes a UE 115, the reference signals may include SRSs. By way of another example, in cases where the first wireless node 505-*a* includes a wireless node an IAB network (e.g., IAB node 215), the reference signals may include CSI-RSs, SSB signals, or both.

At 540, the first wireless node 505-*a* may receive the reference signals transmitted at 535 via a second antenna array of the first wireless node 505-*a* which is different from the first antenna array. In this regard, the first wireless node 505-*a* may receive the reference signals at 540 based on transmitting the reference signals at 535. Additionally or alternatively, the first wireless node 505-*a* may receive the reference signals at 540 based on receiving the reporting configuration at 510, transmitting the capability to perform SIC procedures at 515, transmitting the capability to enable/disable SIC procedures at 520, transmitting the set of parameters associated with the SIC procedures at 525, receiving the request for the measurement report at 530, or any combination thereof.

As further discussed herein, the first wireless node 505-*a* may be configured to transmit the reference signals at 535 to the control node 505-*b*, the third wireless node 505-*c*, or both. Similarly, the first wireless node 505-*a* may be configured to receive the reference signals at 540 within sets of resources which are used for receiving transmissions (e.g., downlink transmissions) from the control node 505-*b*, the third wireless node 505-*c*, or both. In this regard, the first wireless node 505-*a* may be configured to transmit and receive the reference signals within sets of resources which are associated with full-duplex communications with the control node 505-*b*, the third wireless node 505-*c*, or both.

For example, in some cases, the first wireless node 505-*a* may transmit the reference signals at 535 to a first TRP of the control node 505-*b*, and may receive the reference signals at 540 within a set of resources for receiving signals from a second TRP of the control node 505-*b*. By way of another example, in other cases, the first wireless node 505-*a* may transmit the reference signals at 535 to the control node 505-*b*, and may receive the reference signals at 540 within a set of resources for receiving signals from the third wireless node 505-*c*. Conversely, in other cases, the first wireless node 505-*a* may transmit the reference signals at 535 to the third wireless node 505-*c*, and may receive the reference signals at 540 within a set of resources for receiving signals from the control node 505-*b*.

In some aspects, the first wireless node 505-*a* may be configured to transmit the reference signals at 535 using one or more candidate transmit beams, and may be configured to receive the reference signals at 540 using one or more candidate receive beams.

At 545, the first wireless node 505-*a* may perform a set of measurements (e.g., self-interference measurements) on the reference signals received at the second antenna array of the first wireless node 505-*a*. In some aspects, the first wireless node 505-*a* may perform the set of self-interference measurements according to the reporting configuration for self-interference at the first wireless node 505-*a* which was received at 510. In additional or alternative aspects, the first wireless node 505-*a* may perform the self-interference measurements based on receiving the reporting configuration at 510, transmitting the capability to perform SIC procedures at 515, transmitting the capability to enable/disable SIC procedures at 520, transmitting the set of parameters associated with the SIC procedures at 525, receiving the request for the measurement report at 530, transmitting the reference signals at 535, receiving the reference signals at 540, or any combination thereof.

In some aspects, the first wireless node 505-*a* may be configured to transmit/receive reference signals and perform self-interference measurements in order to measure self-interference at the first wireless node 505-*a* which is experienced while SIC procedures are performed, while SIC procedures are not performed, or both. In this regard, the first wireless node 505-*a* may be configured to perform one or more SIC procedures during at least a portion of a time interval in which the reference signals are transmitted and received. Moreover, the first wireless node 505-*a* may be configured to associate self-interference measurements with an SIC procedure (or lack thereof) which was performed during performance of the respective self-interference measurements.

For example, the first wireless node 505-*a* may be configured to transmit/receive reference signals during a first time interval in which no SIC procedure is performed, transmit/receive reference signals during a second time interval in which a first SIC procedure is performed, and transmit/receive reference signals during a third time interval in which a second SIC procedure is performed. In this example, the first wireless node 505-*a* may be configured to compare self-interference measurements across the three time intervals in order to determine a relative effectiveness of the first SIC procedure and/or the second SIC procedure relative to each other, relative to instances in which no SIC procedures are performed, or both.

The self-interference measurements performed at 530 may include any measurement which may be used to measure self-inference including, but not limited to, RSSI measurements (e.g., SI-RSSI measurements), RSRP measurements (e.g., SI-RSRP measurements), RSRQ measurements (e.g., SI-RSRQ measurements), SINR measurements (e.g., SINR measurements, where interference in SINR includes self-interference), CQI measurements (e.g., CQI measurements, where interference in CQI includes self-interference), or any combination thereof. In some aspects, the first wireless node 505-*a* may be configured to associate measurements performed at 545 with corresponding candidate beam pairs which were used for transmission/reception of the reference signals on which the respective measurements were performed.

At 550, the first wireless node 505-*a* may compare the self-interference measurements performed at 545 with one or more self-interference thresholds. In some aspects, the first wireless node 505-*a* may compare the self-interference measurements performed at 545 to one or more self-interference thresholds received from the control node 505-*b* via the reporting configuration at 510.

In some aspects, the first wireless node 505-*a* may compare the self-interference measurements to one or more self-interference thresholds to determine whether one or more of the performed self-interference measurements satisfy the respective self-interference thresholds. Some self-interference measurements may be determined to satisfy a respective self-interference threshold if the self-interference measurement is greater than or equal to the respective self-interference threshold. For example, the first wireless node 505-*a* may be configured to determine that RSSI measurements, RSRP measurements, or both, satisfy respective self-interference thresholds if the RSSI measurements and/or RSRP measurements are greater than or equal to an RSSI threshold and an RSRP threshold, respectively (e.g., thresholds satisfied if RSSI≥Thresh$_{RSSI}$ and/or RSRP≥Thresh$_{RSRP}$). In this example, the first wireless node 505-*a* may be configured to identify that self-interference experienced at the first wireless node 505-*a* as a result of the reference signals is greater than or equal to some self-interference threshold based on the RSSI measurements and/or RSRP measurements satisfying the respective self-interference thresholds.

At 555, the first wireless node 505-*a* may transmit a measurement report including an indication of self-interference for full-duplex communications at the first wireless node 505-*a*. In this regard, the measurement report may include an indication of the self-interference measurements performed at 545. The measurement report may be transmitted via L1 signaling, L3 signaling, or both. In some aspects, the first wireless node 505-*a* may transmit the measurement report in accordance with the reporting configuration received at 510. In this regard, the first wireless node 505-*a* may transmit the measurement report at 550 based on receiving the reporting configuration at 510, transmitting the capability to perform SIC procedures at 515, transmitting the capability to enable/disable SIC procedures at 520, transmitting the set of parameters associated with the SIC procedures at 525, receiving the request for the measurement report at 530, transmitting the reference signals at 535, receiving the reference signals at 540, performing the self-interference measurements at 545, comparing the self-interference measurements to self-interference thresholds at 550, or any combination thereof.

For example, in cases where the reporting configuration indicates that the first wireless node 505-*a* is to transmit self-interference measurement reports periodically, aperiodically, and/or semi-persistently (e.g., responsive to MAC-CE messages, DCI messages), the first wireless node 505-*a* may transmit the measurement report at 555 in accordance with the reporting configuration. By way of another example, the first wireless node 505-*a* may transmit the measurement report at 555 responsive to the request received at 530.

By way of another example, the first wireless node 505-*a* may transmit the measurement report at 555 based on identifying that one or more self-interference measurements performed at 545 satisfy one or more self-interference thresholds at 550 (e.g., event-triggered self-interference reporting). For instance, the first wireless node 505-*a* may transmit the measurement report at 555 based on identifying that determined RSSI measurements and/or RSRP measurements satisfy respective thresholds (e.g., based on identifying RSSI≥Thresh$_{RSSI}$ and/or RSRP≥Thresh$_{RSRP}$). In this example, the one or more thresholds used to perform event-triggered self-interference reporting may be pre-configured at the first wireless node 505-*a*, signaled to the first wireless node 505-*a* via the reporting configuration received at 510, or both.

The measurement report may include an indication of the measurements for the reference signals which were performed at 545. For example, the measurement report may include an indication of an RSSI for the reference signals, an indication of an RSRP for the reference signals, an indication of an SINR for the reference signals, or any combination thereof. In some aspects, the measurement report may include individual measurements performed at instances in time, statistics of measurements performed over some time interval (e.g., time interval indicated by the control node 505-*b*), or both. For example, in some cases, the measurement report may include an indication of a maximum measurement (e.g., maximum RSSI measurement, maximum RSRP measurement, maximum SINR measurement) over a time interval, a minimum measurement (e.g., minimum RSSI measurement, minimum RSRP measurement, minimum SINR measurement) over the time interval, an average measurement (e.g., average RSSI measurement, average RSRP measurement, average SINR measurement) over the time interval, a percentage of self-interference measurements which satisfy a self-interference threshold over the time interval, or any combination thereof.

In some aspects, the measurement report may include an indication of one or more SIC procedures which were performed for at least a subset of the set of self-interference measurements. In particular, the first wireless node 505-*a* may report if and/or which SIC procedures were performed during performance of the self-interference measurements reported via the measurement report. By reporting self-interference measurements which may or may not be associated with SIC procedures, the control node 505-*b* may be configured to determine a relative effectiveness of the performed SIC procedures.

For example, the first wireless node 505-*a* may be configured to perform a first subset of self-interference measurements during a first time interval in which no SIC procedure is performed, a second subset of self-interference measurements during a second time interval in which a first SIC procedure is performed, and a third subset of self-interference measurements during a third time interval in which a second SIC procedure is performed. In this example, the measurement report may include an indication of the respective subsets of self-interference which were performed during the respective time intervals. Additionally, the measurement report may indicate that the first subset of self-interreference measurements are not associated with an SIC procedure, the second subset of self-interreference measurements are associated with the first SIC procedure, and the third subset of self-interreference measurements are associated with the second SIC procedure. In this regard, the measurement report may indicate that no SIC procedure was performed during the first time interval, the first SIC procedure was performed during the second time interval, and the third SIC procedure was performed during the third time interval.

In some aspects, the measurement report may include indications of self-interference measurements performed for each candidate beam pair for which reference signals were transmitted and received. In this regard, the measurement report may include self-interference measurements on a per-beam pair basis. Moreover, the measurement report may include indications of beam pairs associated with the self-interference measurements. For example, in cases where the first wireless node 505-*a* transmits and receives the reference signals at 535 and 540 via a single beam pair (e.g., single transmit beam, single receive beam), the measurement report may include a beam pair identifier associated with the beam pair. By way of another example, the first wireless node 505-*a* may transmit and receive the reference signals at 535 and 540 via a set of beam pairs, where each beam pair includes a transmit beam and a receive beam. In this example, the measurement report may include a set of beam pair identifiers associated with the set of beam pairs.

At 560, the first wireless node 505-*a* may receive a configuration for the first wireless node 505-*a* to use to perform an SIC procedure for full-duplex communications. In particular, the configuration may indicate an SIC procedure of the one or more SIC procedures which may be performed by the first wireless node 505-*a*, as indicated in the capability signaled at 515. In this regard, the first wireless node 505-*a* may receive the configuration at 560 in response to transmitting the capability to perform the one or more SIC procedures at 515.

Additionally or alternatively, the first wireless node 505-*a* may receive the capability at 560 based on receiving the reporting configuration at 510, transmitting the capability to enable/disable SIC procedures at 520, transmitting the set of parameters associated with the SIC procedures at 525, receiving the request for the measurement report at 530, transmitting the reference signals at 535, receiving the reference signals at 540, performing the self-interference measurements at 545, transmitting the measurement report at 555, or any combination thereof. For example, in some cases, the first wireless node 505-*a* may receive the configuration in response to transmitting the measurement report. In particular, in cases where the measurement report includes an indication of an SIC procedure which was performed for at least a subset of the self-interference measurements, the configuration may be received at 560 based on the indication of the SIC procedure which was performed (e.g., the configuration may indicate for the first wireless node 505-*a* to perform the indicated SIC procedure).

In some aspects, the configuration for performing an SIC procedure at the first wireless node 505-*a* which is received at 560 may indicate one or more parameters associated with the indicated SIC procedure. For example, in cases where the first wireless node 505-*a* reports a set of parameters associated with one or more SIC procedures at 525, the configuration may indicate values for at least a subset of the set of parameters indicated to the control node 505-*b* at 525. Accordingly, the configuration may instruct the first wireless node 505-*a* to perform an SIC procedure supported by the first wireless node 505-*a*, and may indicate one or more parameters (e.g., values of parameters) associated with the selected SIC procedure which were indicated by the first wireless node 505-*a*.

At 565, the first wireless node 505-*a* may communicate with the control node 505-*b*, the third wireless node 505-*c*, or both, according to the configuration received at 565. In this regard, the first wireless node 505-*a* may perform full-duplex communications with the control node 505-*b* and/or the third wireless node 505-*c* using the first antenna array and the second antenna array while performing the SIC procedure indicated by the configuration.

For example, the first wireless node 505-*a* may transmit one or more signals via the first antenna array to the control node 505-*b*, the third wireless node 505-*c*, or both, for a first time interval. The first wireless node 505-*a* may additionally receive the one or more signals via the second antenna array for the time interval. In this example, the first wireless node 505-*a* may perform the SIC procedure indicated by the configuration on the one or more signals received via the second antenna array. Accordingly, the first wireless node 505-*a* may be configured to perform full-duplex communications, and perform the SIC procedure indicated by the configuration to mitigate self-interference experienced at the first wireless node 505-*a* as a result of the full-duplex communications.

At 570, the first wireless node 505-*a* may transmit a request to disable the SIC procedure associated with the configuration received at 565, to selectively modify one or more parameters of the SIC procedure associated with the configuration, to perform a different SIC procedure (e.g., switch SIC procedures), or any combination thereof. In some aspects, the first wireless node 505-*a* may transmit the request to disable/modify/switch the SIC procedure based on communicating according to the configuration at 565 (e.g., performing full-duplex communications with the SIC procedure indicated by the configuration). In this regard, the first wireless node 505-*a* may transmit the request at 570 based on receiving the configuration at 560, communicating according to the configuration at 565, or both.

In some aspects, the first wireless node 505-*a* may be configured to transmit the request to disable/modify/switch the SIC procedure at 570 in cases where the SIC procedure is no longer necessary or useful, in cases where the first wireless node 505-*a* is unable to continue performing the SIC procedure, or both. For example, while communicating according to the configuration at 565, the first wireless node 505-*a* may determine that self-interference experienced at the first wireless node 505-*a* is relatively low (e.g., measured self-interference is less than a self-interference threshold). Accordingly, the first wireless node 505-*a* may determine that the SIC procedure is no longer necessary or beneficial, and may therefore transmit the request at 570 to disable the SIC procedure.

By way of another example, the first wireless node 505-*a* may identify a low power state (e.g., low battery state), and may transmit the request at 570 in order to reduce (or eliminate) a power consumption at the first wireless node 505-*a* which is associated with the SIC procedure in an attempt to conserve power (e.g., conserve battery). By way of yet another example, while communicating according to the configuration at 565, the first wireless node 505-*a* may identify one or more conditions or parameters which indicate that a different SIC procedure would be more effective. In this example, the first wireless node 505-*a* may transmit the request to switch to the different SIC procedure based on the determination.

At 575, the first wireless node 505-*a* may receive a second configuration for the first wireless node 505-*a* for full-duplex communications. In some aspects, the first wireless node 505-*a* may receive the second configuration based on transmitting the request to disable/modify/switch SIC procedures at 570. In this regard, second configuration may (or may not) indicate a second SIC procedure, a modified SIC procedure, or both.

For example, in cases where the request at 570 includes a request to disable the SIC procedure associated with the configuration received at 560, the second configuration received at 575 may not include an indication of an SIC procedure, or may indicate that the first wireless node 505-*a* may disable the SIC procedure and/or refrain from performing SIC procedures. By way of another example, in cases where the request at 570 includes a request to modify one or more parameters associated with the SIC procedure indicated via the configuration received at 560, the second configuration received at 575 may include an indication of a modified SIC procedure based on the request. By way of yet another example, in cases where the request at 570 includes a request to perform an additional SIC procedure which is different from the SIC procedure associated with the configuration received at 560, the second configuration received at 575 may not include an indication of the additional SIC procedure.

At 580, the first wireless node 505-*a* may communicate with the control node 505-*b*, the third wireless node 505-*c*, or both, according to the second configuration received at 575. In this regard, the first wireless node 505-*a* may perform full-duplex communications with the control node 505-*b* and/or the third wireless node 505-*c* using the first antenna array and the second antenna array while performing the SIC procedure (if any) indicated by the second configuration.

Techniques described herein may enable the first wireless node 505-*a* (e.g., UE 115, IAB node) to transmit self-interference measurement reports according to a reporting configuration and to indicate a capability to perform one or more SIC procedures. In particular, techniques described herein may enable the first wireless node 505-*a* to report a capability to perform one or more SIC procedures, to enable/disable SIC procedures, to switch between various SIC procedures, or any combination thereof. By enabling the first wireless node 505-*a* to indicate a capability to support SIC procedures, techniques described herein may provide the control node 505-*b* with improved insight as to an expected performance of full-duplex communications which may be performed by the first wireless node 505-*a*. In this regard, by providing improved insight as to an expected performance of full-duplex communications which may be performed by the first wireless node 505-*a*, techniques described herein may enable the control node 505-*b* to more efficiently configure first wireless node 505-*a* with full-duplex communications, thereby improving the efficiency and reliability of wireless communications within a wireless communications system.

Figure 6:
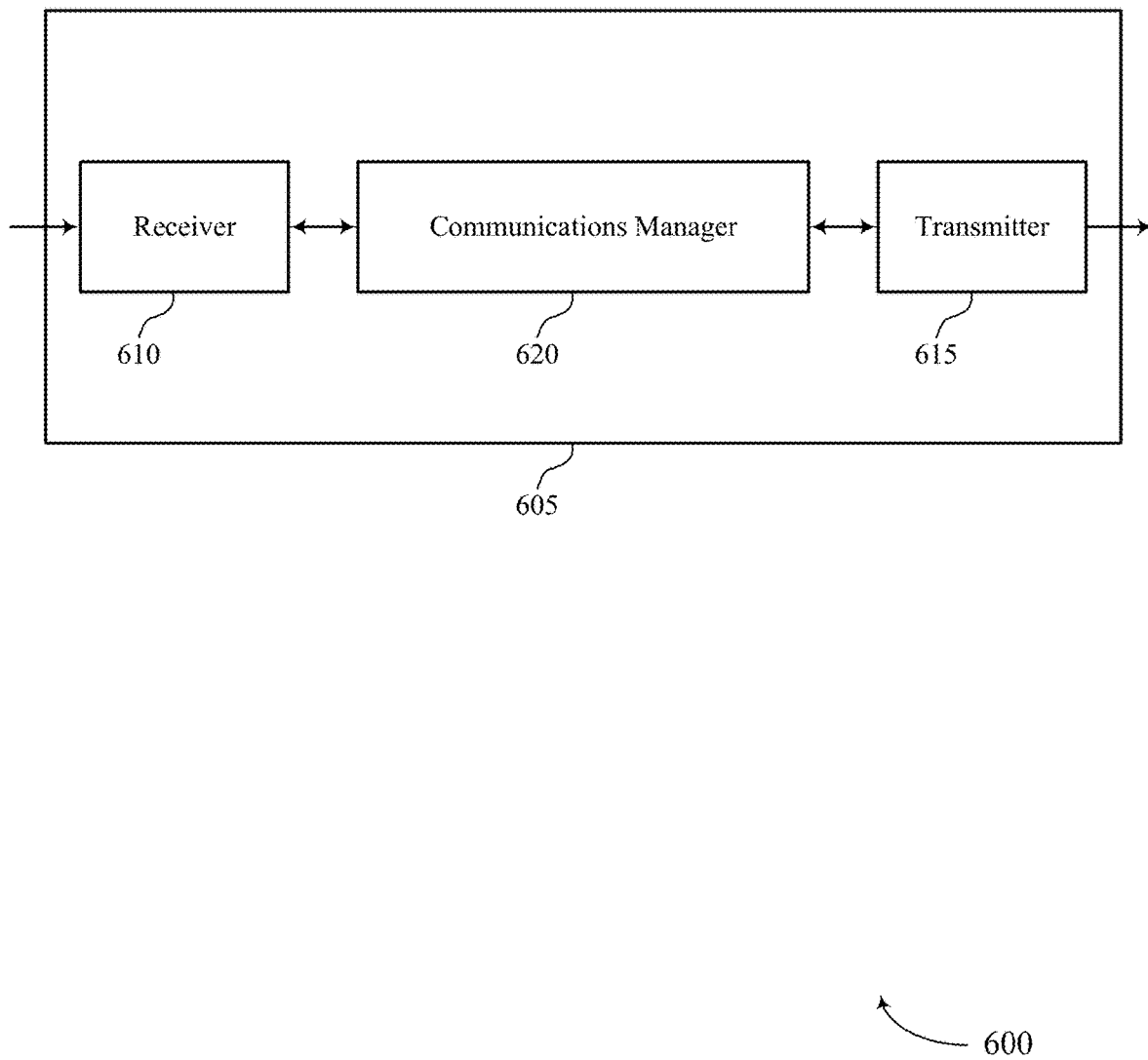
FIGS. 6 and 7 show block diagrams of devices that support techniques for SIC in accordance with aspects of the present disclosure.

FIG. 6 shows a block diagram 600 of a device 605 that supports techniques for SIC in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for SIC). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for SIC). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for SIC as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first wireless node in accordance with examples as disclosed herein. For example, the communications manager 620 may be configured as or otherwise support a means for transmitting, to a control node, an indication of a capability of the first wireless node to perform one or more SIC procedures between a first antenna array of the first wireless node and a second antenna array of the first wireless node. The communications manager 620 may be configured as or otherwise support a means for receiving, from the control node in response to the indication of the capability, a configuration for the first wireless node to use to perform a SIC procedure of the one or more SIC procedures for full-duplex communications. The communications manager 620 may be configured as or otherwise support a means for communicating, according to the received configuration, with the control node, a second wireless node, or any combination thereof, using the first antenna array and the second antenna array.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for signaling capabilities to perform SIC procedures. In particular, techniques described herein may enable wireless nodes to report a capability to perform one or more SIC procedures, to enable/disable SIC procedures, to switch between various SIC procedures, or any combination thereof. By enabling wireless nodes to indicate a capability to support SIC procedures, techniques described herein may provide a network with improved insight as to an expected performance of full-duplex communications which may be performed by the respective wireless nodes. In this regard, by providing improved insight as to an expected performance of full-duplex communications which may be performed by the wireless nodes, techniques described herein may enable the network to more efficiently configure wireless nodes with full-duplex communications, thereby improving the efficiency and reliability of wireless communications within a wireless communications system, as well as improving resource utilization. Furthermore, by enabling wireless nodes to enable/disable SIC procedures, techniques described herein may reduce processing and power consumption at the wireless nodes.

Figure 7:
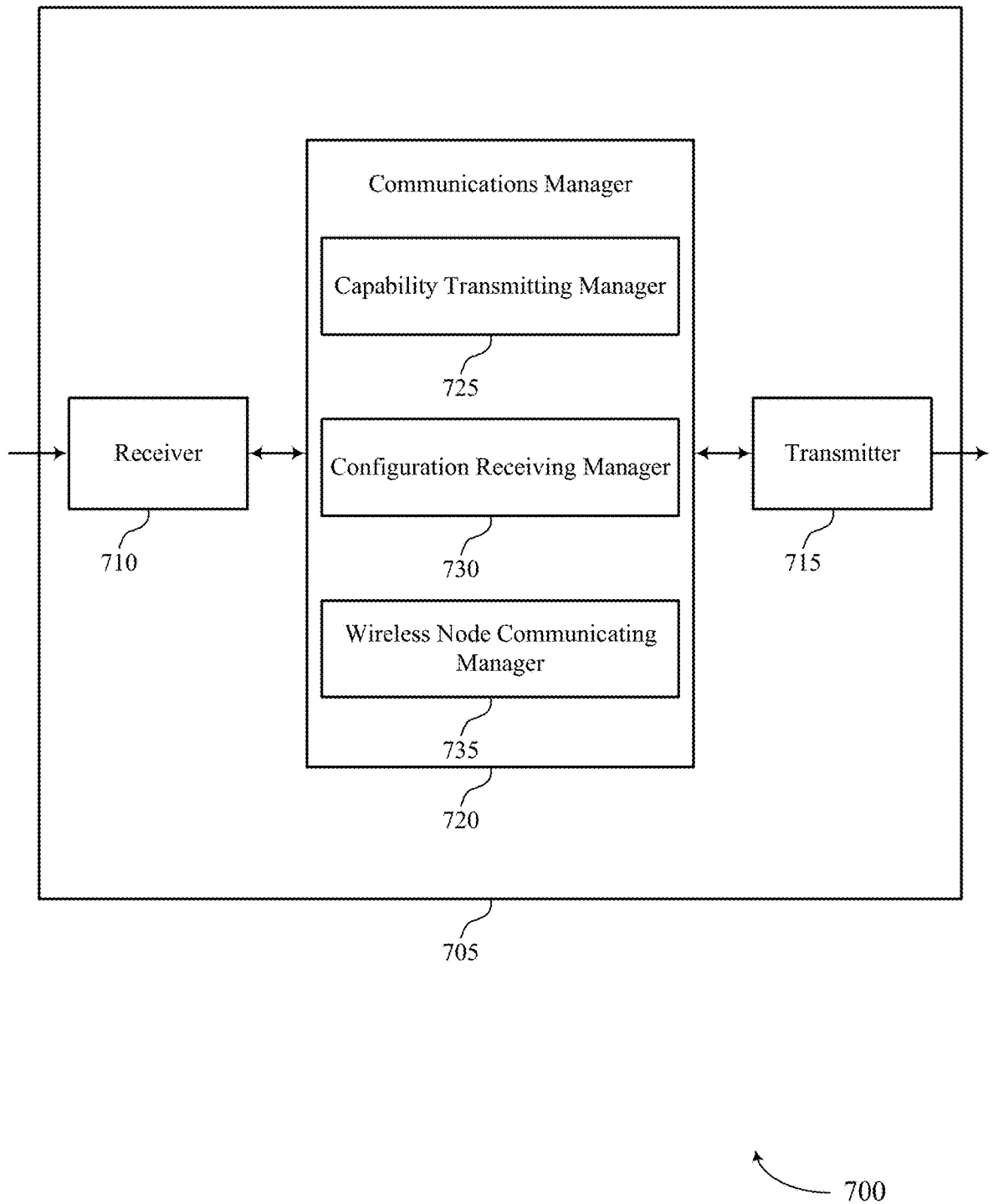

FIG. 7 shows a block diagram 700 of a device 705 that supports techniques for SIC in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for SIC). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for SIC). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for SIC as described herein. For example, the communications manager 720 may include a capability transmitting manager 725, a configuration receiving manager 730, a wireless node communicating manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first wireless node in accordance with examples as disclosed herein. The capability transmitting manager 725 may be configured as or otherwise support a means for transmitting, to a control node, an indication of a capability of the first wireless node to perform one or more SIC procedures between a first antenna array of the first wireless node and a second antenna array of the first wireless node. The configuration receiving manager 730 may be configured as or otherwise support a means for receiving, from the control node in response to the indication of the capability, a configuration for the first wireless node to use to perform a SIC procedure of the one or more SIC procedures for full-duplex communications. The wireless node communicating manager 735 may be configured as or otherwise support a means for communicating, according to the received configuration, with the control node, a second wireless node, or any combination thereof, using the first antenna array and the second antenna array.

Figure 8:
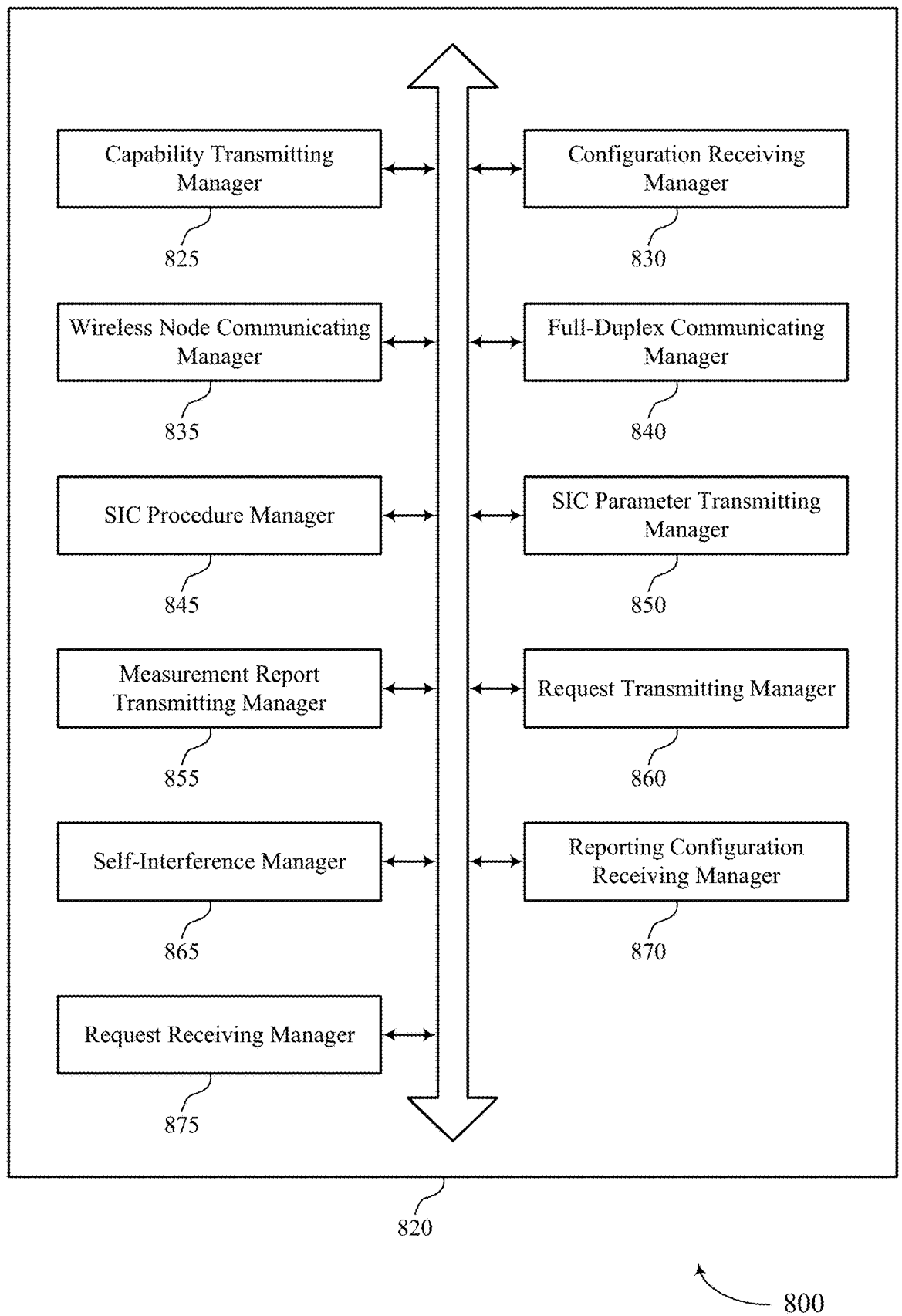
FIG. 8 shows a block diagram of a communications manager that supports techniques for SIC in accordance with aspects of the present disclosure.

FIG. 8 shows a block diagram 800 of a communications manager 820 that supports techniques for SIC in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for SIC as described herein. For example, the communications manager 820 may include a capability transmitting manager 825, a configuration receiving manager 830, a wireless node communicating manager 835, a full-duplex communicating manager 840, an SIC procedure manager 845, an SIC parameter transmitting manager 850, a measurement report transmitting manager 855, a request transmitting manager 860, a self-interference manager 865, a reporting configuration receiving manager 870, a request receiving manager 875, or any combination thereof. Each of these components may communicate, directly or indirectly, with one another (e.g., via one or more buses).

The communications manager 820 may support wireless communication at a first wireless node in accordance with examples as disclosed herein. The capability transmitting manager 825 may be configured as or otherwise support a means for transmitting, to a control node, an indication of a capability of the first wireless node to perform one or more SIC procedures between a first antenna array of the first wireless node and a second antenna array of the first wireless node. The configuration receiving manager 830 may be configured as or otherwise support a means for receiving, from the control node in response to the indication of the capability, a configuration for the first wireless node to use to perform a SIC procedure of the one or more SIC procedures for full-duplex communications. The wireless node communicating manager 835 may be configured as or otherwise support a means for communicating, according to the received configuration, with the control node, a second wireless node, or any combination thereof, using the first antenna array and the second antenna array.

In some examples, to support communicating according to the received configuration, the full-duplex communicating manager 840 may be configured as or otherwise support a means for transmitting one or more signals via the first antenna array for a time interval. In some examples, to support communicating according to the received configuration, the full-duplex communicating manager 840 may be configured as or otherwise support a means for receiving the one or more signals via the second antenna array for the time interval. In some examples, to support communicating according to the received configuration, the SIC procedure manager 845 may be configured as or otherwise support a means for performing the SIC procedure on the one or more signals received via the second antenna array.

In some examples, the capability transmitting manager 825 may be configured as or otherwise support a means for transmitting, to the control node, an indication of a capability of the first wireless node to enable or disable the one or more SIC procedures, where the configuration is further based on the capability to enable or disable the one or more SIC procedures.

In some examples, the SIC parameter transmitting manager 850 may be configured as or otherwise support a means for transmitting, to the control node, a set of parameters associated with the one or more SIC procedures, where the configuration indicates values for at least a subset of the set of parameters. In some examples, the indication of the capability is transmitted in radio resource control signaling or F1-AP interface signaling.

In some examples, the measurement report transmitting manager 855 may be configured as or otherwise support a means for transmitting, to the control node, a measurement report including an indication of a set of self-interference measurements, where the configuration is received based on the measurement report. In some examples, the measurement report transmitting manager 855 may be configured as or otherwise support a means for transmitting, in the measurement report, an indication of a SIC procedure of the one or more SIC procedures that was performed for at least a subset of the set of self-interference measurements, where the configuration is received based on the indication of the SIC procedure that was performed.

In some examples, the self-interference manager 865 may be configured as or otherwise support a means for identifying that at least one self-interference measurement of the set of self-interference measurements satisfies a self-interference threshold, where transmitting the measurement report is based on identifying that the at least one self-interference measurement satisfies the self-interference threshold.

In some examples, the reporting configuration receiving manager 870 may be configured as or otherwise support a means for receiving, from the control node, a reporting configuration for transmitting measurement reports associated with self-interference at the first wireless node, where the measurement report is transmitted in accordance with the reporting configuration.

In some examples, the request receiving manager 875 may be configured as or otherwise support a means for receiving, from the control node, a request for the measurement report, where the measurement report is transmitted in response to the request.

In some examples, the measurement report transmitting manager 855 may be configured as or otherwise support a means for transmitting, to the control node in the measurement report, a first subset of self-interference measurements of the set of self-interference measurements performed during a first portion of the time interval in which a SIC procedure of the set of SIC procedures was performed. In some examples, the measurement report transmitting manager 855 may be configured as or otherwise support a means for transmitting, to the control node in the measurement report, a second subset of self-interference measurements of the set of self-interference measurements performed during a second portion of the time interval in which no SIC procedures were performed, where the configuration is received based on the first subset of self-interference measurements, the second subset of self-interference measurements, or both.

In some examples, the set of self-interference measurements include an RSSI, an RSRP, an RSRQ, a SINR, a CQI, or any combination thereof.

In some examples, the request transmitting manager 860 may be configured as or otherwise support a means for transmitting, to the control node based on communicating according to the received configuration, a request to disable the SIC procedure associated with the configuration, to selectively modify one or more parameters of the SIC procedure associated with the configuration, to perform a different SIC procedure, or any combination thereof. In some examples, the configuration receiving manager 830 may be configured as or otherwise support a means for receiving a second configuration at least in part in response to the transmitted request. In some examples, the wireless node communicating manager 835 may be configured as or otherwise support a means for communicating according to the second configuration.

In some examples, the first wireless node includes a UE or an MT node of an IAB network. In some examples, the control node includes a base station, a DU of the IAB network, or a CU of the IAB network.

Figure 9:
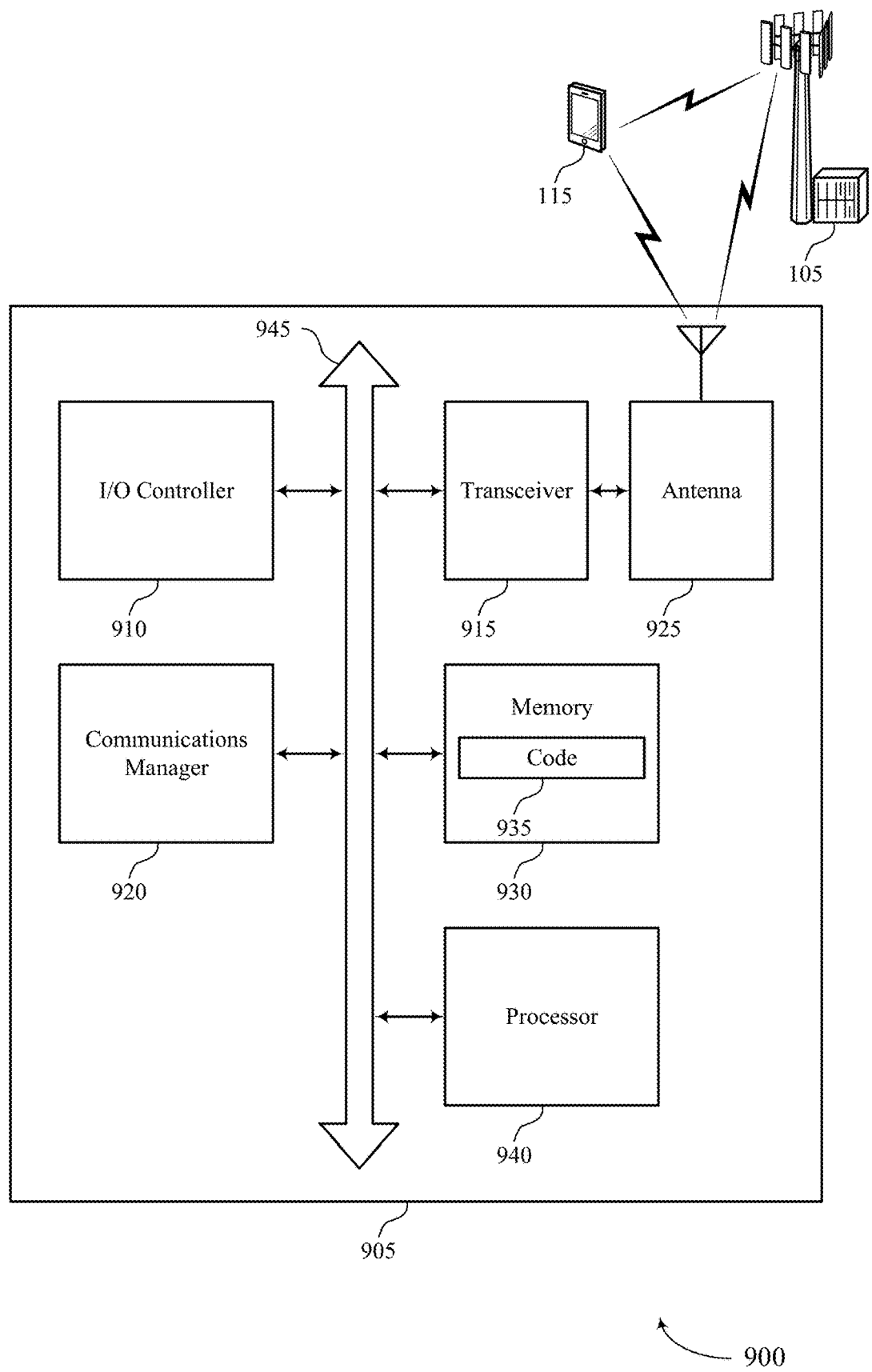
FIG. 9 shows a diagram of a system including a device that supports techniques for SIC in accordance with aspects of the present disclosure.

FIG. 9 shows a diagram of a system 900 including a device 905 that supports techniques for SIC in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for SIC). For example, the device 905 or a component of the device 905 may include a processor 940 and memory 930 coupled to the processor 940, the processor 940 and memory 930 configured to perform various functions described herein.

The communications manager 920 may support wireless communication at a first wireless node in accordance with examples as disclosed herein. For example, the communications manager 920 may be configured as or otherwise support a means for transmitting, to a control node, an indication of a capability of the first wireless node to perform one or more SIC procedures between a first antenna array of the first wireless node and a second antenna array of the first wireless node. The communications manager 920 may be configured as or otherwise support a means for receiving, from the control node in response to the indication of the capability, a configuration for the first wireless node to use to perform a SIC procedure of the one or more SIC procedures for full-duplex communications. The communications manager 920 may be configured as or otherwise support a means for communicating, according to the received configuration, with the control node, a second wireless node, or any combination thereof, using the first antenna array and the second antenna array.

By including or configuring the communications manager 920 in accordance with examples as described herein, the device 905 may support techniques for signaling capabilities to perform SIC procedures. In particular, techniques described herein may enable wireless nodes to report a capability to perform one or more SIC procedures, to enable/disable SIC procedures, to switch between various SIC procedures, or any combination thereof. By enabling wireless nodes to indicate a capability to support SIC procedures, techniques described herein may provide a network with improved insight as to an expected performance of full-duplex communications which may be performed by the respective wireless nodes. In this regard, by providing improved insight as to an expected performance of full-duplex communications which may be performed by the wireless nodes, techniques described herein may enable the network to more efficiently configure wireless nodes with full-duplex communications, thereby improving the efficiency and reliability of wireless communications within a wireless communications system, as well as improving resource utilization. Furthermore, by enabling wireless nodes to enable/disable SIC procedures, techniques described herein may reduce processing and power consumption at the wireless nodes, which may improve battery performance and battery life.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for SIC as described herein, or the processor 940 and the memory 930 may be otherwise configured to perform or support such operations.

Figure 10:
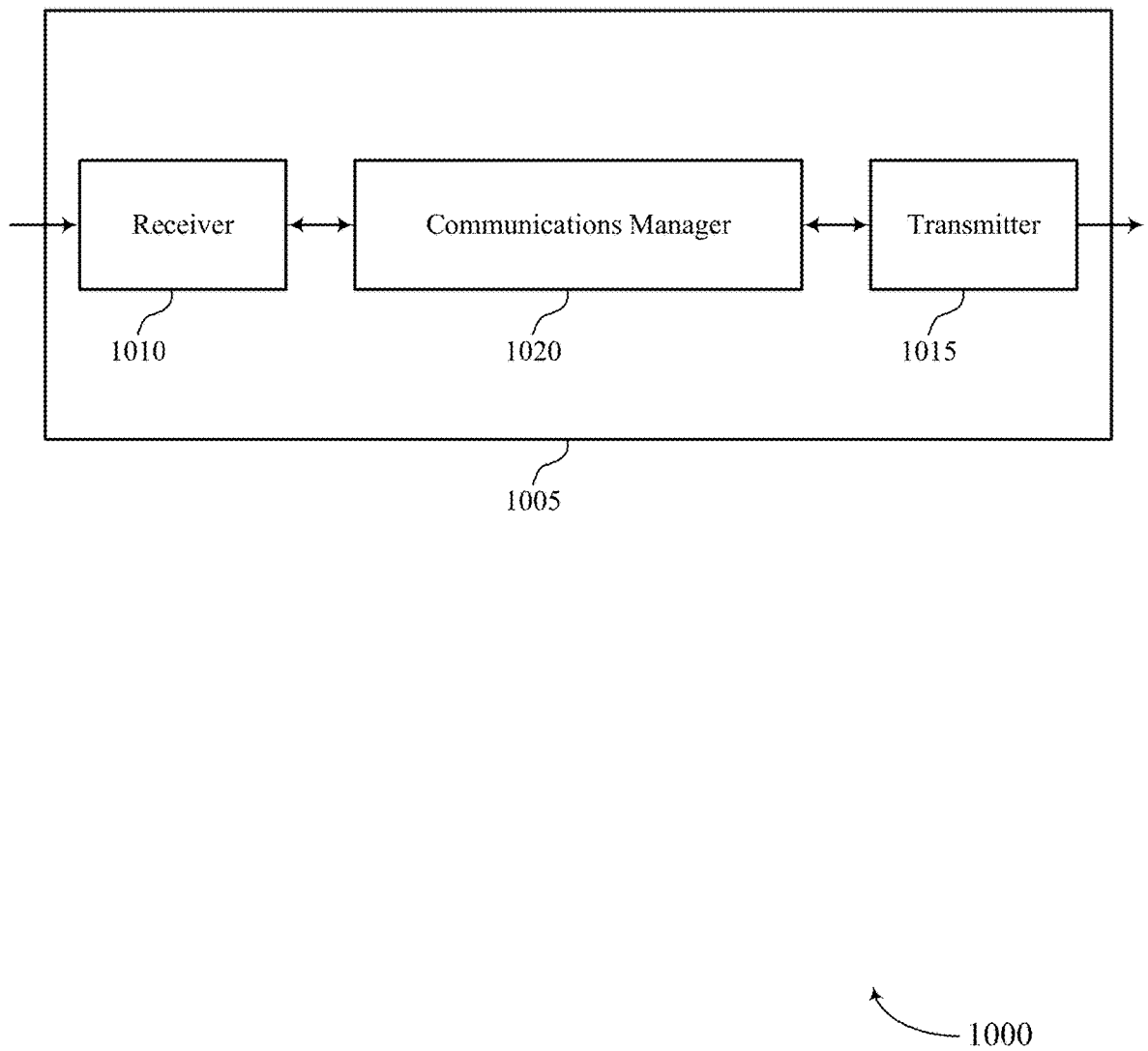
FIGS. 10 and 11 show block diagrams of devices that support techniques for SIC in accordance with aspects of the present disclosure.

FIG. 10 shows a block diagram 1000 of a device 1005 that supports techniques for SIC in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for SIC). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for SIC). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for SIC as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a control node in accordance with examples as disclosed herein. For example, the communications manager 1020 may be configured as or otherwise support a means for receiving, from a first wireless node, an indication of a capability of the first wireless node to perform one or more SIC procedures between a first antenna array of the first wireless node and a second antenna array of the first wireless node. The communications manager 1020 may be configured as or otherwise support a means for transmitting, to the first wireless node in response to the indication of the capability, a configuration for the first wireless node to use to perform a SIC procedure of the one or more SIC procedures for full duplex communications.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for signaling capabilities to perform SIC procedures. In particular, techniques described herein may enable wireless nodes to report a capability to perform one or more SIC procedures, to enable/disable SIC procedures, to switch between various SIC procedures, or any combination thereof. By enabling wireless nodes to indicate a capability to support SIC procedures, techniques described herein may provide a network with improved insight as to an expected performance of full-duplex communications which may be performed by the respective wireless nodes. In this regard, by providing improved insight as to an expected performance of full-duplex communications which may be performed by the wireless nodes, techniques described herein may enable the network to more efficiently configure wireless nodes with full-duplex communications, thereby improving the efficiency and reliability of wireless communications within a wireless communications system, as well as improving resource utilization. Furthermore, by enabling wireless nodes to enable/disable SIC procedures, techniques described herein may reduce processing and power consumption at the wireless nodes, which may improve battery performance and battery life.

Figure 11:
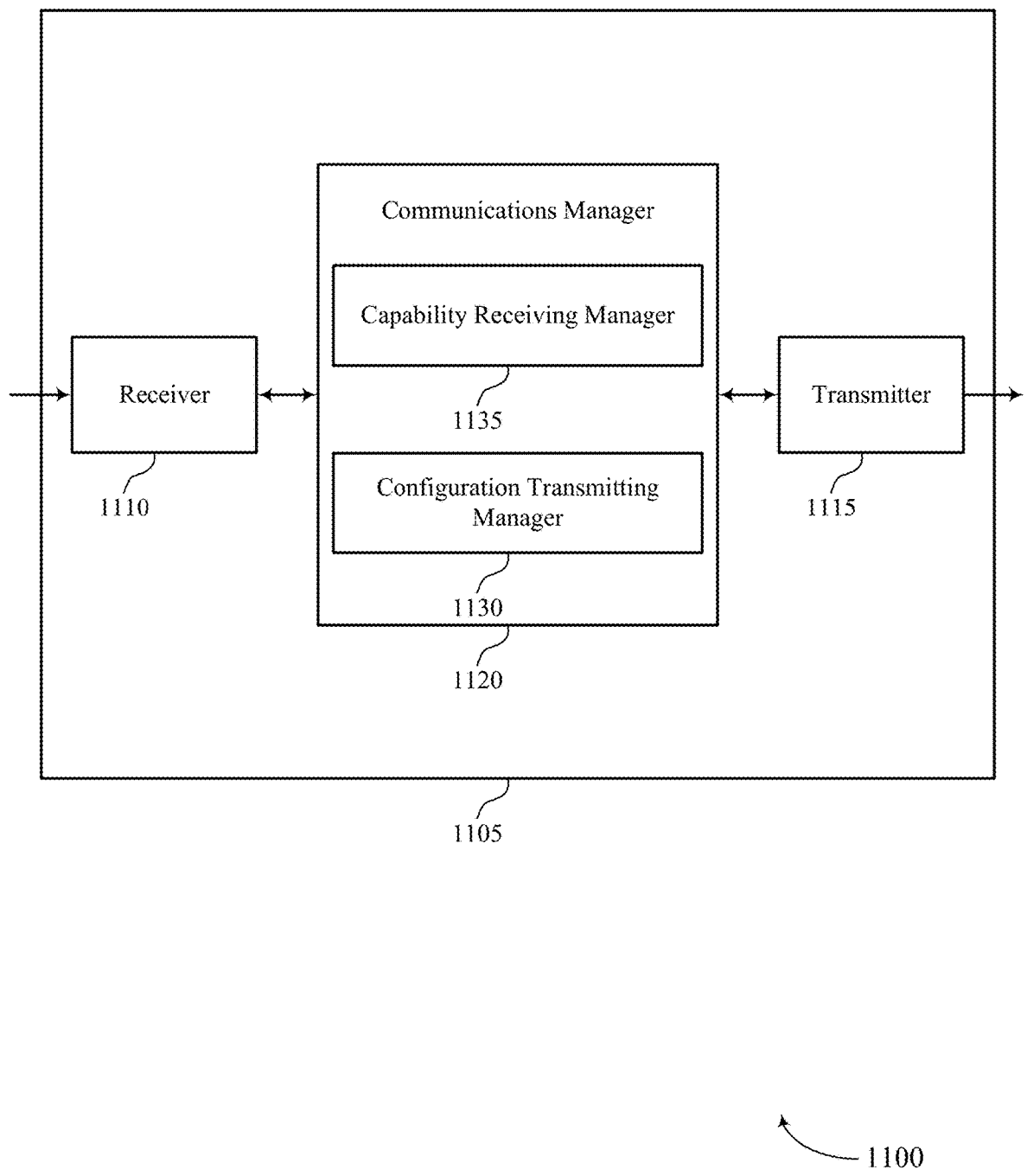

FIG. 11 shows a block diagram 1100 of a device 1105 that supports techniques for SIC in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for SIC). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for SIC). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for SIC as described herein. For example, the communications manager 1120 may include a capability receiving manager 1125 a configuration transmitting manager 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a control node in accordance with examples as disclosed herein. The capability receiving manager 1125 may be configured as or otherwise support a means for receiving, from a first wireless node, an indication of a capability of the first wireless node to perform one or more SIC procedures between a first antenna array of the first wireless node and a second antenna array of the first wireless node. The configuration transmitting manager 1130 may be configured as or otherwise support a means for transmitting, to the first wireless node in response to the indication of the capability, a configuration for the first wireless node to use to perform a SIC procedure of the one or more SIC procedures for full duplex communications.

Figure 12:
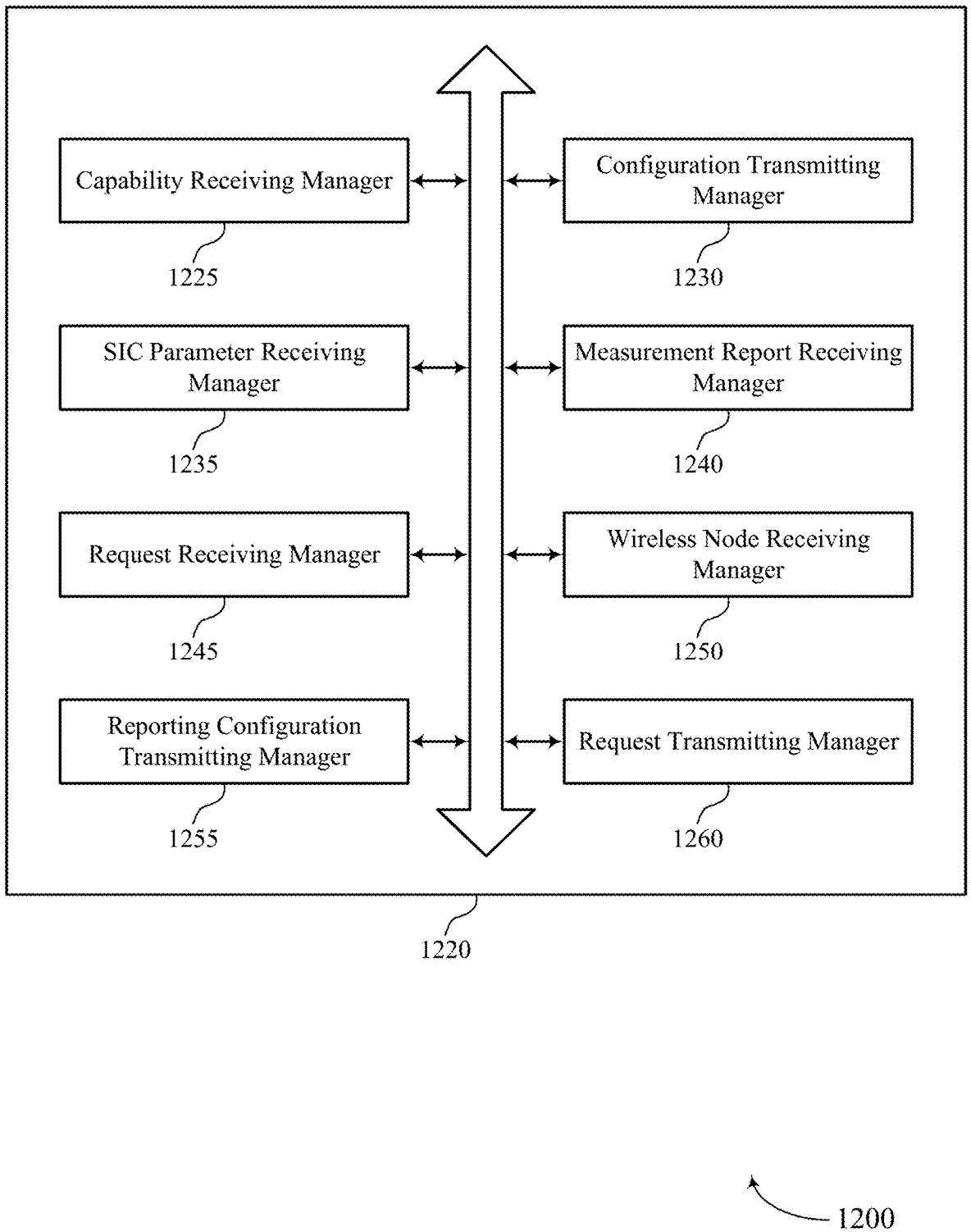
FIG. 12 shows a block diagram of a communications manager that supports techniques for SIC in accordance with aspects of the present disclosure.

FIG. 12 shows a block diagram 1200 of a communications manager 1220 that supports techniques for SIC in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for SIC as described herein. For example, the communications manager 1220 may include a capability receiving manager 1225, a configuration transmitting manager 1230, an SIC parameter receiving manager 1235, a measurement report receiving manager 1240, a request receiving manager 1245, a wireless node receiving manager 1250, a reporting configuration transmitting manager 1255, a request transmitting manager 1260, or any combination thereof. Each of these components may communicate, directly or indirectly, with one another (e.g., via one or more buses).

The communications manager 1220 may support wireless communication at a control node in accordance with examples as disclosed herein. The capability receiving manager 1225 may be configured as or otherwise support a means for receiving, from a first wireless node, an indication of a capability of the first wireless node to perform one or more SIC procedures between a first antenna array of the first wireless node and a second antenna array of the first wireless node. The configuration transmitting manager 1230 may be configured as or otherwise support a means for transmitting, to the first wireless node in response to the indication of the capability, a configuration for the first wireless node to use to perform a SIC procedure of the one or more SIC procedures for full duplex communications.

In some examples, the capability receiving manager 1225 may be configured as or otherwise support a means for receiving, from the first wireless node, an indication of a capability of the first wireless node to enable or disable the one or more SIC procedures, where the configuration is further based on the capability to enable or disable the one or more SIC procedures.

In some examples, the SIC parameter receiving manager 1235 may be configured as or otherwise support a means for receiving, from the first wireless node, a set of parameters associated with the one or more SIC procedures, where the configuration indicates values for at least a subset of the set of parameters.

In some examples, the indication of the capability is received in radio resource control signaling or F1-AP interface signaling.

In some examples, the measurement report receiving manager 1240 may be configured as or otherwise support a means for receiving, from the first wireless node, a measurement report including an indication of a set of self-interference measurements, where the configuration is transmitted based on the measurement report. In some examples, the measurement report receiving manager 1240 may be configured as or otherwise support a means for receiving, in the measurement report, an indication of a SIC procedure of the one or more SIC procedures that was performed for at least a subset of the set of self-interference measurements, where the configuration is transmitted based on the indication of the SIC procedure that was performed.

In some examples, the reporting configuration transmitting manager 1255 may be configured as or otherwise support a means for transmitting, to the first wireless node, a reporting configuration for transmitting measurement reports associated with self-interference at the first wireless node, or both, where the measurement report is received in accordance with the reporting configuration.

In some examples, the request transmitting manager 1260 may be configured as or otherwise support a means for transmitting, to the first wireless node, a request for the measurement report, where the measurement report is received in response to the request.

In some examples, the measurement report receiving manager 1240 may be configured as or otherwise support a means for receiving, from the first wireless node in the measurement report, a first subset of self-interference measurements of the set of self-interference measurements performed during a first portion of the time interval in which a SIC procedure of the set of SIC procedures was performed. In some examples, the measurement report receiving manager 1240 may be configured as or otherwise support a means for receiving, from the first wireless node via the measurement report, a second subset of self-interference measurements of the set of self-interference measurements performed during a second portion of the time interval in which no SIC procedures were performed, where the configuration is transmitted based on the first subset of self-interference measurements, the second subset of self-interference measurements, or both.

In some examples, the set of self-interference measurements include an RSSI, an RSRP, an RSRQ, a SINR, a CQI, or any combination thereof.

In some examples, the request receiving manager 1245 may be configured as or otherwise support a means for receiving, from the first wireless node based on communicating according to the received configuration, a request to disable the SIC procedure associated with the configuration, to selectively modify one or more parameters of the SIC procedure associated with the configuration, to perform a different SIC procedure, or any combination thereof. In some examples, the configuration transmitting manager 1230 may be configured as or otherwise support a means for transmitting a second configuration at least in part in response to the received request. In some examples, the wireless node receiving manager 1250 may be configured as or otherwise support a means for communicating with the first wireless node according to the second configuration.

In some examples, the first wireless node includes a UE, or an MT node of an IAB network. In some examples, the control node includes a base station, a DU of the IAB network, or a CU of the IAB network.

Figure 13:
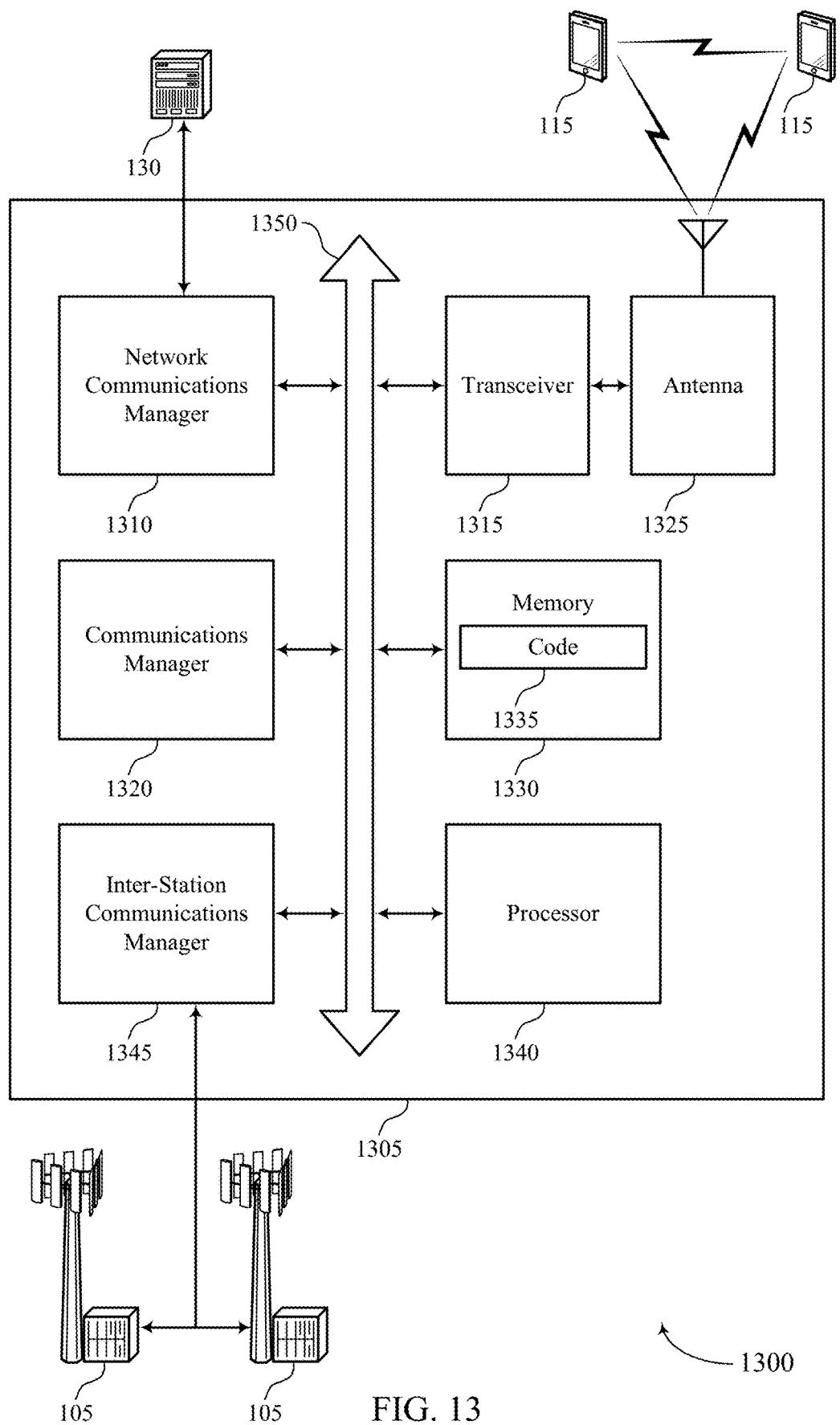
FIG. 13 shows a diagram of a system including a device that supports techniques for SIC in accordance with aspects of the present disclosure.

FIG. 13 shows a diagram of a system 1300 including a device 1305 that supports techniques for SIC in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for SIC). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a control node in accordance with examples as disclosed herein. For example, the communications manager 1320 may be configured as or otherwise support a means for receiving, from a first wireless node, an indication of a capability of the first wireless node to perform one or more SIC procedures between a first antenna array of the first wireless node and a second antenna array of the first wireless node. The communications manager 1320 may be configured as or otherwise support a means for transmitting, to the first wireless node in response to the indication of the capability, a configuration for the first wireless node to use to perform a SIC procedure of the one or more SIC procedures for full duplex communications.

By including or configuring the communications manager 1320 in accordance with examples as described herein, the device 1305 may support techniques for signaling capabilities to perform SIC procedures. In particular, techniques described herein may enable wireless nodes to report a capability to perform one or more SIC procedures, to enable/disable SIC procedures, to switch between various SIC procedures, or any combination thereof. By enabling wireless nodes to indicate a capability to support SIC procedures, techniques described herein may provide a network with improved insight as to an expected performance of full-duplex communications which may be performed by the respective wireless nodes. In this regard, by providing improved insight as to an expected performance of full-duplex communications which may be performed by the wireless nodes, techniques described herein may enable the network to more efficiently configure wireless nodes with full-duplex communications, thereby improving the efficiency and reliability of wireless communications within a wireless communications system, as well as improving resource utilization. Furthermore, by enabling wireless nodes to enable/disable SIC procedures, techniques described herein may reduce processing and power consumption at the wireless nodes, which may improve battery performance and battery life.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for SIC as described herein, or the processor 1340 and the memory 1330 may be otherwise configured to perform or support such operations.

Figure 14:
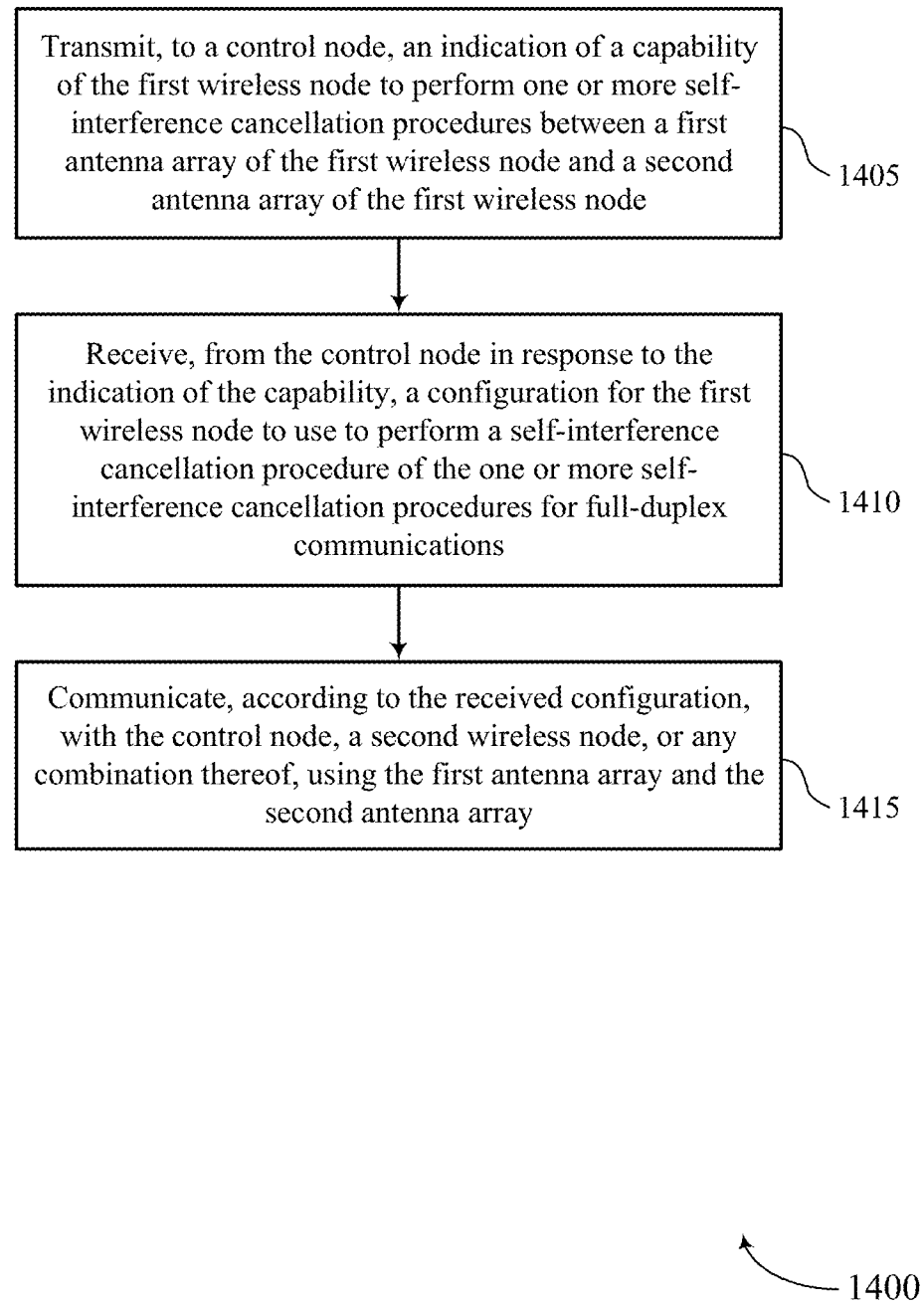
FIGS. 14 through 18 show flowcharts illustrating methods that support techniques for SIC in accordance with aspects of the present disclosure.

FIG. 14 shows a flowchart illustrating a method 1400 that supports techniques for SIC in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include transmitting, to a control node, an indication of a capability of the first wireless node to perform one or more SIC procedures between a first antenna array of the first wireless node and a second antenna array of the first wireless node. The operations of 1405 may be performed in accordance with examples as disclosed herein. In some examples, aspects of the operations of 1405 may be performed by a capability transmitting manager 825 as described with reference to FIG. 8.

At 1410, the method may include receiving, from the control node in response to the indication of the capability, a configuration for the first wireless node to use to perform a SIC procedure of the one or more SIC procedures for full-duplex communications. The operations of 1410 may be performed in accordance with examples as disclosed herein. In some examples, aspects of the operations of 1410 may be performed by a configuration receiving manager 830 as described with reference to FIG. 8.

At 1415, the method may include communicating, according to the received configuration, with the control node, a second wireless node, or any combination thereof, using the first antenna array and the second antenna array. The operations of 1415 may be performed in accordance with examples as disclosed herein. In some examples, aspects of the operations of 1415 may be performed by a wireless node communicating manager 835 as described with reference to FIG. 8.

Figure 15:
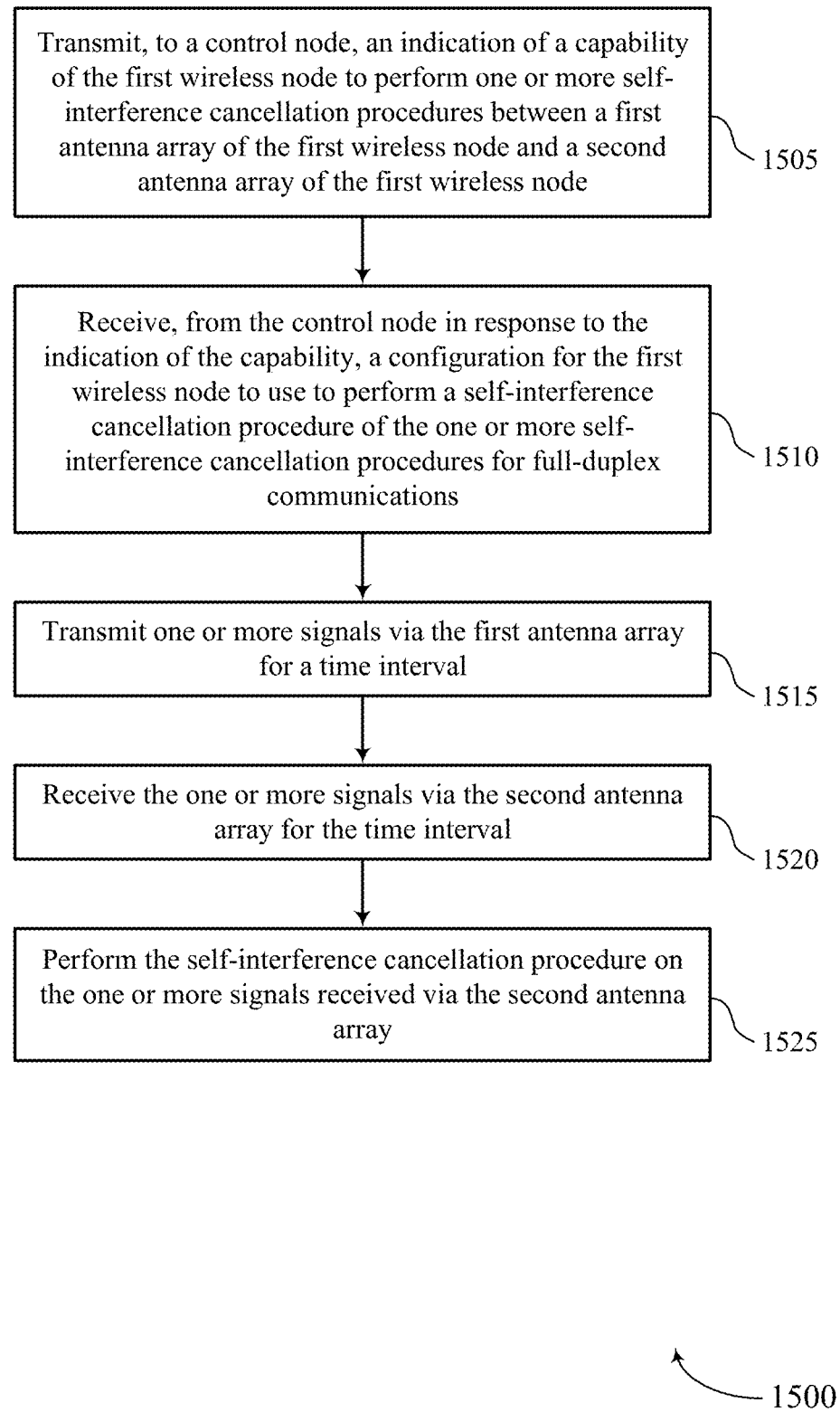

FIG. 15 shows a flowchart illustrating a method 1500 that supports techniques for SIC in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include transmitting, to a control node, an indication of a capability of the first wireless node to perform one or more SIC procedures between a first antenna array of the first wireless node and a second antenna array of the first wireless node. The operations of 1505 may be performed in accordance with examples as disclosed herein. In some examples, aspects of the operations of 1505 may be performed by a capability transmitting manager 825 as described with reference to FIG. 8.

At 1510, the method may include receiving, from the control node in response to the indication of the capability, a configuration for the first wireless node to use to perform a SIC procedure of the one or more SIC procedures for full-duplex communications. The operations of 1510 may be performed in accordance with examples as disclosed herein. In some examples, aspects of the operations of 1510 may be performed by a configuration receiving manager 830 as described with reference to FIG. 8.

At 1515, the method may include transmitting one or more signals via the first antenna array for a time interval. The operations of 1515 may be performed in accordance with examples as disclosed herein. In some examples, aspects of the operations of 1515 may be performed by a full-duplex communicating manager 840 as described with reference to FIG. 8.

At 1520, the method may include receiving the one or more signals via the second antenna array for the time interval. The operations of 1520 may be performed in accordance with examples as disclosed herein. In some examples, aspects of the operations of 1520 may be performed by a full-duplex communicating manager 840 as described with reference to FIG. 8.

At 1525, the method may include performing the SIC procedure on the one or more signals received via the second antenna array. The operations of 1525 may be performed in accordance with examples as disclosed herein. In some examples, aspects of the operations of 1525 may be performed by an SIC procedure manager 845 as described with reference to FIG. 8.

Figure 16:
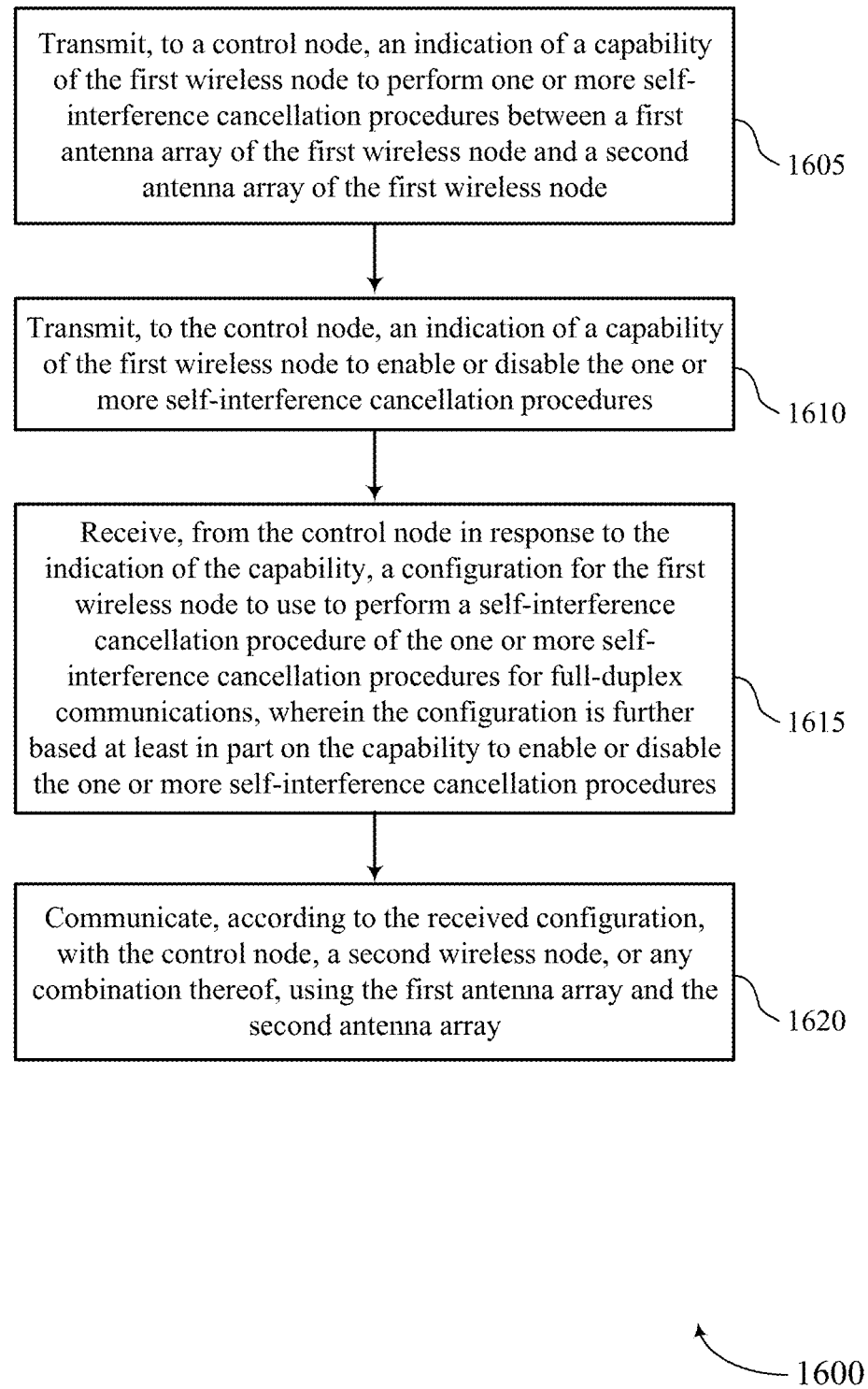

FIG. 16 shows a flowchart illustrating a method 1600 that supports techniques for SIC in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include transmitting, to a control node, an indication of a capability of the first wireless node to perform one or more SIC procedures between a first antenna array of the first wireless node and a second antenna array of the first wireless node. The operations of 1605 may be performed in accordance with examples as disclosed herein. In some examples, aspects of the operations of 1605 may be performed by a capability transmitting manager 825 as described with reference to FIG. 8.

At 1610, the method may include transmitting, to the control node, an indication of a capability of the first wireless node to enable or disable the one or more SIC procedures. The operations of 1610 may be performed in accordance with examples as disclosed herein. In some examples, aspects of the operations of 1610 may be performed by a capability transmitting manager 825 as described with reference to FIG. 8.

At 1615, the method may include receiving, from the control node in response to the indication of the capability, a configuration for the first wireless node to use to perform a SIC procedure of the one or more SIC procedures for full-duplex communications, where the configuration is further based on the capability to enable or disable the one or more SIC procedures. The operations of 1615 may be performed in accordance with examples as disclosed herein. In some examples, aspects of the operations of 1615 may be performed by a configuration receiving manager 830 as described with reference to FIG. 8.

At 1620, the method may include communicating, according to the received configuration, with the control node, a second wireless node, or any combination thereof, using the first antenna array and the second antenna array. The operations of 1620 may be performed in accordance with examples as disclosed herein. In some examples, aspects of the operations of 1620 may be performed by a wireless node communicating manager 835 as described with reference to FIG. 8.

Figure 17:
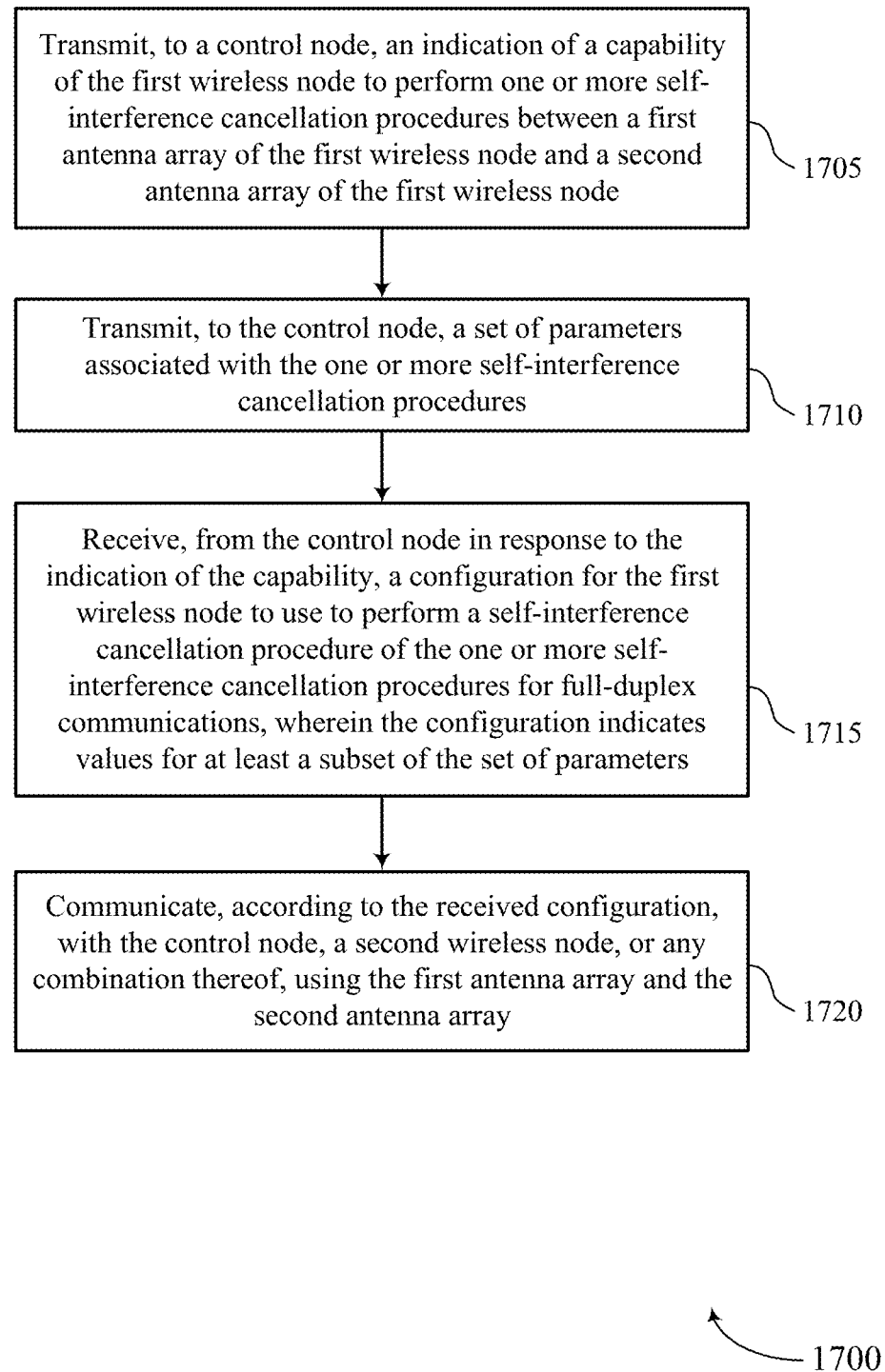

FIG. 17 shows a flowchart illustrating a method 1700 that supports techniques for SIC in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include transmitting, to a control node, an indication of a capability of the first wireless node to perform one or more SIC procedures between a first antenna array of the first wireless node and a second antenna array of the first wireless node. The operations of 1705 may be performed in accordance with examples as disclosed herein. In some examples, aspects of the operations of 1705 may be performed by a capability transmitting manager 825 as described with reference to FIG. 8.

At 1710, the method may include transmitting, to the control node, a set of parameters associated with the one or more SIC procedures. The operations of 1710 may be performed in accordance with examples as disclosed herein. In some examples, aspects of the operations of 1710 may be performed by an SIC parameter transmitting manager 850 as described with reference to FIG. 8.

At 1715, the method may include receiving, from the control node in response to the indication of the capability, a configuration for the first wireless node to use to perform a SIC procedure of the one or more SIC procedures for full-duplex communications, where the configuration indicates values for at least a subset of the set of parameters. The operations of 1715 may be performed in accordance with examples as disclosed herein. In some examples, aspects of the operations of 1715 may be performed by a configuration receiving manager 830 as described with reference to FIG. 8.

At 1720, the method may include communicating, according to the received configuration, with the control node, a second wireless node, or any combination thereof, using the first antenna array and the second antenna array. The operations of 1720 may be performed in accordance with examples as disclosed herein. In some examples, aspects of the operations of 1720 may be performed by a wireless node communicating manager 835 as described with reference to FIG. 8.

Figure 18:
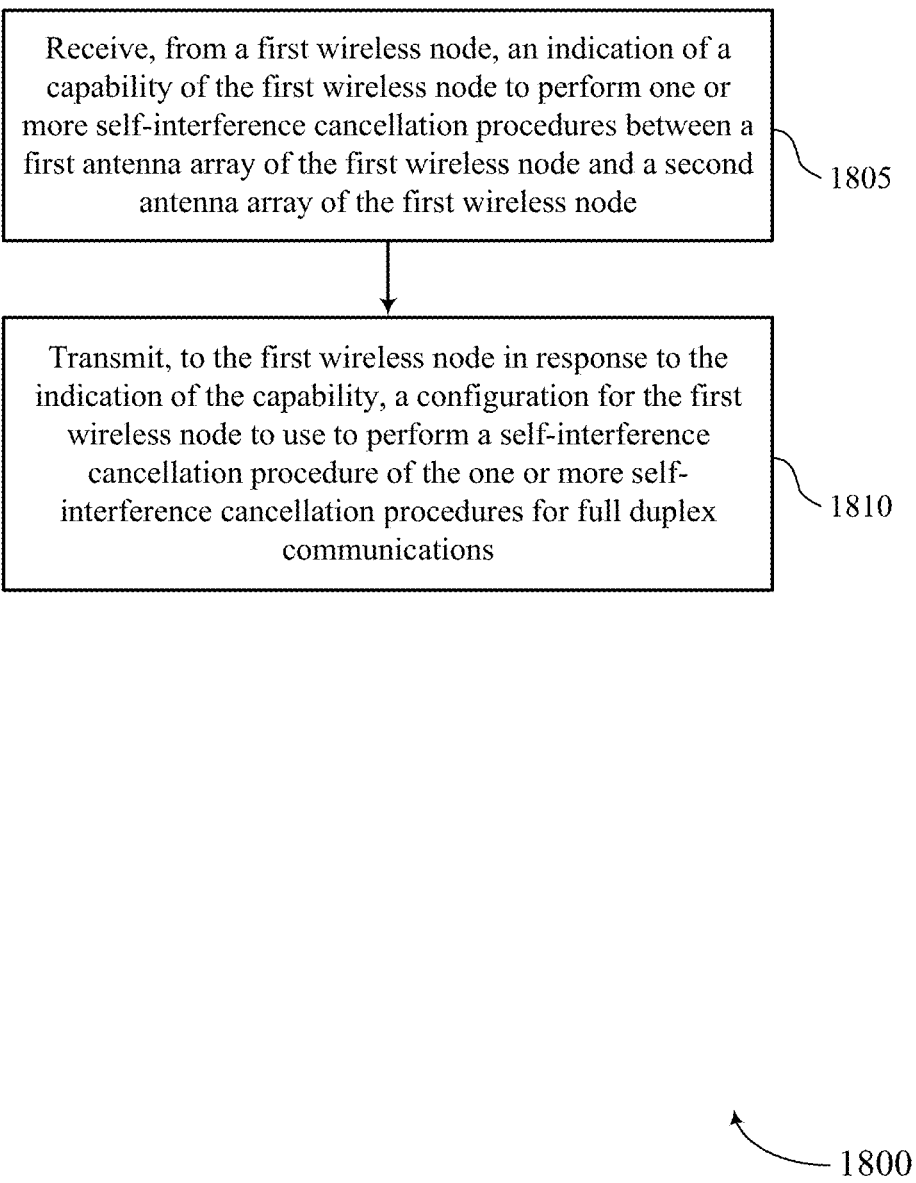

FIG. 18 shows a flowchart illustrating a method 1800 that supports techniques for SIC in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include receiving, from a first wireless node, an indication of a capability of the first wireless node to perform one or more SIC procedures between a first antenna array of the first wireless node and a second antenna array of the first wireless node. The operations of 1805 may be performed in accordance with examples as disclosed herein. In some examples, aspects of the operations of 1805 may be performed by a capability receiving manager 1225 as described with reference to FIG. 12.

At 1810, the method may include transmitting, to the first wireless node in response to the indication of the capability, a configuration for the first wireless node to use to perform a SIC procedure of the one or more SIC procedures for full duplex communications. The operations of 1810 may be performed in accordance with examples as disclosed herein. In some examples, aspects of the operations of 1810 may be performed by a configuration transmitting manager 1230 as described with reference to FIG. 12.

The following provides an overview of aspects of the present disclosure:

Aspect 1: A method for wireless communication at a first wireless node, comprising: transmitting, to a control node, an indication of a capability of the first wireless node to perform one or more SIC procedures between a first antenna array of the first wireless node and a second antenna array of the first wireless node; receiving, from the control node in response to the indication of the capability, a configuration for the first wireless node to use to perform a SIC procedure of the one or more SIC procedures for full-duplex communications; and communicating, according to the received configuration, with the control node, a second wireless node, or any combination thereof, using the first antenna array and the second antenna array.

Aspect 2: The method of aspect 1, wherein communicating according to the received configuration comprises: transmitting one or more signals via the first antenna array for a time interval; receiving the one or more signals via the second antenna array for the time interval; and performing the SIC procedure on the one or more signals received via the second antenna array.

Aspect 3: The method of any of aspects 1 through 2, further comprising: transmitting, to the control node, an indication of a capability of the first wireless node to enable or disable the one or more SIC procedures, wherein the configuration is further based at least in part on the capability to enable or disable the one or more SIC procedures.

Aspect 4: The method of any of aspects 1 through 3, further comprising: transmitting, to the control node, a set of parameters associated with the one or more SIC procedures, wherein the configuration indicates values for at least a subset of the set of parameters.

Aspect 5: The method of any of aspects 1 through 4, wherein the indication of the capability is transmitted in radio resource control signaling or F1 application protocol (F1-AP) interface signaling.

Aspect 6: The method of any of aspects 1 through 5, further comprising: transmitting, to the control node, a measurement report comprising an indication of a set of self-interference measurements, wherein the configuration is received based at least in part on the measurement report.

Aspect 7: The method of aspect 6, further comprising: transmitting, in the measurement report, an indication of a SIC procedure of the one or more SIC procedures that was performed for at least a subset of the set of self-interference measurements, wherein the configuration is received based at least in part on the indication of the SIC procedure that was performed.

Aspect 8: The method of any of aspects 6 through 7, further comprising: identifying that at least one self-interference measurement of the set of self-interference measurements satisfies a self-interference threshold, wherein transmitting the measurement report is based at least in part on identifying that the at least one self-interference measurement satisfies the self-interference threshold.

Aspect 9: The method of any of aspects 6 through 8, further comprising: receiving, from the control node, a reporting configuration for transmitting measurement reports associated with self-interference at the first wireless node, wherein the measurement report is transmitted in accordance with the reporting configuration.

Aspect 10: The method of any of aspects 6 through 9, further comprising: receiving, from the control node, a request for the measurement report, wherein the measurement report is transmitted in response to the request.

Aspect 11: The method of any of aspects 6 through 10, further comprising: transmitting, to the control node in the measurement report, a first subset of self-interference measurements of the set of self-interference measurements performed during a first portion of the time interval in which a SIC procedure of the set of SIC procedures was performed; and transmitting, to the control node in the measurement report, a second subset of self-interference measurements of the set of self-interference measurements performed during a second portion of the time interval in which no SIC procedures were performed, wherein the configuration is received based at least in part on the first subset of self-interference measurements, the second subset of self-interference measurements, or both.

Aspect 12: The method of any of aspects 6 through 11, wherein the set of self-interference measurements comprise a RSSI, a RSRP, a RSRQ, a SNR, a SINR, a CQI, or any combination thereof.

Aspect 13: The method of any of aspects 1 through 12, further comprising: transmitting, to the control node based at least in part on communicating according to the received configuration, a request to disable the SIC procedure associated with the configuration, to selectively modify one or more parameters of the SIC procedure associated with the configuration, to perform a different SIC procedure, or any combination thereof; receiving a second configuration at least in part in response to the transmitted request; and communicating according to the second configuration.

Aspect 14: The method of any of aspects 1 through 13, wherein the first wireless node comprises a UE or a MT node of an IAB network, and the control node comprises a base station, a DU of the IAB network, or a CU of the IAB network.

Aspect 15: A method for wireless communication at a control node, comprising: receiving, from a first wireless node, an indication of a capability of the first wireless node to perform one or more SIC procedures between a first antenna array of the first wireless node and a second antenna array of the first wireless node; and transmitting, to the first wireless node in response to the indication of the capability, a configuration for the first wireless node to use to perform a SIC procedure of the one or more SIC procedures for full duplex communications.

Aspect 16: The method of aspect 15, further comprising: receiving, from the first wireless node, an indication of a capability of the first wireless node to enable or disable the one or more SIC procedures, wherein the configuration is further based at least in part on the capability to enable or disable the one or more SIC procedures.

Aspect 17: The method of any of aspects 15 through 16, further comprising: receiving, from the first wireless node, a set of parameters associated with the one or more SIC procedures, wherein the configuration indicates values for at least a subset of the set of parameters.

Aspect 18: The method of any of aspects 15 through 17, wherein the indication of the capability is received in radio resource control signaling or F1-AP interface signaling.

Aspect 19: The method of any of aspects 15 through 18, further comprising: receiving, from the first wireless node, a measurement report comprising an indication of a set of self-interference measurements, wherein the configuration is transmitted based at least in part on the measurement report.

Aspect 20: The method of aspect 19, further comprising: receiving, in the measurement report, an indication of a SIC procedure of the one or more SIC procedures that was performed for at least a subset of the set of self-interference measurements, wherein the configuration is transmitted based at least in part on the indication of the SIC procedure that was performed.

Aspect 21: The method of any of aspects 19 through 20, further comprising: transmitting, to the first wireless node, a reporting configuration for transmitting measurement reports associated with self-interference at the first wireless node, or both, wherein the measurement report is received in accordance with the reporting configuration.

Aspect 22: The method of any of aspects 19 through 21, further comprising: transmitting, to the first wireless node, a request for the measurement report, wherein the measurement report is received in response to the request.

Aspect 23: The method of any of aspects 19 through 22, further comprising: receiving, from the first wireless node in the measurement report, a first subset of self-interference measurements of the set of self-interference measurements performed during a first portion of the time interval in which a SIC procedure of the set of SIC procedures was performed; and receiving, from the first wireless node via the measurement report, a second subset of self-interference measurements of the set of self-interference measurements performed during a second portion of the time interval in which no SIC procedures were performed, wherein the configuration is transmitted based at least in part on the first subset of self-interference measurements, the second subset of self-interference measurements, or both.

Aspect 24: The method of any of aspects 19 through 23, wherein the set of self-interference measurements comprise a RSSI, a RSRP, a RSRQ, a SNR, a SINR, a CQI, or any combination thereof.

Aspect 25: The method of any of aspects 15 through 24, further comprising: receiving, from the first wireless node based at least in part on communicating according to the received configuration, a request to disable the SIC procedure associated with the configuration, to selectively modify one or more parameters of the SIC procedure associated with the configuration, to perform a different SIC procedure, or any combination thereof; transmitting a second configuration at least in part in response to the received request; and communicating with the first wireless node according to the second configuration.

Aspect 26: The method of any of aspects 15 through 25, wherein the first wireless node comprises a UE, or an MT node of an IAB network, and the control node comprises a base station, a DU of the IAB network, or a CU of the IAB network.

Aspect 27: An apparatus for wireless communication at a first wireless node, comprising a processor; memory coupled with the processor; and instructions stored in the memory and executable by the processor to cause the apparatus to perform a method of any of aspects 1 through 14.

Aspect 28: An apparatus for wireless communication at a first wireless node, comprising at least one means for performing a method of any of aspects 1 through 14.

Aspect 29: A non-transitory computer-readable medium storing code for wireless communication at a first wireless node, the code comprising instructions executable by a processor to perform a method of any of aspects 1 through 14.

Aspect 30: An apparatus for wireless communication at a control node, comprising a processor; memory coupled with the processor; and instructions stored in the memory and executable by the processor to cause the apparatus to perform a method of any of aspects 15 through 26.

Aspect 31: An apparatus for wireless communication at a control node, comprising at least one means for performing a method of any of aspects 15 through 26.

Aspect 32: A non-transitory computer-readable medium storing code for wireless communication at a control node, the code comprising instructions executable by a processor to perform a method of any of aspects 15 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless node, comprising:
transmitting, to a control node, an indication of a capability of the first wireless node to perform one or more self-interference cancelation procedures between a first antenna array of the first wireless node and a second antenna array of the first wireless node;
receiving, from the control node in response to the indication of the capability, a configuration for the first wireless node to use to perform a self-interference cancelation procedure of the one or more self-interference cancelation procedures for full-duplex communications; and
communicating, according to the received configuration, with the control node, a second wireless node, or any combination thereof, using the first antenna array and the second antenna array.

2. The method of claim 1, wherein communicating according to the received configuration comprises:
transmitting one or more signals via the first antenna array for a time interval;
receiving the one or more signals via the second antenna array for the time interval; and
performing the self-interference cancelation procedure on the one or more signals received via the second antenna array.

3. The method of claim 1, further comprising:
transmitting, to the control node, an indication of a capability of the first wireless node to enable or disable the one or more self-interference cancelation procedures, wherein the configuration is further based at least in part on the capability to enable or disable the one or more self-interference cancelation procedures.

4. The method of claim 1, further comprising:
transmitting, to the control node, a set of parameters associated with the one or more self-interference cancelation procedures, wherein the configuration indicates values for at least a subset of the set of parameters.

5. The method of claim 1, wherein the indication of the capability is transmitted in radio resource control signaling or F1 application protocol interface signaling.

6. The method of claim 1, further comprising:
transmitting, to the control node, a measurement report comprising an indication of a set of self-interference measurements, wherein the configuration is received based at least in part on the measurement report.

7. The method of claim 6, further comprising:
transmitting, in the measurement report, an indication of a self-interference cancelation procedure of the one or more self-interference cancelation procedures that was performed for at least a subset of the set of self-interference measurements, wherein the configuration is received based at least in part on the indication of the self-interference cancelation procedure that was performed.

8. The method of claim 6, further comprising:
identifying that at least one self-interference measurement of the set of self-interference measurements satisfies a self-interference threshold, wherein transmitting the measurement report is based at least in part on identifying that the at least one self-interference measurement satisfies the self-interference threshold.

9. The method of claim 6, further comprising:
receiving, from the control node, a reporting configuration for transmitting measurement reports associated with self-interference at the first wireless node, wherein the measurement report is transmitted in accordance with the reporting configuration.

10. The method of claim 6, further comprising:
receiving, from the control node, a request for the measurement report, wherein the measurement report is transmitted in response to the request.

11. The method of claim 6, further comprising:
transmitting, to the control node in the measurement report, a first subset of self-interference measurements of the set of self-interference measurements performed during a first portion of the time interval in which a self-interference cancelation procedure of the set of self-interference cancelation procedures was performed; and
transmitting, to the control node in the measurement report, a second subset of self-interference measurements of the set of self-interference measurements performed during a second portion of the time interval in which no self-interference cancelation procedures were performed, wherein the configuration is received based at least in part on the first subset of self-interference measurements, the second subset of self-interference measurements, or both.

12. The method of claim 6, wherein the set of self-interference measurements comprise a received signal strength indicator, a reference signal received power, a reference signal received quality, a signal-to-interference-plus-noise ratio, a channel quality indicator, or any combination thereof.

13. The method of claim 1, further comprising:
transmitting, to the control node based at least in part on communicating according to the received configuration, a request to disable the self-interference cancelation procedure associated with the configuration, to selectively modify one or more parameters of the self-interference cancelation procedure associated with the configuration, to perform a different self-interference cancelation procedure, or any combination thereof;
receiving a second configuration at least in part in response to the transmitted request; and
communicating according to the second configuration.

14. The method of claim 1, wherein the first wireless node comprises a user equipment (UE) or a mobile termination node of an integrated access and backhaul network, and wherein the control node comprises a base station, a donor unit of the integrated access and backhaul network, or a central unit of the integrated access and backhaul network.

15. A method for wireless communication at a control node, comprising:
receiving, from a first wireless node, an indication of a capability of the first wireless node to perform one or more self-interference cancelation procedures between a first antenna array of the first wireless node and a second antenna array of the first wireless node; and
transmitting, to the first wireless node in response to the indication of the capability, a configuration for the first wireless node to use to perform a self-interference cancelation procedure of the one or more self-interference cancelation procedures for full duplex communications.

16. The method of claim 15, further comprising:
receiving, from the first wireless node, an indication of a capability of the first wireless node to enable or disable the one or more self-interference cancelation procedures, wherein the configuration is further based at least in part on the capability to enable or disable the one or more self-interference cancelation procedures.

17. The method of claim 15, further comprising:
receiving, from the first wireless node, a set of parameters associated with the one or more self-interference cancelation procedures, wherein the configuration indicates values for at least a subset of the set of parameters.

18. The method of claim 15, wherein the indication of the capability is received in radio resource control signaling or F1 application protocol interface signaling.

19. The method of claim 15, further comprising:
receiving, from the first wireless node, a measurement report comprising an indication of a set of self-interference measurements, wherein the configuration is transmitted based at least in part on the measurement report.

20. The method of claim 19, further comprising:
receiving, in the measurement report, an indication of a self-interference cancelation procedure of the one or more self-interference cancelation procedures that was performed for at least a subset of the set of self-interference measurements, wherein the configuration is transmitted based at least in part on the indication of the self-interference cancelation procedure that was performed.

21. The method of claim 19, further comprising:
transmitting, to the first wireless node, a reporting configuration for transmitting measurement reports associated with self-interference at the first wireless node, or both, wherein the measurement report is received in accordance with the reporting configuration.

22. The method of claim 19, further comprising:
transmitting, to the first wireless node, a request for the measurement report, wherein the measurement report is received in response to the request.

23. The method of claim 19, further comprising:
receiving, from the first wireless node in the measurement report, a first subset of self-interference measurements of the set of self-interference measurements performed during a first portion of the time interval in which a self-interference cancelation procedure of the set of self-interference cancelation procedures was performed; and
receiving, from the first wireless node via the measurement report, a second subset of self-interference measurements of the set of self-interference measurements performed during a second portion of the time interval in which no self-interference cancelation procedures were performed, wherein the configuration is transmitted based at least in part on the first subset of self-interference measurements, the second subset of self-interference measurements, or both.

24. The method of claim 19, wherein the set of self-interference measurements comprise a received signal strength indicator, a reference signal received power, a reference signal received quality, a signal-to-interference-plus-noise ratio, a channel quality indicator, or any combination thereof.

25. The method of claim 15, further comprising:
receiving, from the first wireless node based at least in part on communicating according to the received configuration, a request to disable the self-interference cancelation procedure associated with the configuration, to selectively modify one or more parameters of the self-interference cancelation procedure associated with the configuration, to perform a different self-interference cancelation procedure, or any combination thereof;
transmitting a second configuration at least in part in response to the received request; and
communicating with the first wireless node according to the second configuration.

26. The method of claim 15, wherein
the first wireless node comprises a user equipment (UE), or a mobile termination node of an integrated access and backhaul network, and
the control node comprises a base station, a donor unit of the integrated access and backhaul network, or a central unit of the integrated access and backhaul network.

27. An apparatus for wireless communication at a first wireless node, comprising:
a processor;
memory coupled with the processor; and
instructions stored in the memory and executable by the processor to cause the apparatus to:
transmit, to a control node, an indication of a capability of the first wireless node to perform one or more self-interference cancelation procedures between a first antenna array of the first wireless node and a second antenna array of the first wireless node;
receive, from the control node in response to the indication of the capability, a configuration for the first wireless node to use to perform a self-interference cancelation procedure of the one or more self-interference cancelation procedures for full-duplex communications; and
communicate, according to the received configuration, with the control node, a second wireless node, or any combination thereof, using the first antenna array and the second antenna array.

28. The apparatus of claim 27, wherein the instructions to communicate according to the received configuration are executable by the processor to cause the apparatus to:
transmit one or more signals via the first antenna array for a time interval;
receive the one or more signals via the second antenna array for the time interval; and
perform the self-interference cancelation procedure on the one or more signals received via the second antenna array.

29. An apparatus for wireless communication at a control node, comprising:
a processor;
memory coupled with the processor; and
instructions stored in the memory and executable by the processor to cause the apparatus to:
receive, from a first wireless node, an indication of a capability of the first wireless node to perform one or more self-interference cancelation procedures between a first antenna array of the first wireless node and a second antenna array of the first wireless node; and
transmit, to the first wireless node in response to the indication of the capability, a configuration for the first wireless node to use to perform a self-interference cancelation procedure of the one or more self-interference cancelation procedures for full duplex communications.

30. The apparatus of claim 29, wherein the instructions are further executable by the processor to cause the apparatus to:

receive, from the first wireless node, an indication of a capability of the first wireless node to enable or disable the one or more self-interference cancelation procedures, wherein the configuration is further based at least in part on the capability to enable or disable the one or more self-interference cancelation procedures.

\* \* \* \* \*